United States Patent

McConnell et al.

[15] 3,648,271

[45] Mar. 7, 1972

[54] VISUAL EDITING SYSTEM INCORPORATING SELECTABLE LETTER SPACING DISPLAY AND ASSOCIATED SCALE DISPLAY

[72] Inventors: Robert L. McConnell; Jack W. Simpson, both of Lexington, Ky.

[73] Assignee: International Business Machines Corporation, Armonk, N.Y.

[22] Filed: Mar. 2, 1970

[21] Appl. No.: 15,793

[52] U.S. Cl. ..........................340/324 A, 340/172.5, 444/1

[51] Int. Cl. ..........................G06f 3/14

[58] Field of Search ..........................340/324 A, 172.5

[56] References Cited

UNITED STATES PATENTS

| | | | |
|---|---|---|---|
| 3,248,705 | 4/1966 | Dammann et al. | 340/324 A |
| 3,501,746 | 3/1970 | Vosbury | 340/172.5 |
| 3,165,045 | 1/1965 | Troll | 340/324 A |
| 3,514,616 | 5/1970 | Kolb | 340/324 A |

*Primary Examiner*—Thomas B. Habecker
*Assistant Examiner*—Marshall M. Curtis
*Attorney*—Hanifin and Jancin and John W. Girvin, Jr.

[57] ABSTRACT

A data composing, editing, formatting and display system for use by composers of business documents and quality printed graphics. A cathode-ray tube display is utilized to display text characters imputed by a secondary media reader in a manner analogous to a display of a page of typed data on a typewriter. The number of words of text which appear on each line of displayed text between margin boundaries are optimized. Additional text may be inserted or deleted at any point in the displayed text or the margin boundaries can be altered resulting in the displayed text shifting to accommodate the additional text or new boundaries. Text shifting results in reoptimization of the displayed lines without resultant loss of word integrity or paragraph definition. Operator controls are actuable to effect display of the displayed characters in either standard spacing or in proportional spacing. When standard spacing is specified, each character has the same escapement value. When proportional spacing is specified, the escapement value of the character varies in accordance with the character width. Since the average character width in proportional spacing is less than the average character width of standard spacing characters, a shift from standard spacing to proportional spacing could result in additional space located at the end of each line of displayed text. The operator may thereafter specify an optimization operation to maximize the number of words of proportionally spaced characters which appear within the margin boundaries on each display line. A set of scales corresponding to the escapement value selected can selectively be displayed adjacent to the text characters to inform the operator of the space that the displayed line will occupy on a printed document. Additionally, a partial adjust operation enables the operator to align the text on even pica positions when shifting from standard spacing to proportional spacing.

8 Claims, 65 Drawing Figures

INVENTORS
ROBERT L. McCONNELL
JACK W. SIMPSON

BY John W. Girvin, Jr.
ATTORNEY

Patented March 7, 1972

3,648,271

55 Sheets-Sheet 2

Patented March 7, 1972 3,648,271

55 Sheets-Sheet 24

Patented March 7, 1972 3,648,271

55 Sheets-Sheet 33

Patented March 7, 1972 3,648,271

55 Sheets-Sheet 35

DSP34Q = (N1) $\overline{Q3}$ ($\overline{L1+L4}$)(I3+I4Q1)
DSP3 = N1(I3)
PMARK = (DSP3) L3 $\overline{L1}$ $\overline{L4}$ CL12 = (CRMN)(I12)(CL)
CL12CX = (CL12)(X10OUT)(CNO INSERT + CNORM)
CL12CXN = (CL12)(X10 OUT *)(CEO *)
X1OUT = X10 (CNORM * + LP8 LP9 LP10)

VISUAL EDITING SYSTEM INCORPORATING SELECTABLE LETTER SPACING DISPLAY AND ASSOCIATED SCALE DISPLAY

CROSS-REFERENCES TO RELATED APPLICATIONS

The following applications are assigned to the same assignee as the present application.

U.S. Pat. application Ser. No. 782,285, filed Dec. 9, 1968, entitled "Automatic Data Composing, Editing and Formatting System," Paul E. Goldsberry et al., inventors,.

U.S. Pat. application Ser. No. 15,791 entitled "Proportional Spacing Visual Editing System," Robert G. Bluethman, Paul E. Goldsberry, Robert L. McConnell, and Jack W. Simpson, inventors, filed Mar. 2, 1970 concurrently herewith.

U.S. Pat. application Ser. No. 15,792 entitled "Visual Editing System Incorporating Controls for Justifying and Dejustifying Displayed Text," Robert G. Bluethman and Jack W. Simpson, inventors filed Mar. 2, 1970 concurrently herewith.

BACKGROUND OF INVENTION

1. Field

This invention relates to an automatic data composing, editing, formatting and display device, and more particularly, to an improved electronic display device having facilities therein to effect ready changes in the content and format of data displayed and having additional facilities to effect the display of data characters in either proportional space or standard space and to effect the display of scales corresponding to the pitch selected.

2. Description of The Prior Art

The preparation of quality business documents and printed graphic materials often involves keying and editing several drafts of the document before it is complete, correct, and presented in a format that is both readily understandable and aesthetically pleasing to the eye of the reader. Several data editing devices have been proposed wherein data is inputed into a storage device and thereafter displayed for operator observation. The operator may thereafter make insertions and correction to the data thus displaced or may make format changes. Such a system is described in the aforereferenced application of Paul E. Goldsbery et al. Additionally, the aforereferenced concurrently filed copending application of Robert G. Bluethman et al. describes a data editing system wherein the text is displayed in a proportionally spaced representation.

While each of these systems enables the operator to effect rapid text and format changes for the particular system described, they do not enable the operator to determine whether a printout on a standard spacing machine or on a proportional spacing machine is desirous. Additionally, in such prior art systems, the operator has no way to spacially relate the displayed data to a line of printed data. Thus, the operator must "guess" the width that each displayed character will take up on a sheet of paper when printed out on an output printer.

SUMMARY

In order to overcome the above-noted short comings of the prior art, the present invention provides an information editing and display device where information can readily be inputed into the device by secondary media and the words of information thus inputed may be displayed in either a proportional escapement display or in a standard escapement display. Special controls are provided for the operator to effect the display of a scale adjacent to the displayed text which signifies to the operator the amount of space in inches that will be occupied by the displayed text when printed alteratively on a proportional spacing printer or on a standard spacing printer. Additional means are provided to properly align columnar text previously aligned for a standard spacing machine to the proportional display. The number of words appearing on each line of displayed text are optimized in accordance with the character escapement values specified by the operator. That is, when standard display is specified, each character has the same escapement value. When a proportional display is specified, the escapement value of the character varies in accordance with the width of the character. Since the average value of a proportionally spaced character is less than the value of standard spaced characters, on the average, more words are generally placed on a line of proportional display than on a corresponding line of standard display by the word optimization process.

The foregoing and other features and advantages of the invention will be apparent from the following more particular description of the preferred embodiment as illustrated in the accompanying drawings.

In the drawings

Figure 3A:
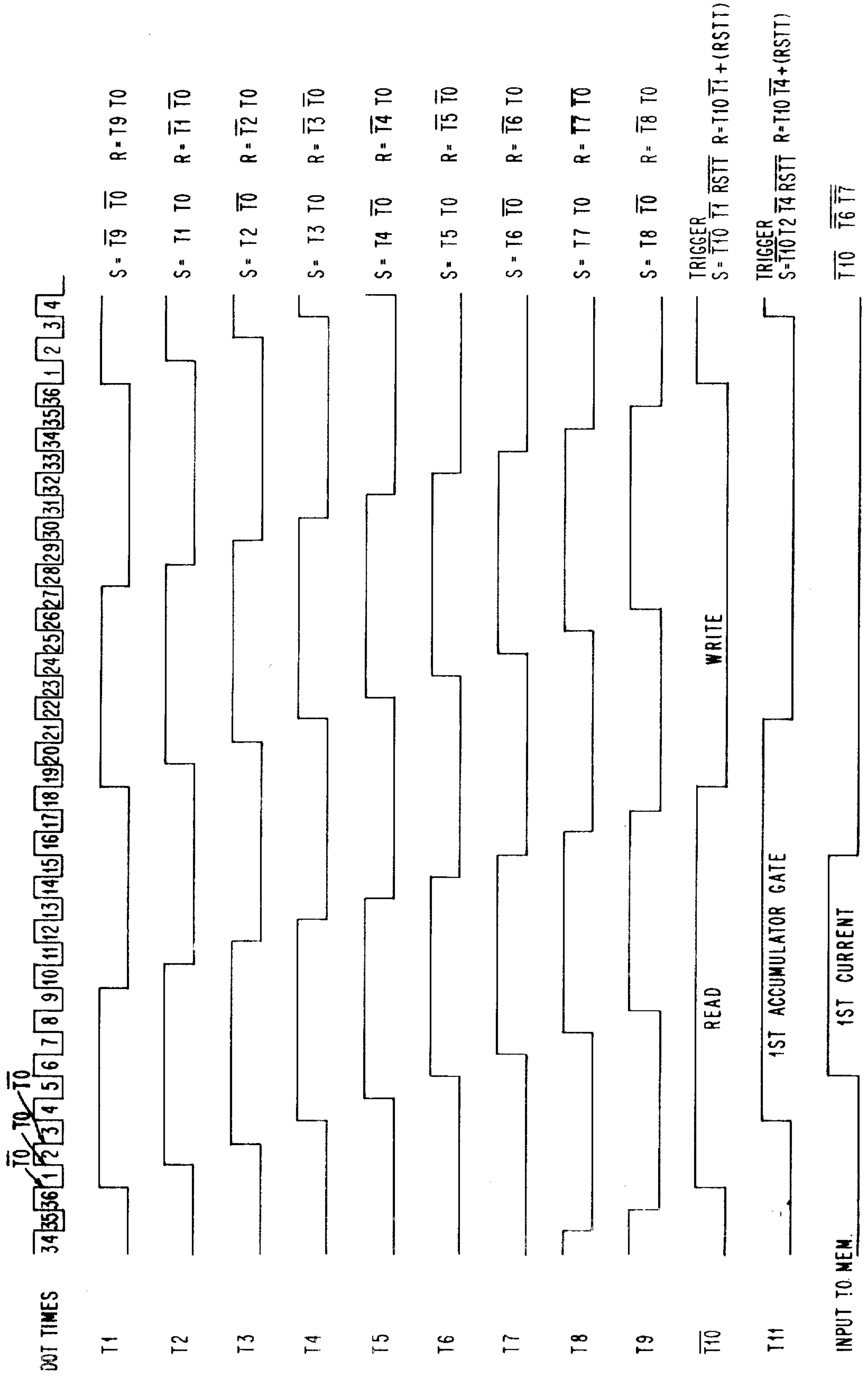
Figure 3B:
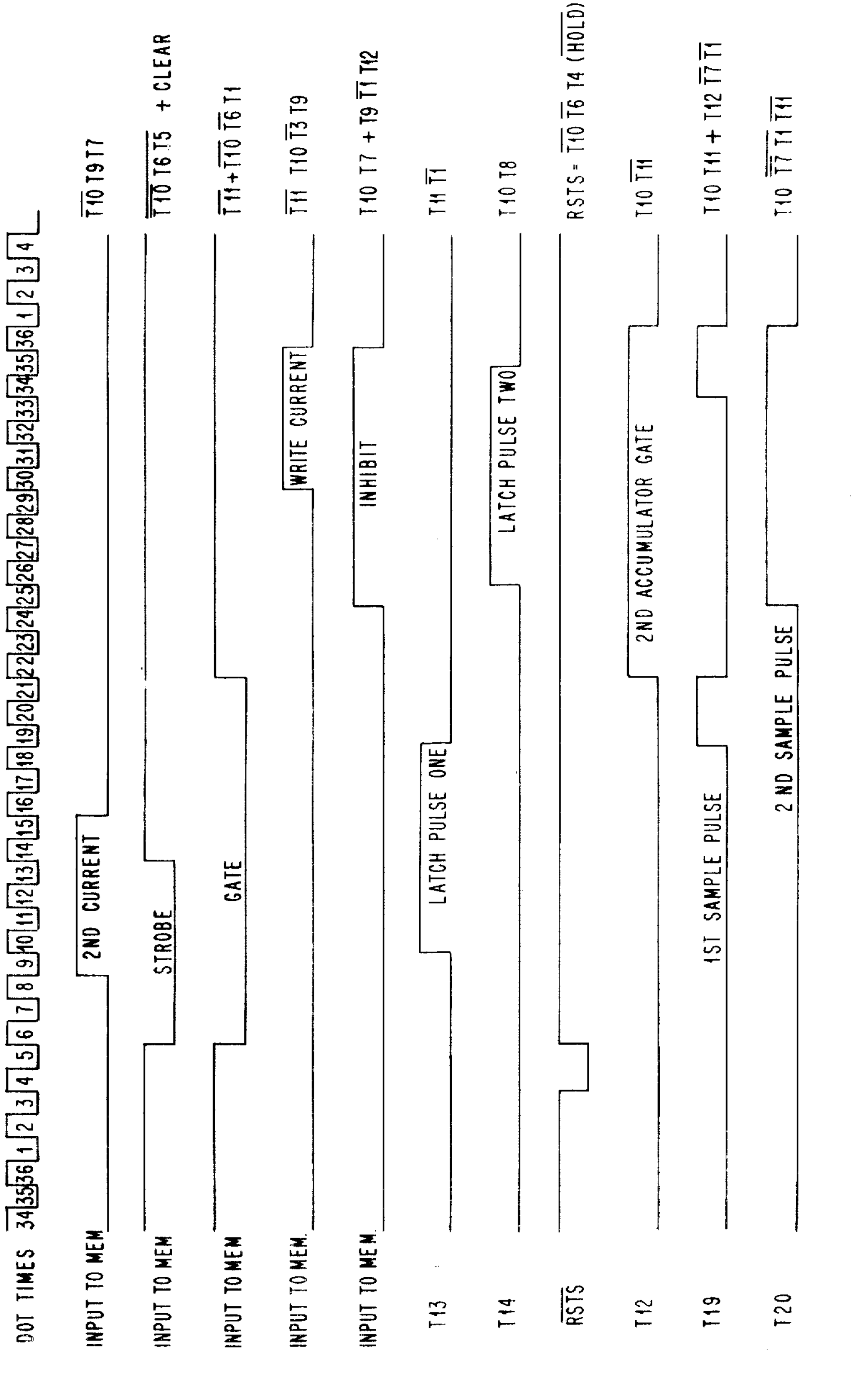
Figure 3C:
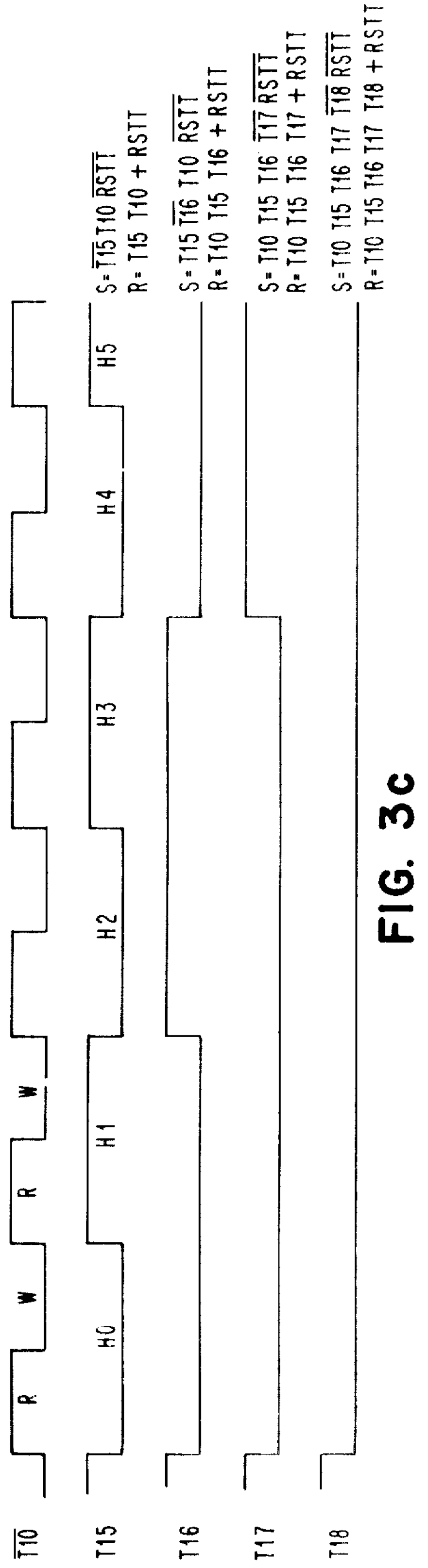

FIGS. 3*a*, 3*b*, and 3*c* are a timing diagram of the various states of the system clock.

Figure 4:
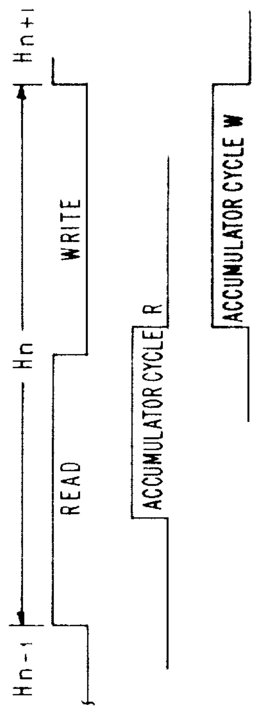

FIG. 4 is a timing diagram of a typical H-clock cycle.

Figure 5:
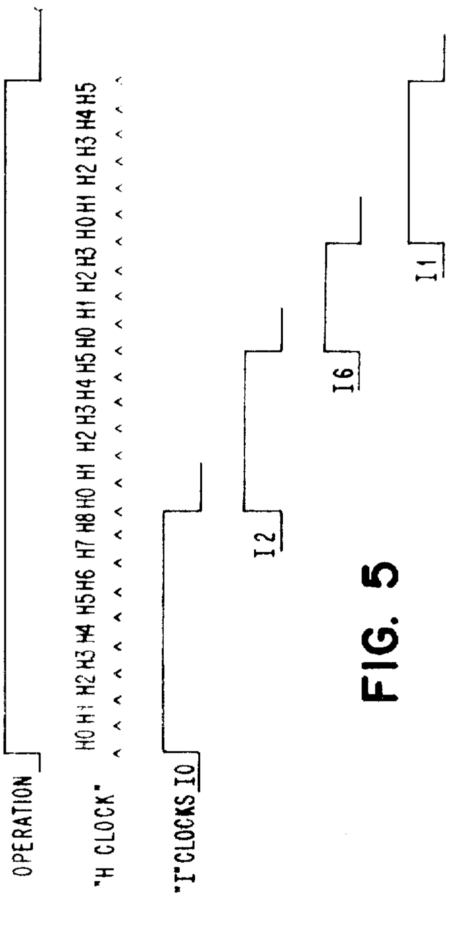

FIG. 5 is a timing diagram of the output of the H- and I-clocks during a machine operation.

Figure 6:
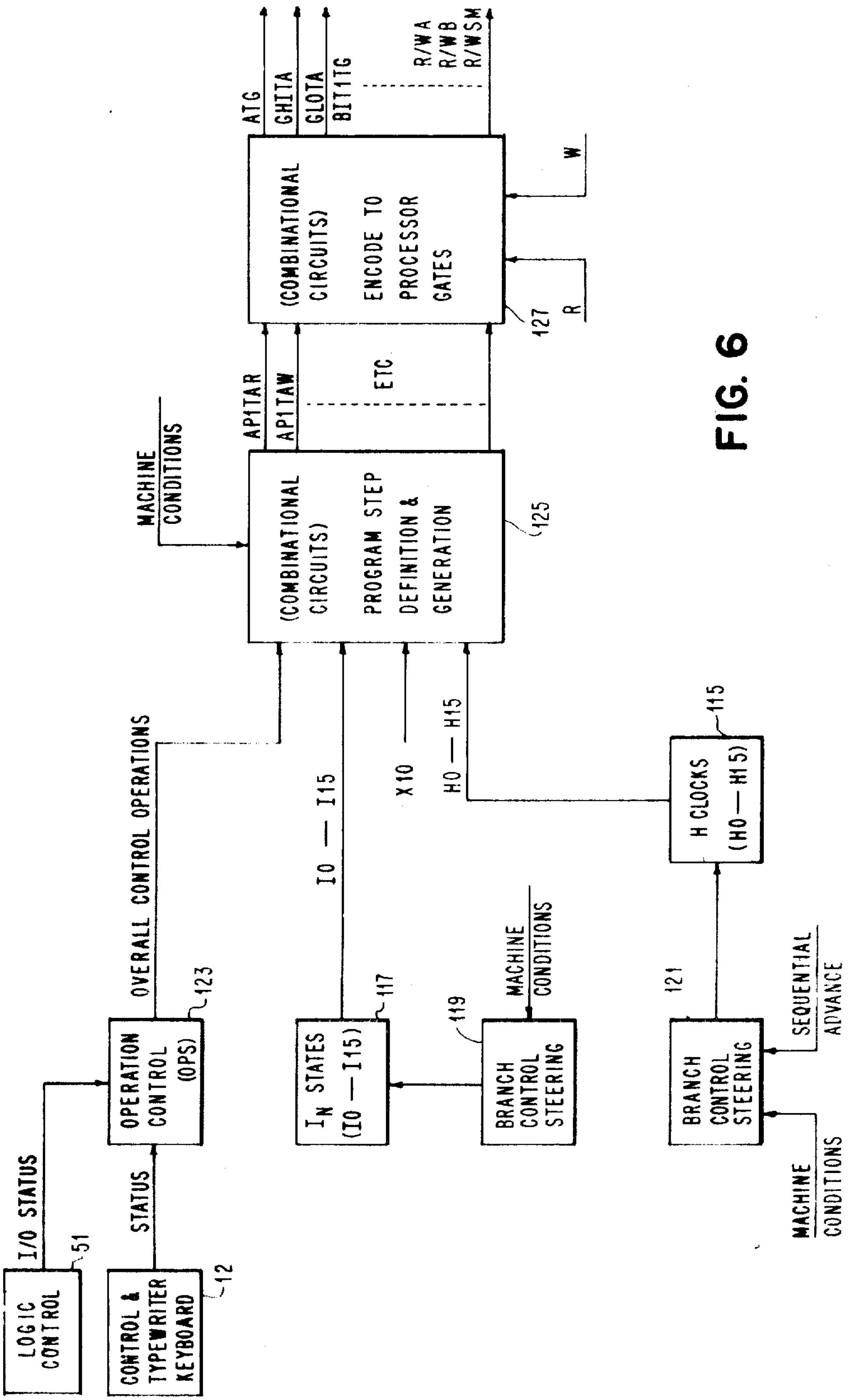

FIG. 6 is a block diagram of portions of the system clock and processor control unit.

Figures 7, 8:
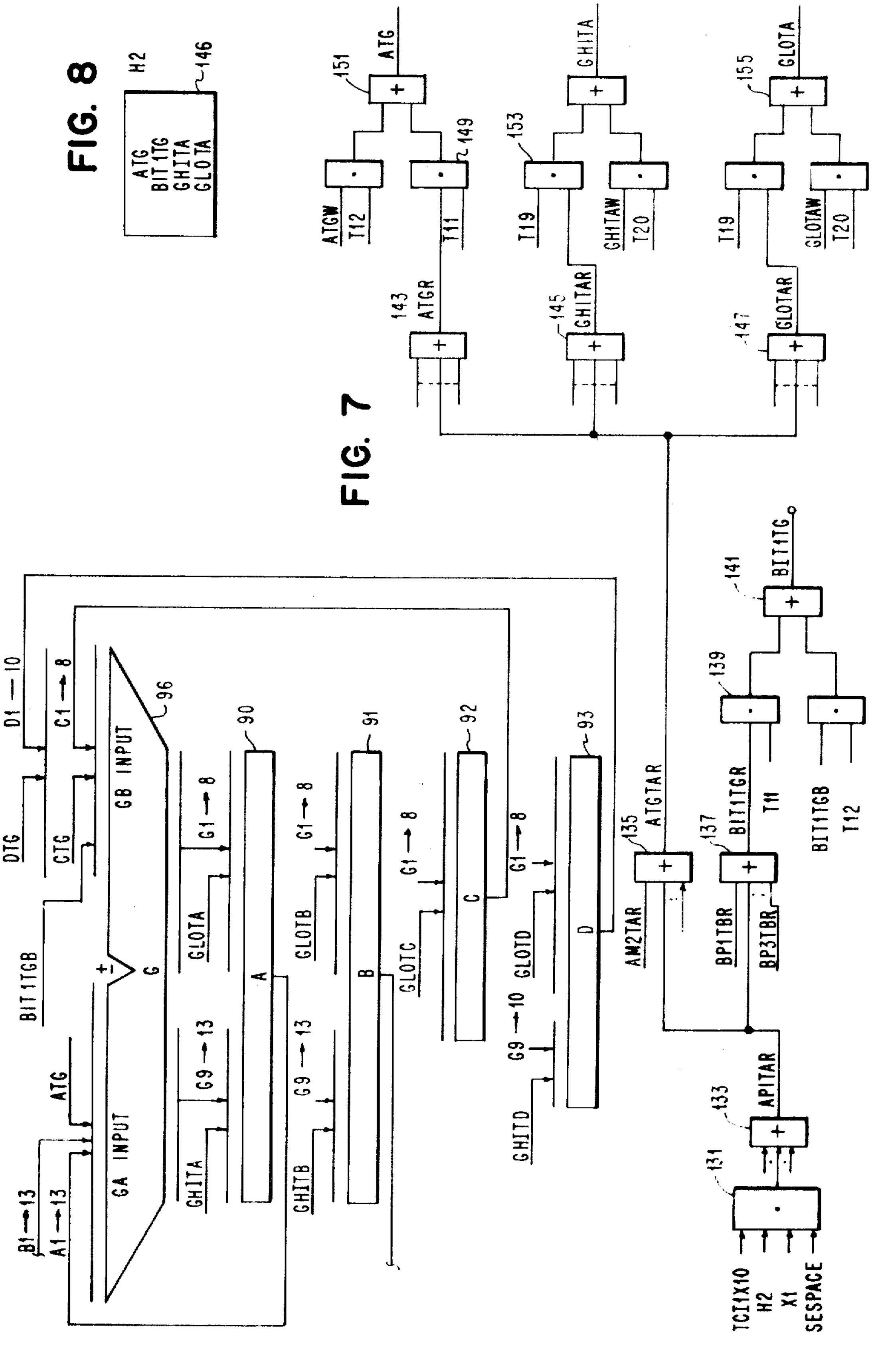

FIG. 7 is a block diagram of various combinational circuits of the processor control.

FIG. 8 is a block diagram representation of various system functions.

Figure 9:
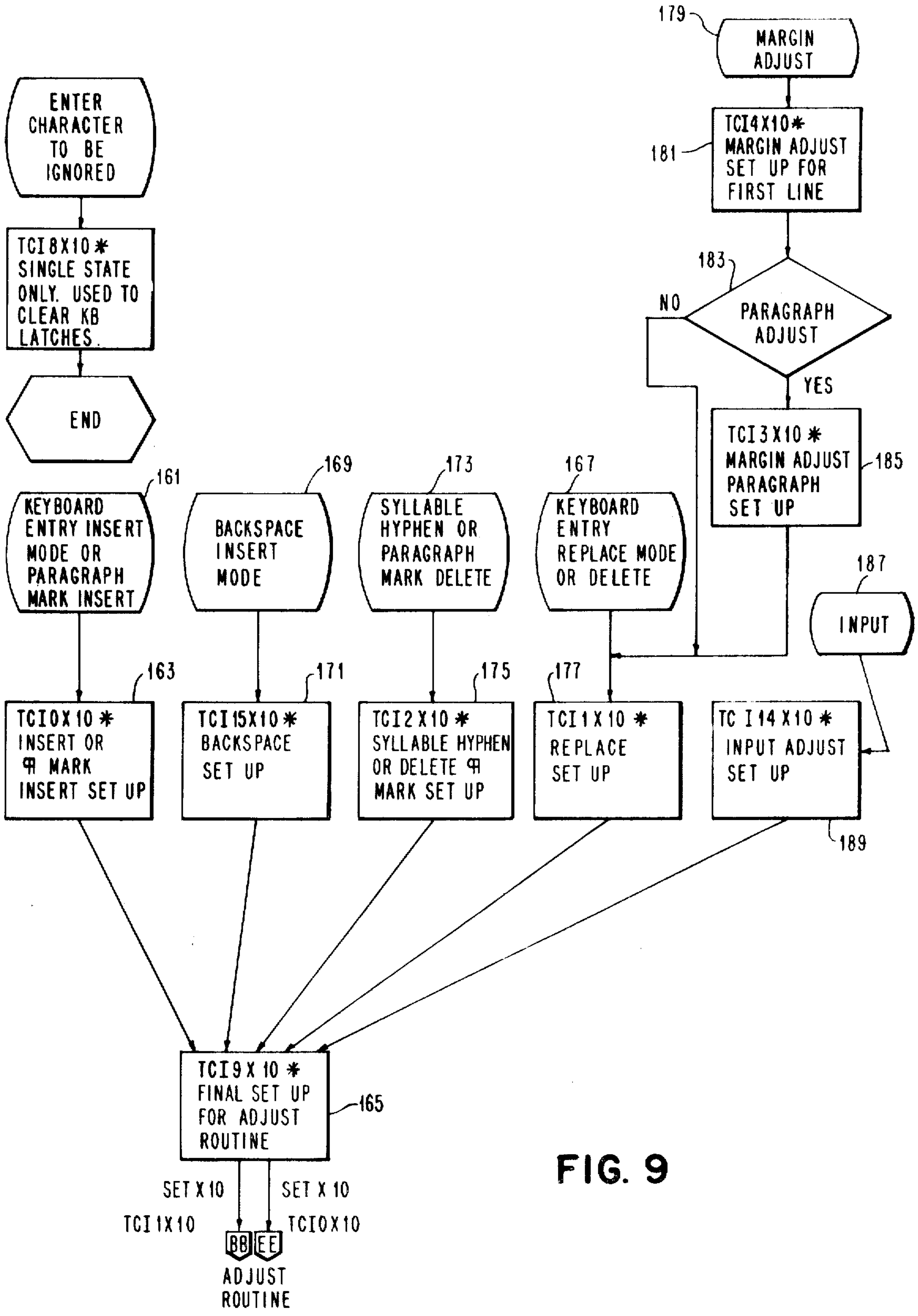

FIG. 9 is a block flow diagram showing machine operations which effect a word optimization operation.

Figure 10:
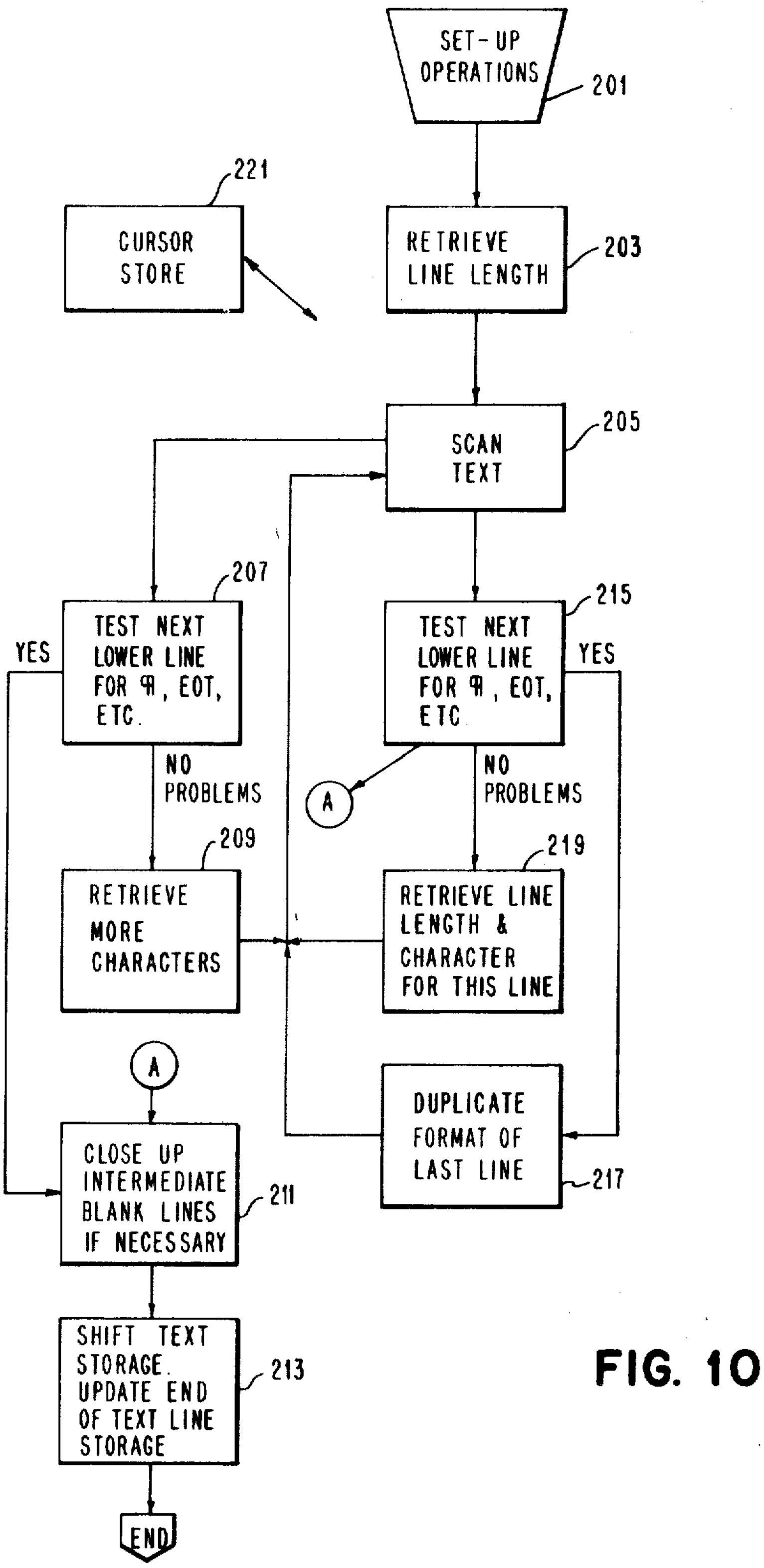

FIG. 10 is a block flow diagram of the system operation during a word optimization operation.

Figure 11:
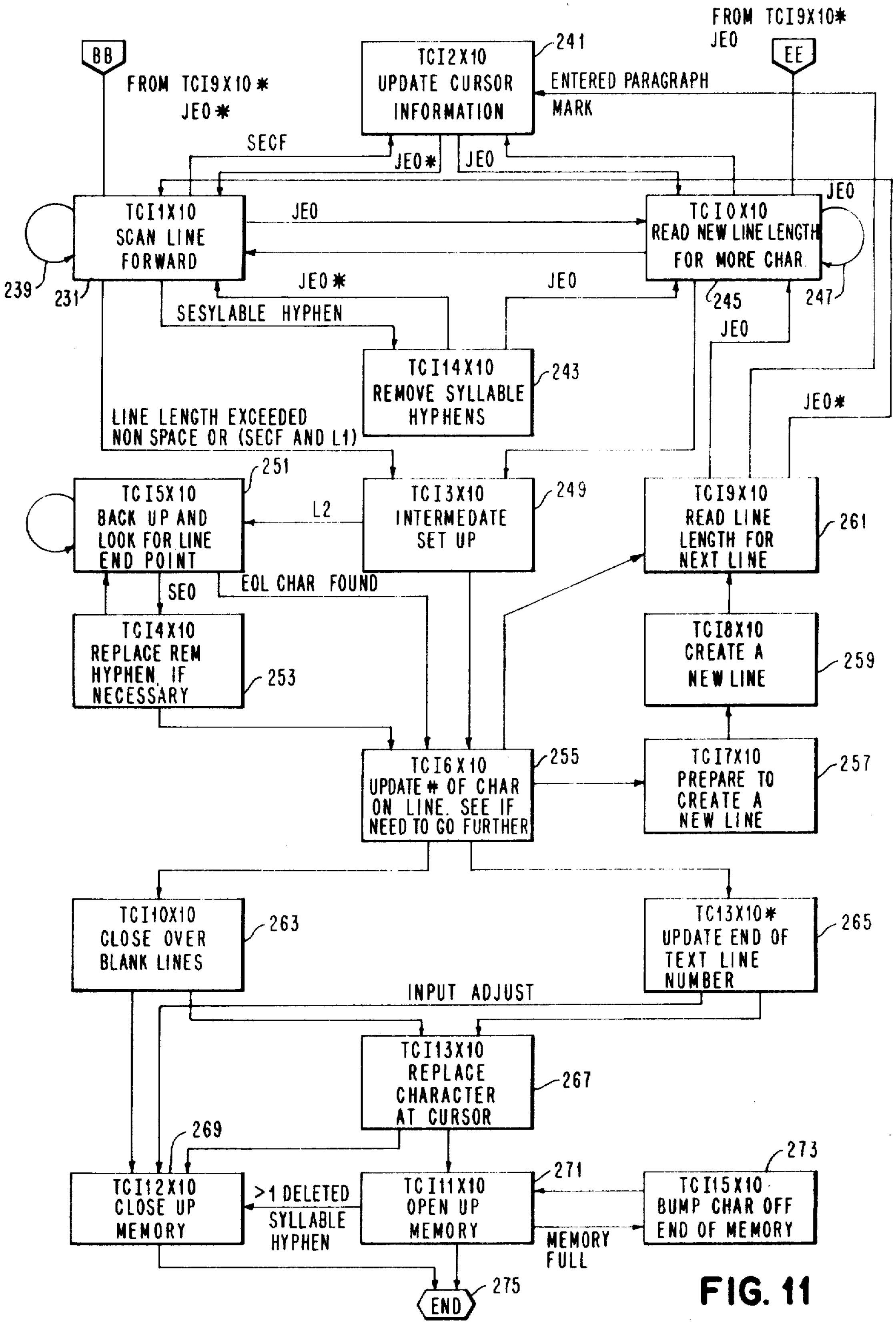

FIG. 11 is a detailed machine state flow diagram of the word optimization operation.

Figure 12:
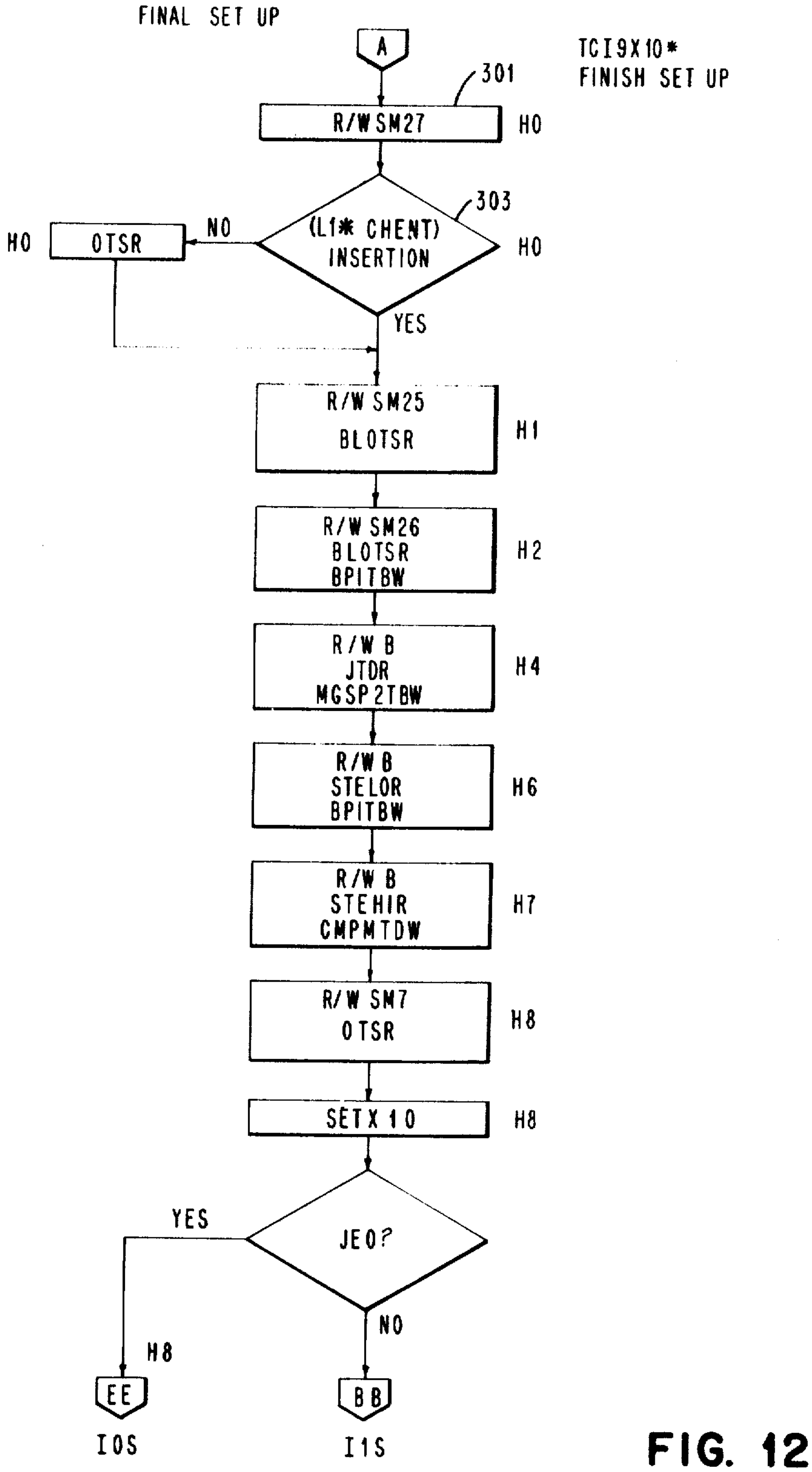

FIG. 12 is a detailed flow diagram of the first portion of the word optimization operation.

FIGS. 13, 14, 15, 16, 17, 18, 19, 20, 21, 22, 23, 24, 25, 26, 27 and 28 are detailed flow diagrams of the system operation during a word optimization operation.

Figure 29:
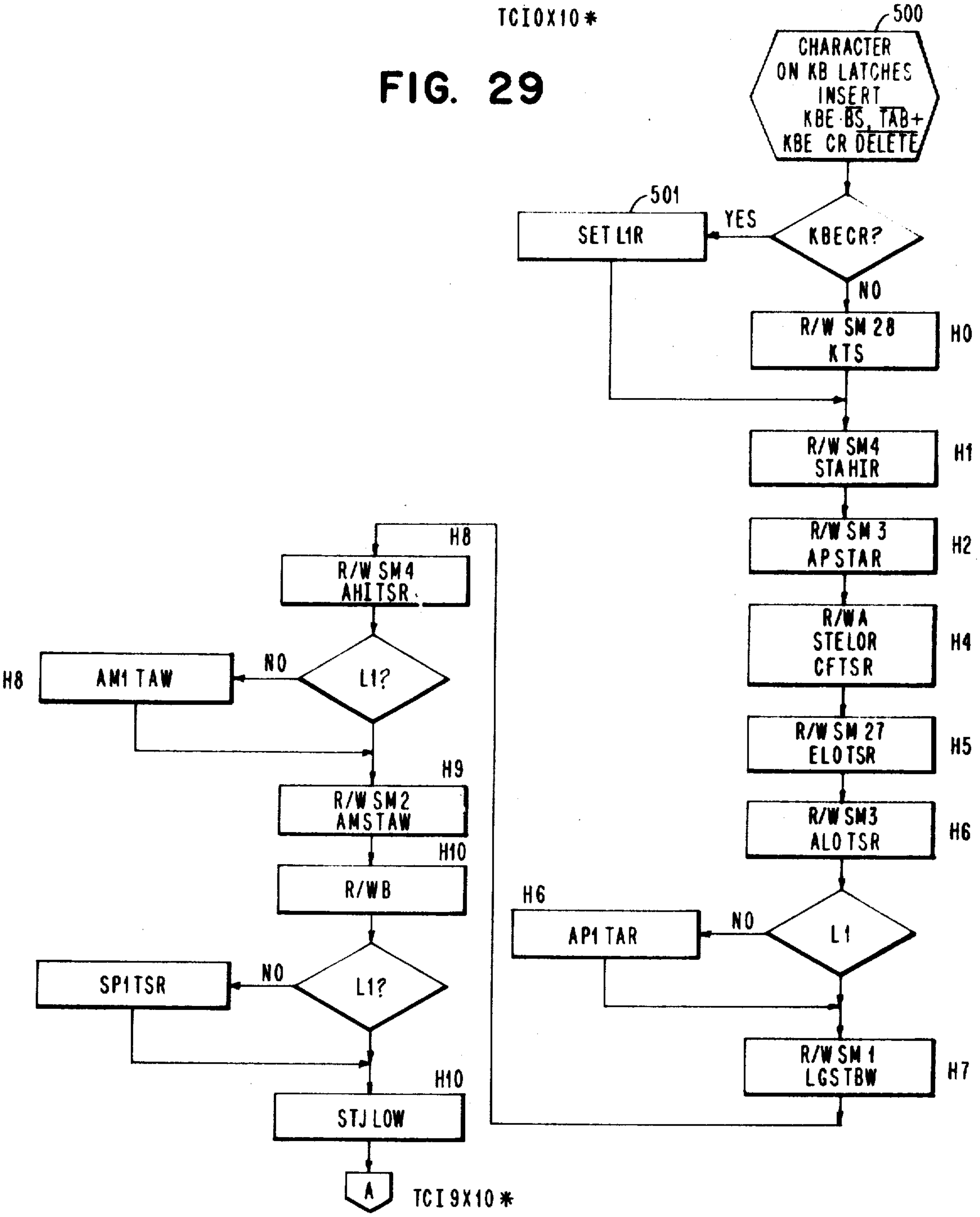

FIG. 29 is a flow diagram of the system setup operation for a character insertion or paragraph mark insertion operation.

Figure 30:
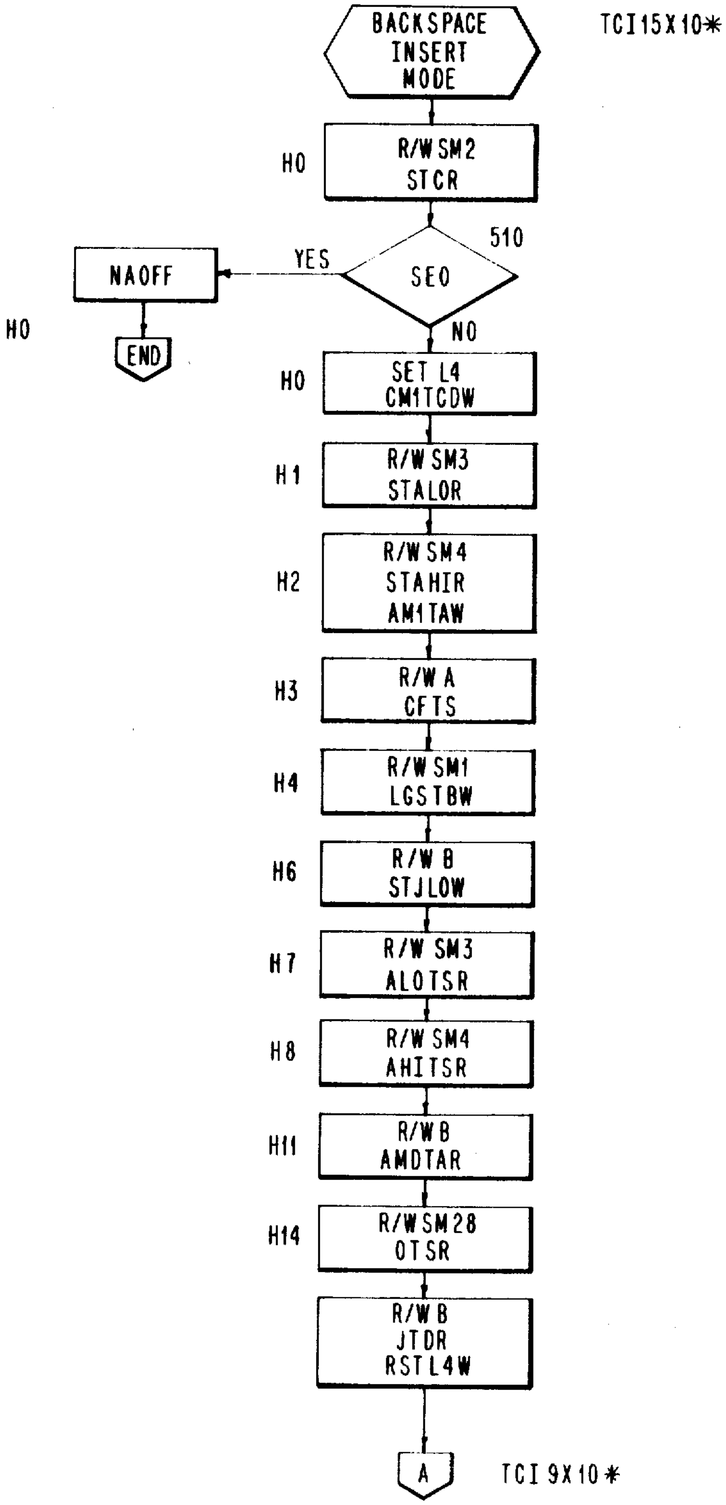

FIG. 30 is a flow diagram of the system setup operation for a backspace operation.

Figure 31:
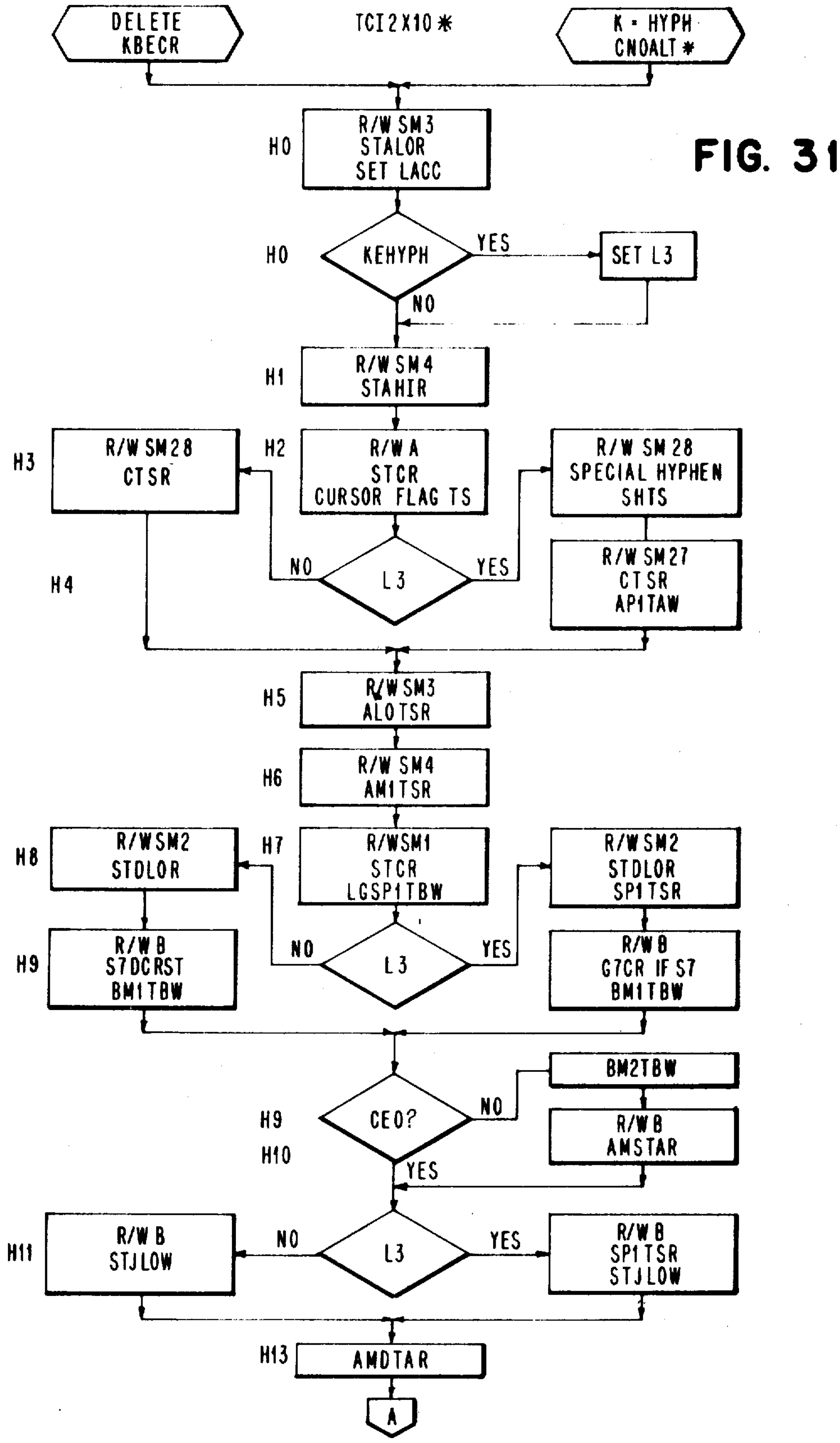

FIG. 31 is a flow diagram of the system setup operation for a paragraph mark deletion or syllable hyphen insertion operation.

Figure 32:
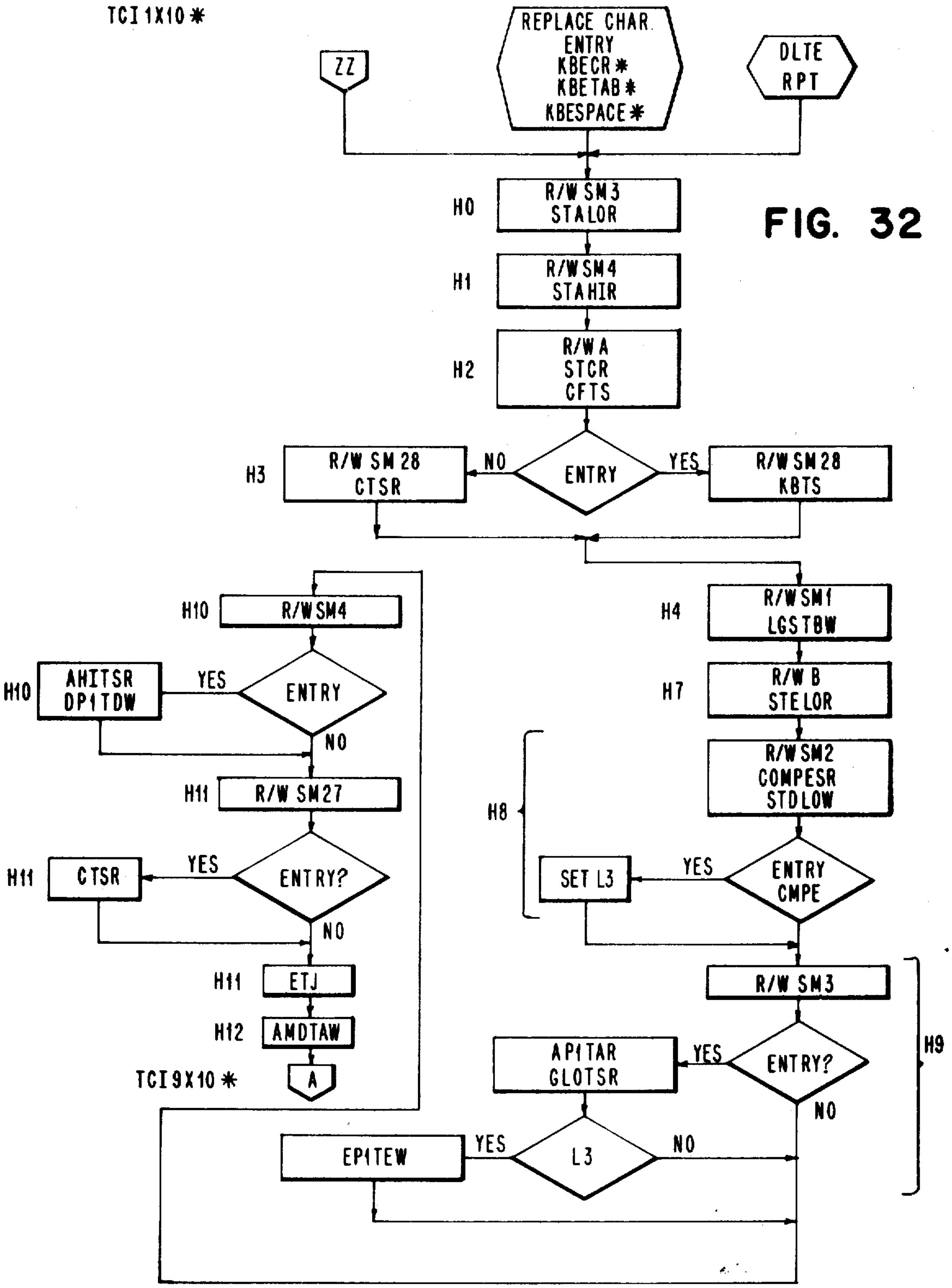

FIG. 32 is a flow diagram of the system setup operation for a character replace operation.

Figure 33:
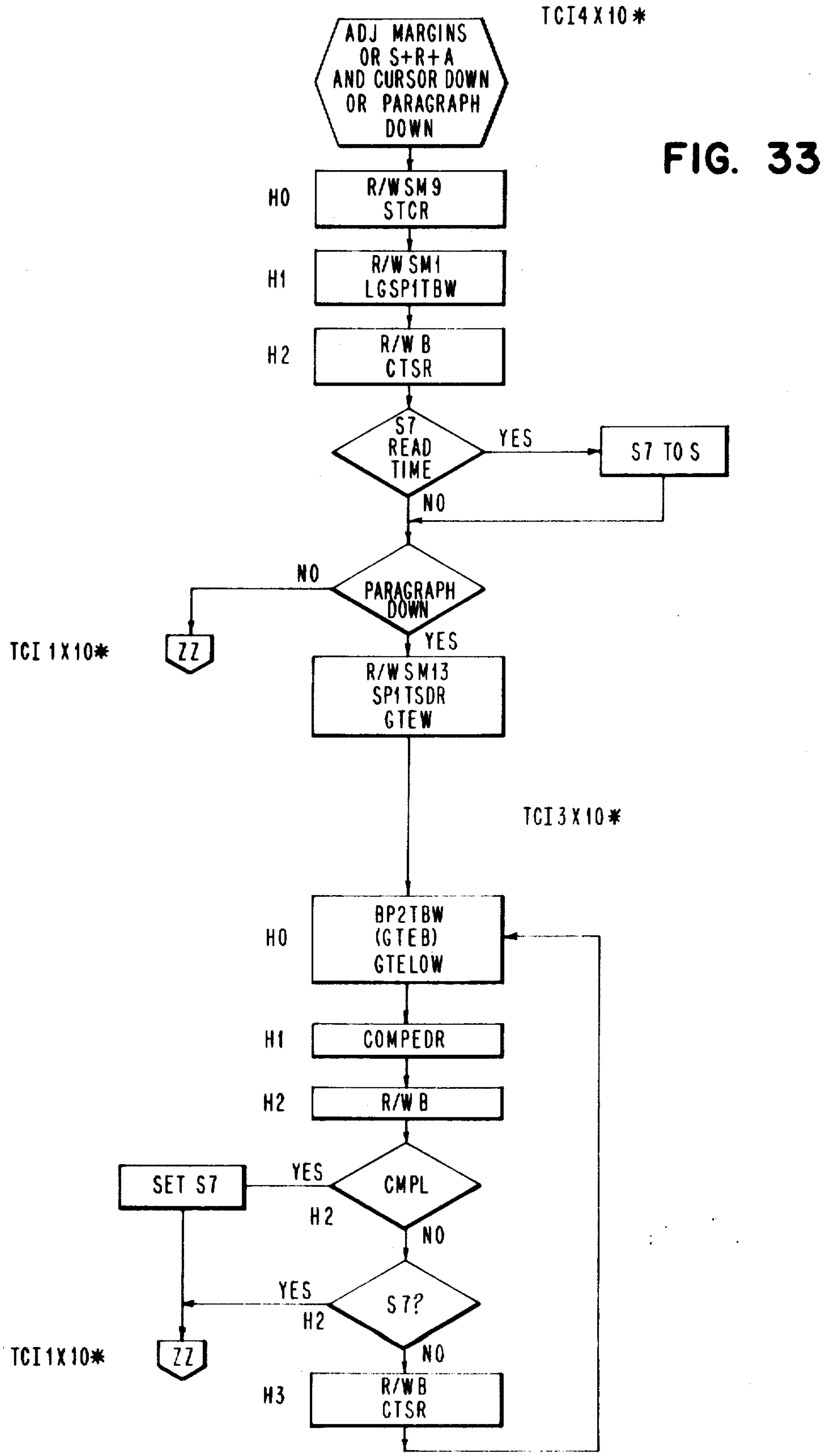

FIG. 33 is a flow diagram of the system setup operation for a margin adjust operation.

Figure 34:
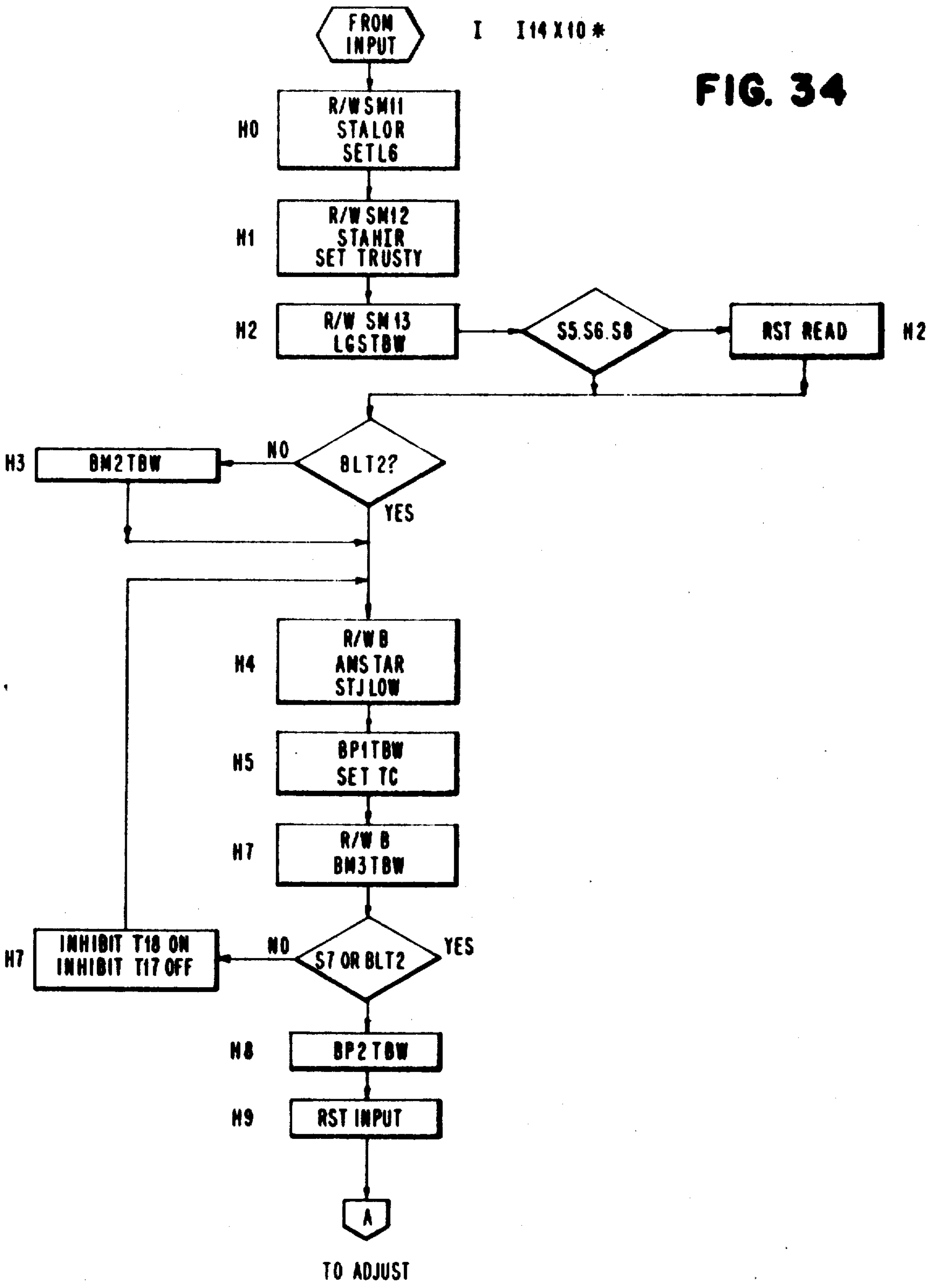

FIG. 34 is a flow diagram of the system setup operation for an input adjust operation.

Figure 35:
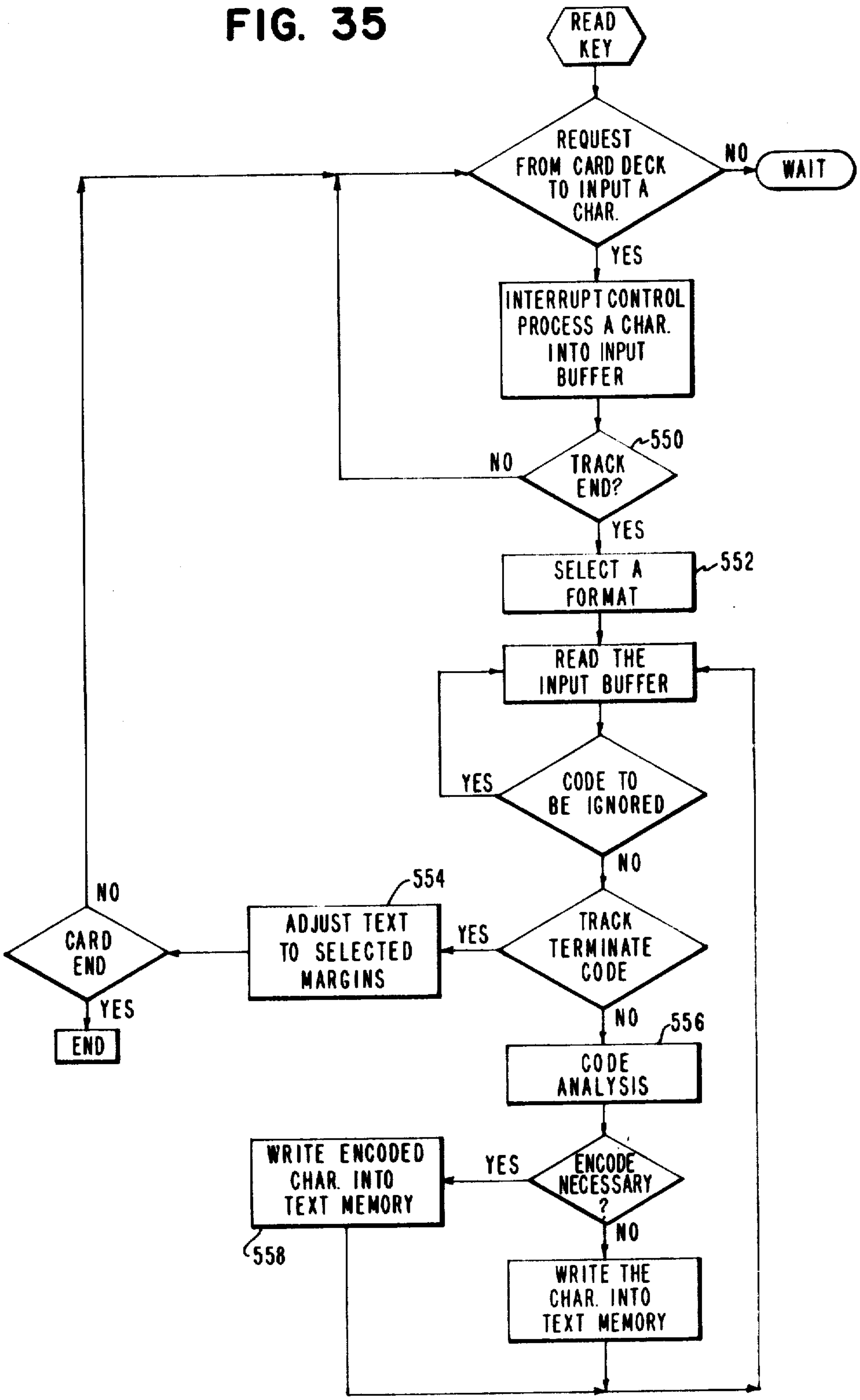

FIG. 35 is a flow diagram of the system data input operation.

Figure 36:
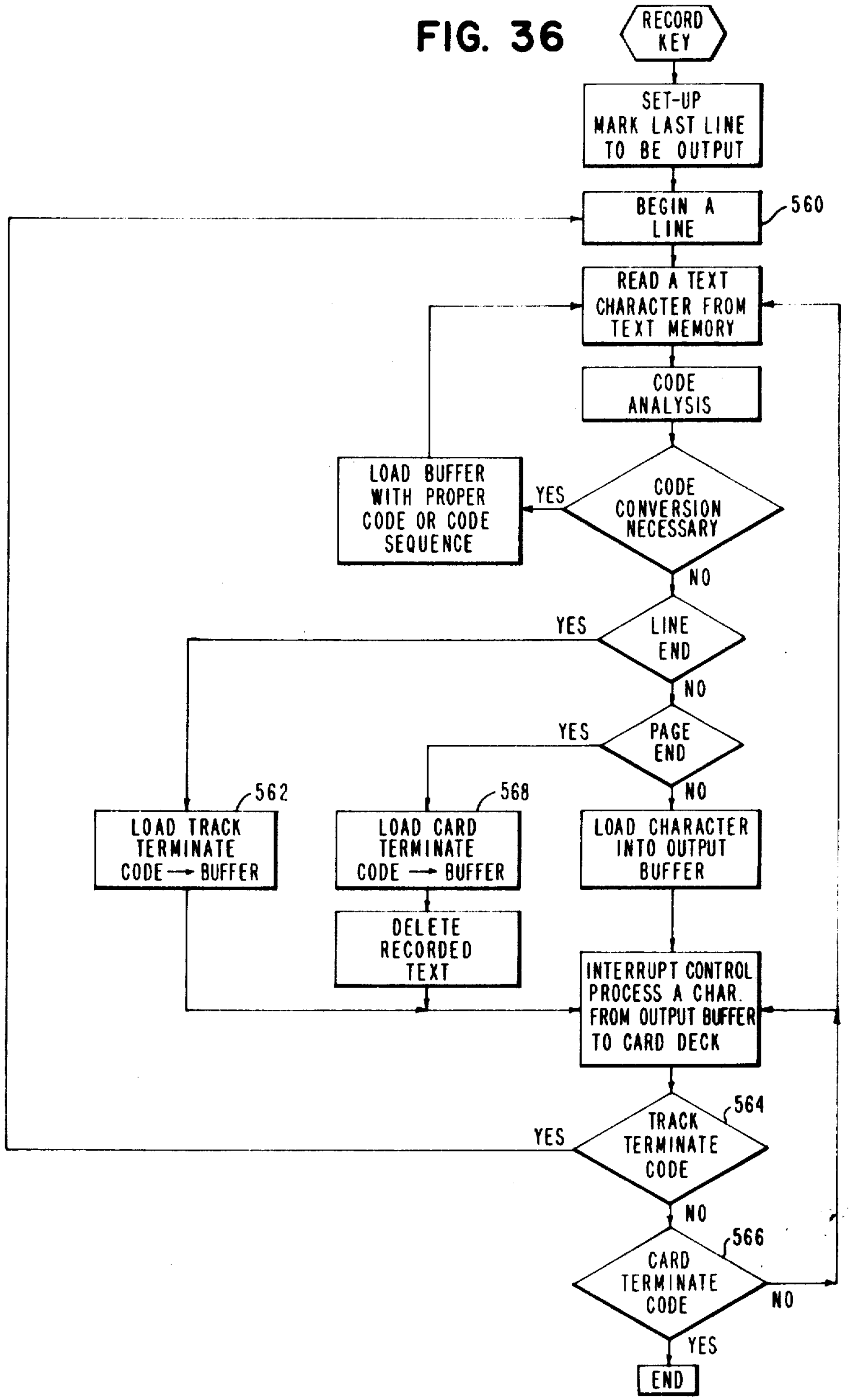

FIG. 36 is a flow diagram of the system data output operation.

Figure 37:
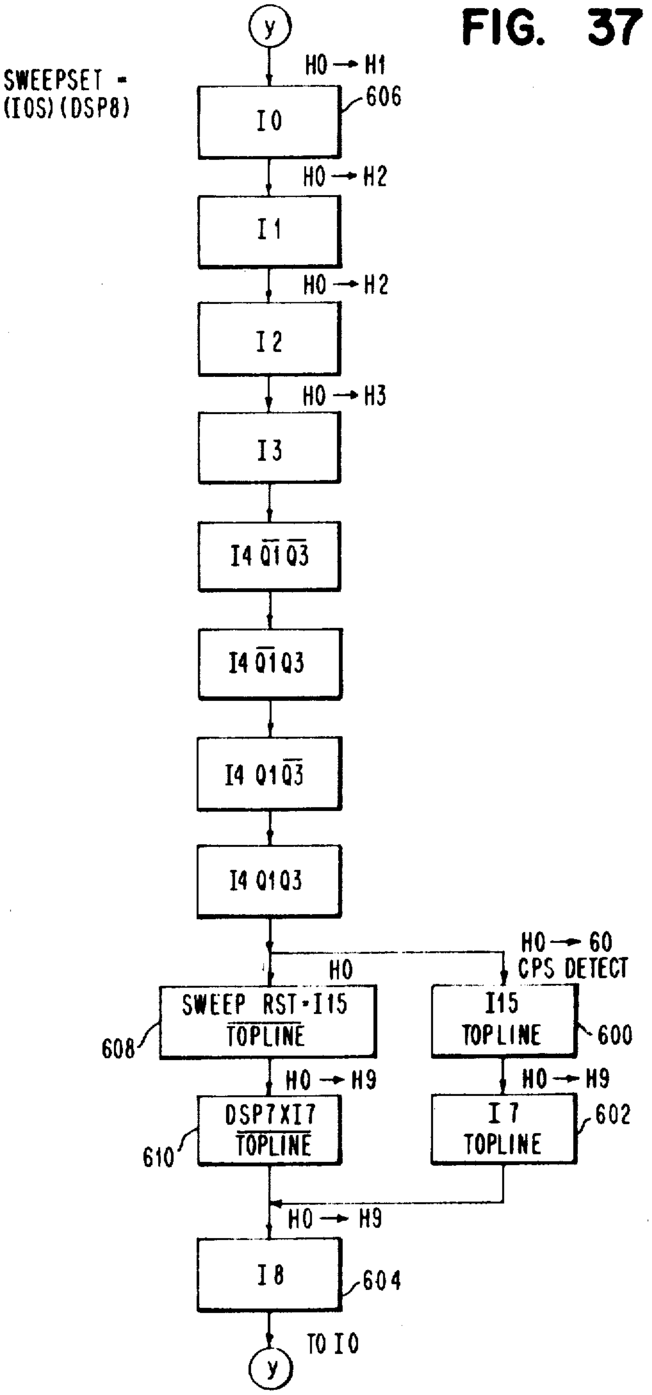

FIG. 37 is a detailed machine state flow diagram of the display operation.

FIGS. 38, 39, 40, 41, 42 and 43 are detailed flow diagrams of the system operation during a display operation.

Figures 43, 44:
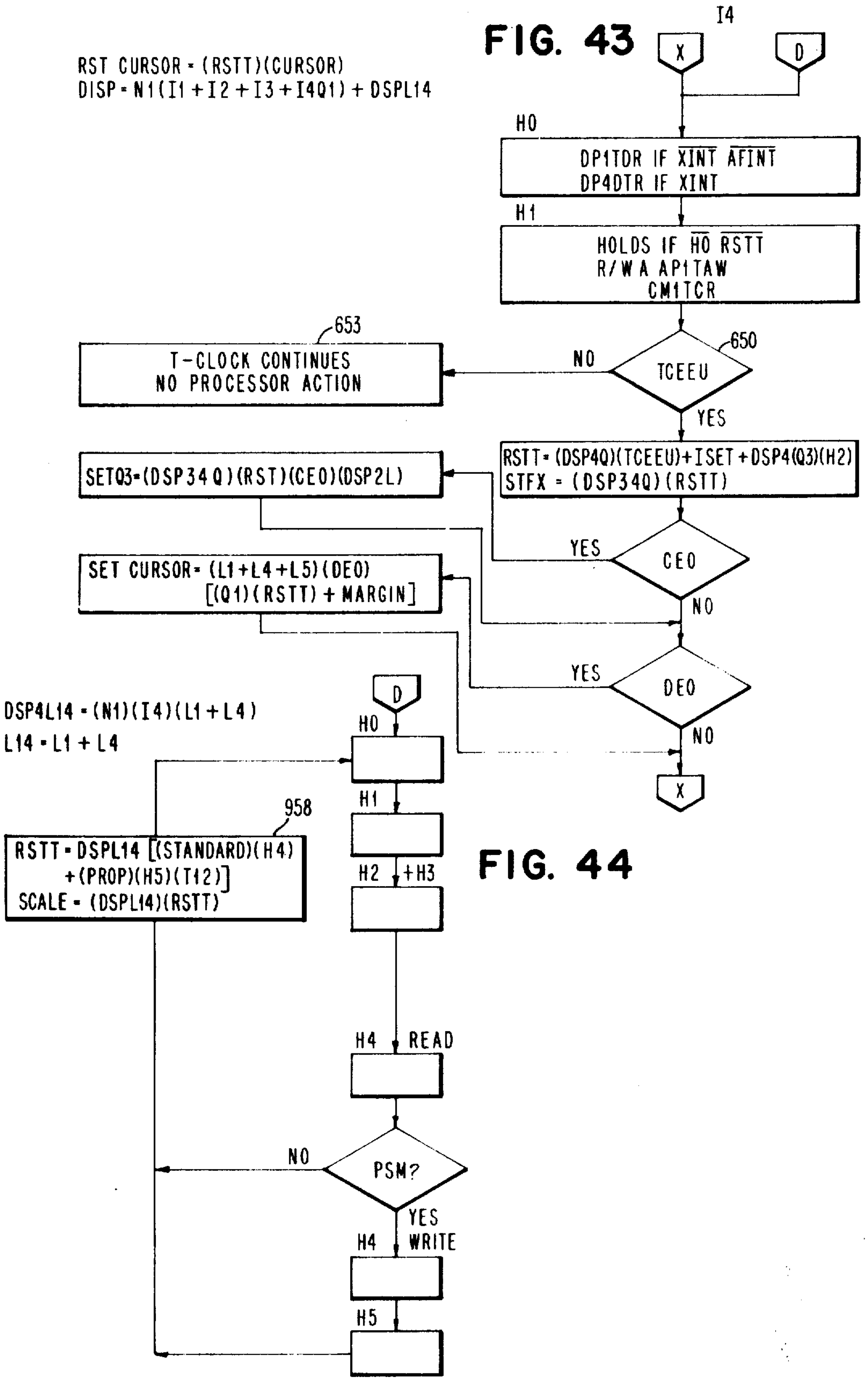

FIG. 44 is a flow diagram of scale display operations.

Figure 45:
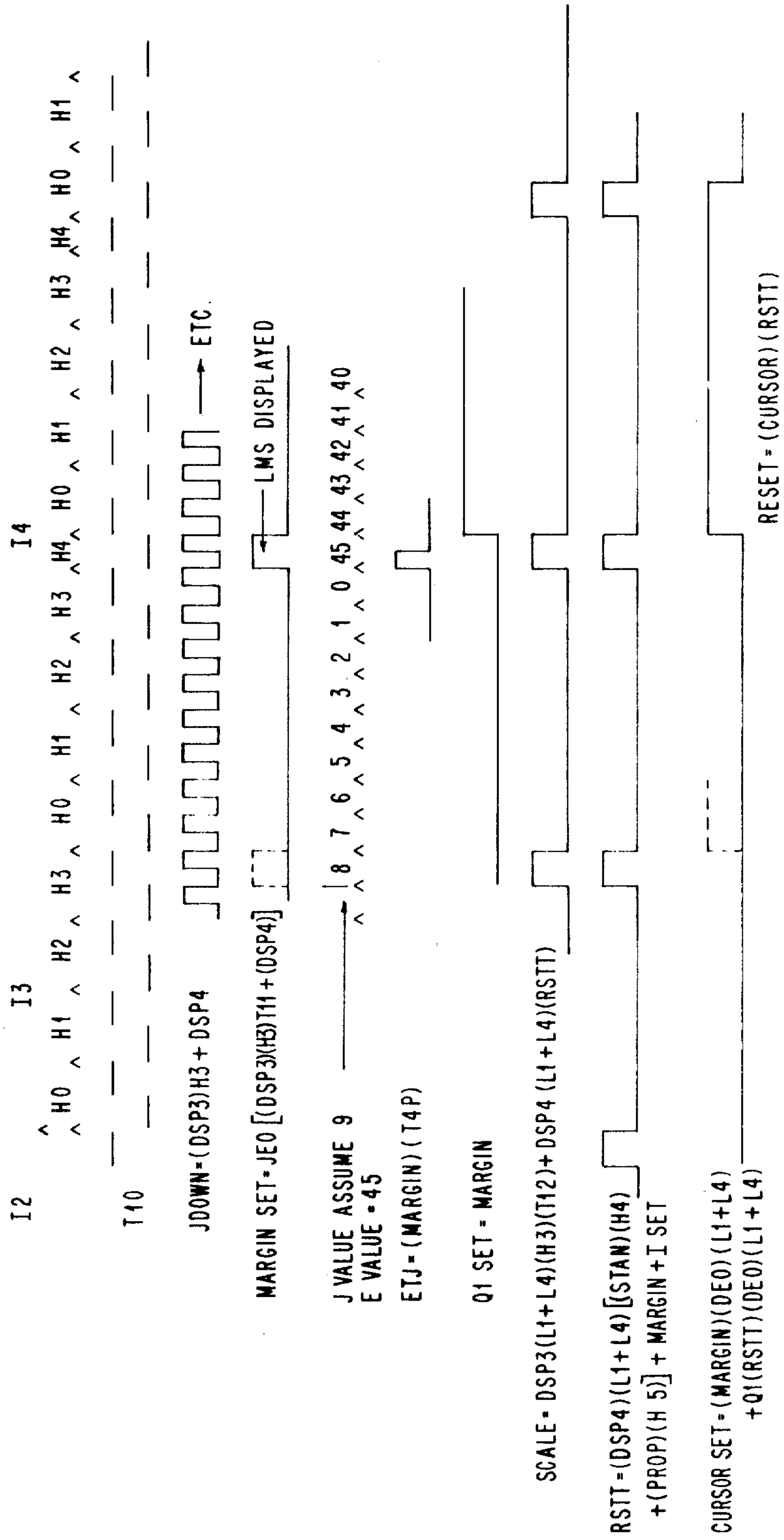

FIG. 45 is a timing diagram of the system during a portion of the display operation.

Figures 46, 48:
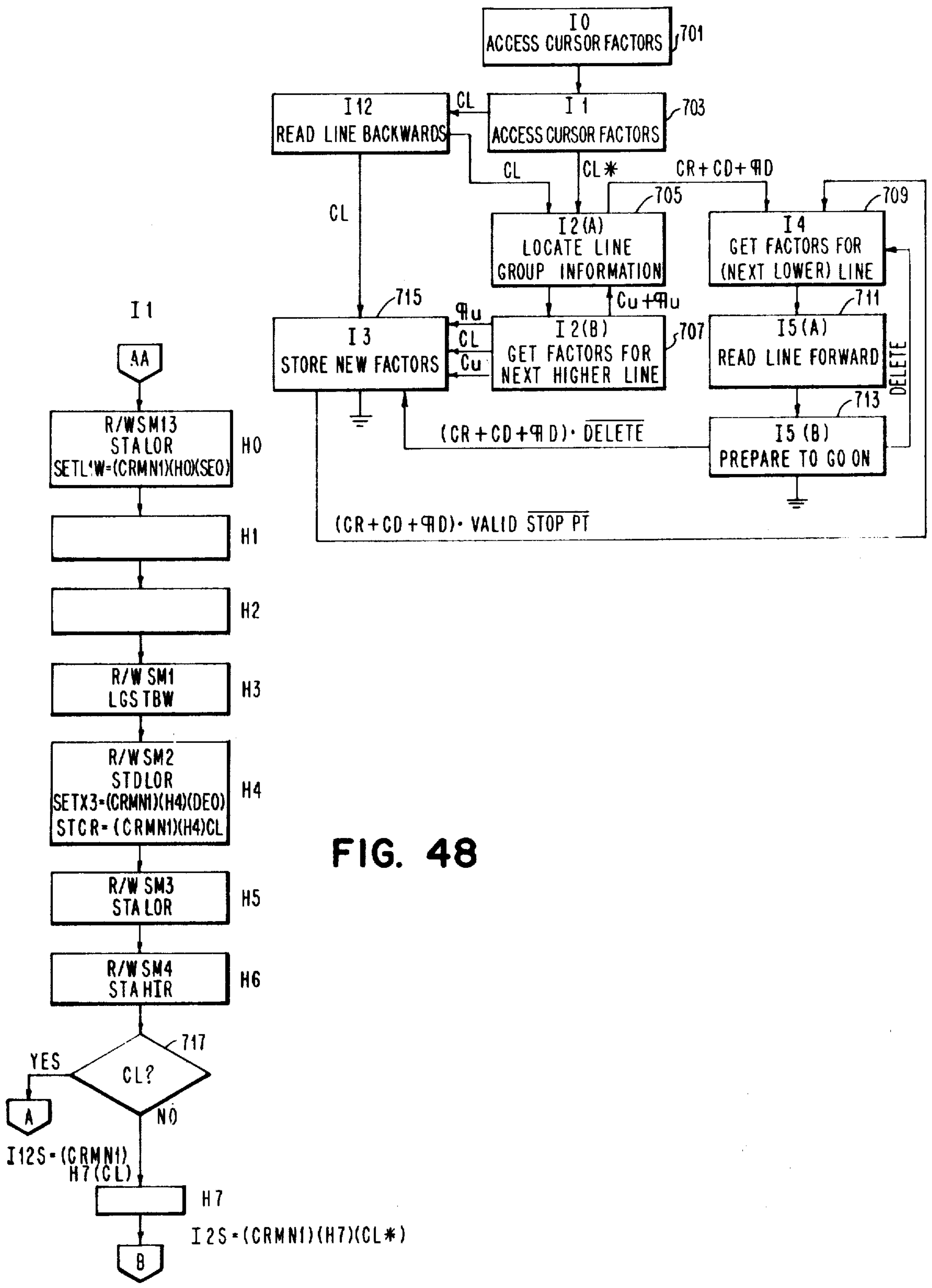

FIG. 46 is a detailed machine state flow diagram of the cursor motion operation.

FIGS. 47, 48, 49, 50, 51, 52 and 53 are flow diagrams of the system operation during cursor motion operations.

Figure 54:
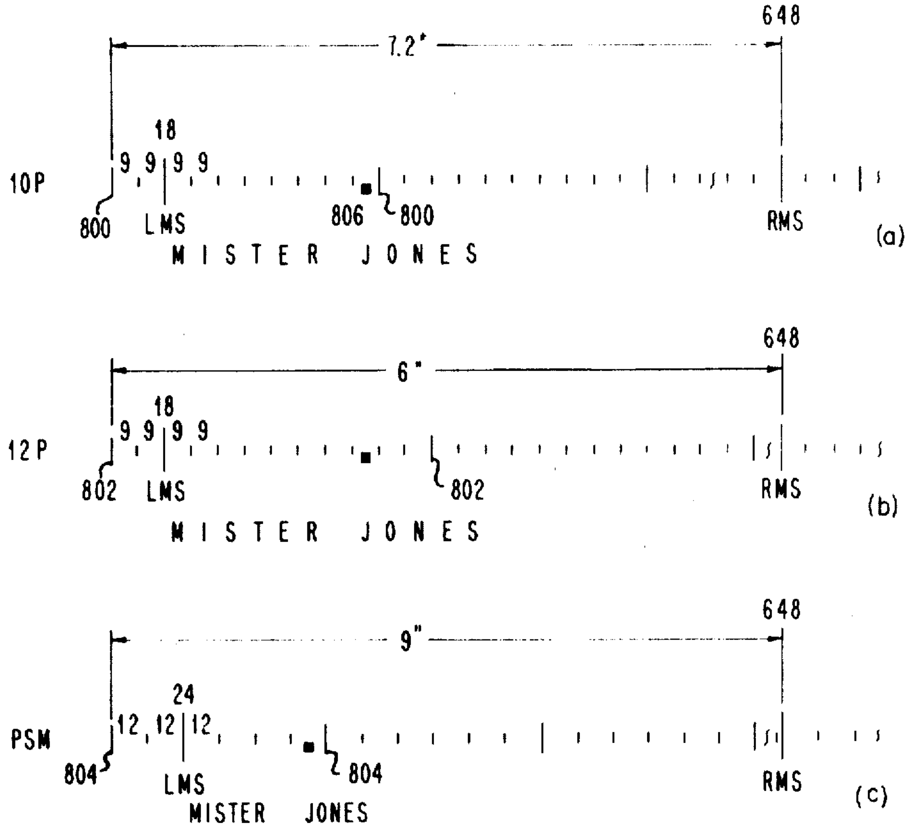

FIG. 54 is a graphic illustration of displayed scales.

Figure 55:
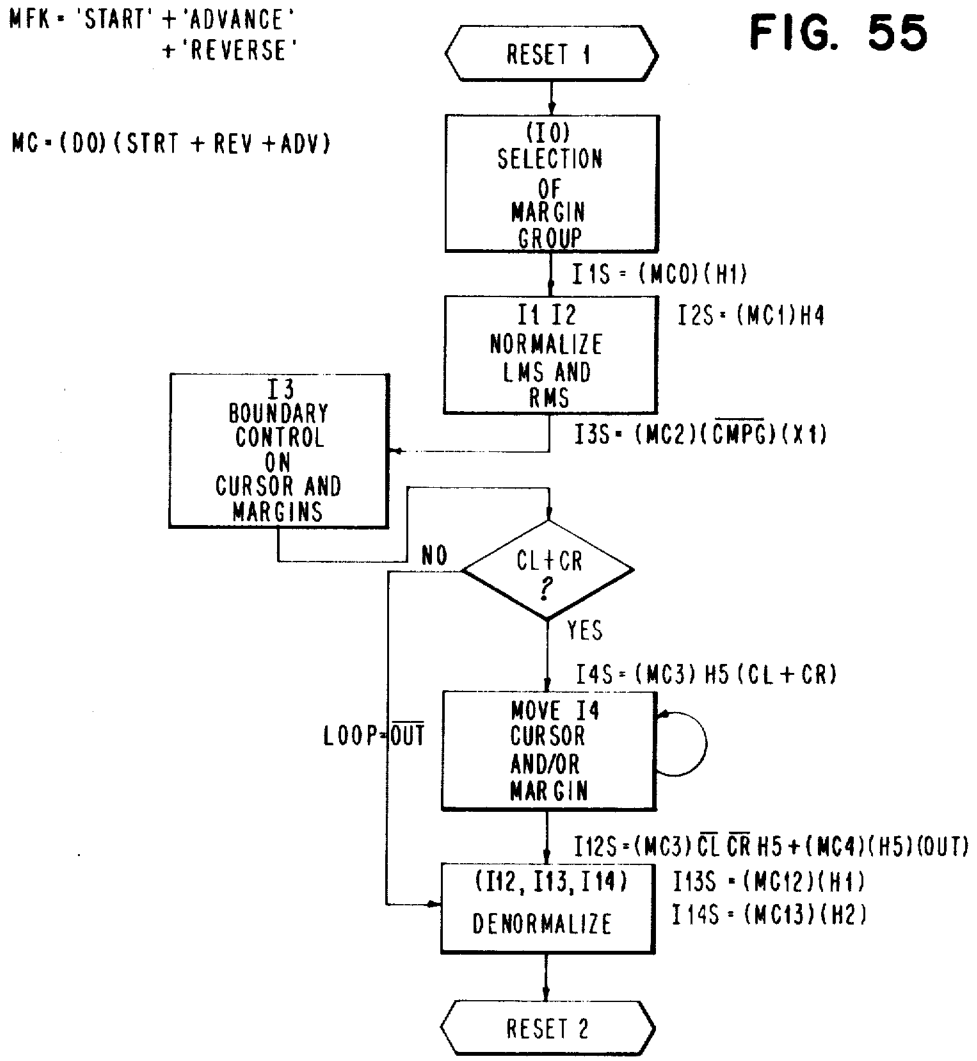

FIG. 55 is a detailed machine state flow diagram of the margin control operation.

FIGS. 56, 57, 58, 59 and 60 are flow diagrams of the system operation during margin control operations.

Figure 61:
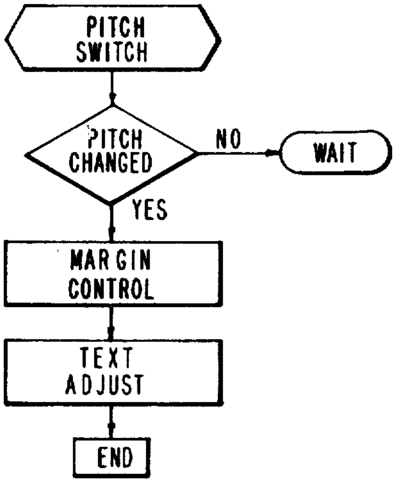

FIG. 61 is a machine state flow diagram of a switch the pitch operation.

Figure 62:
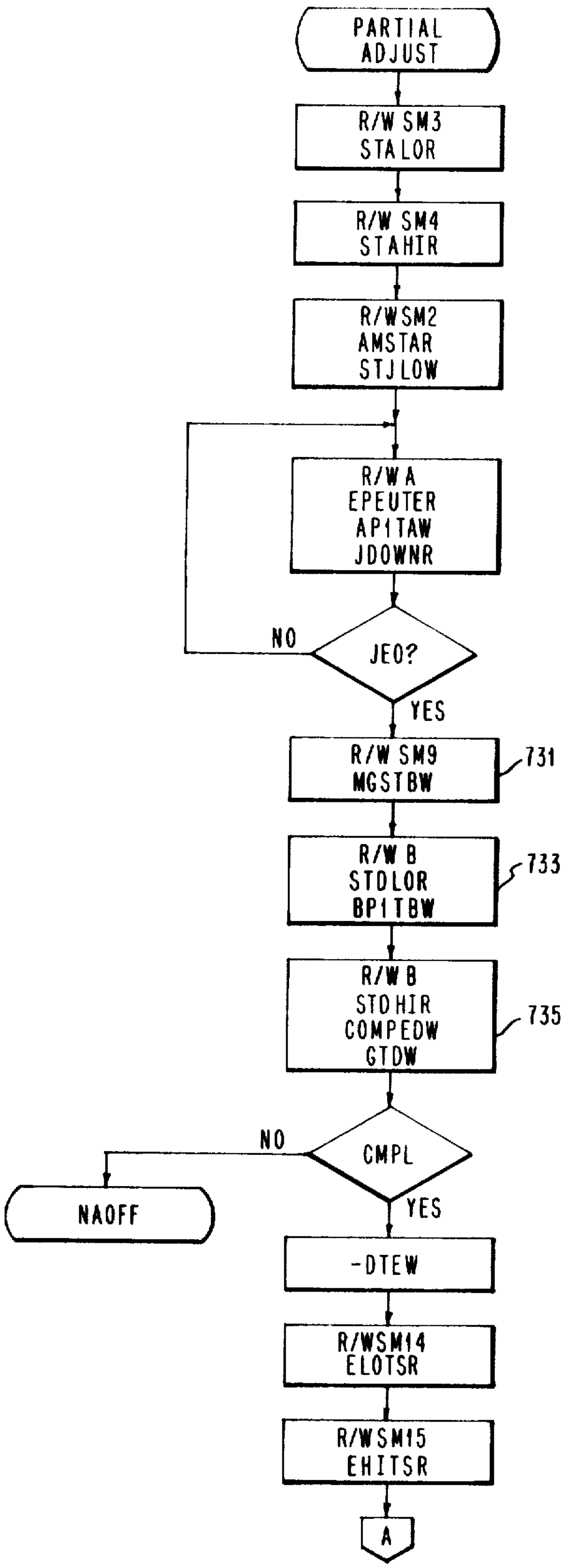
Figure 63:
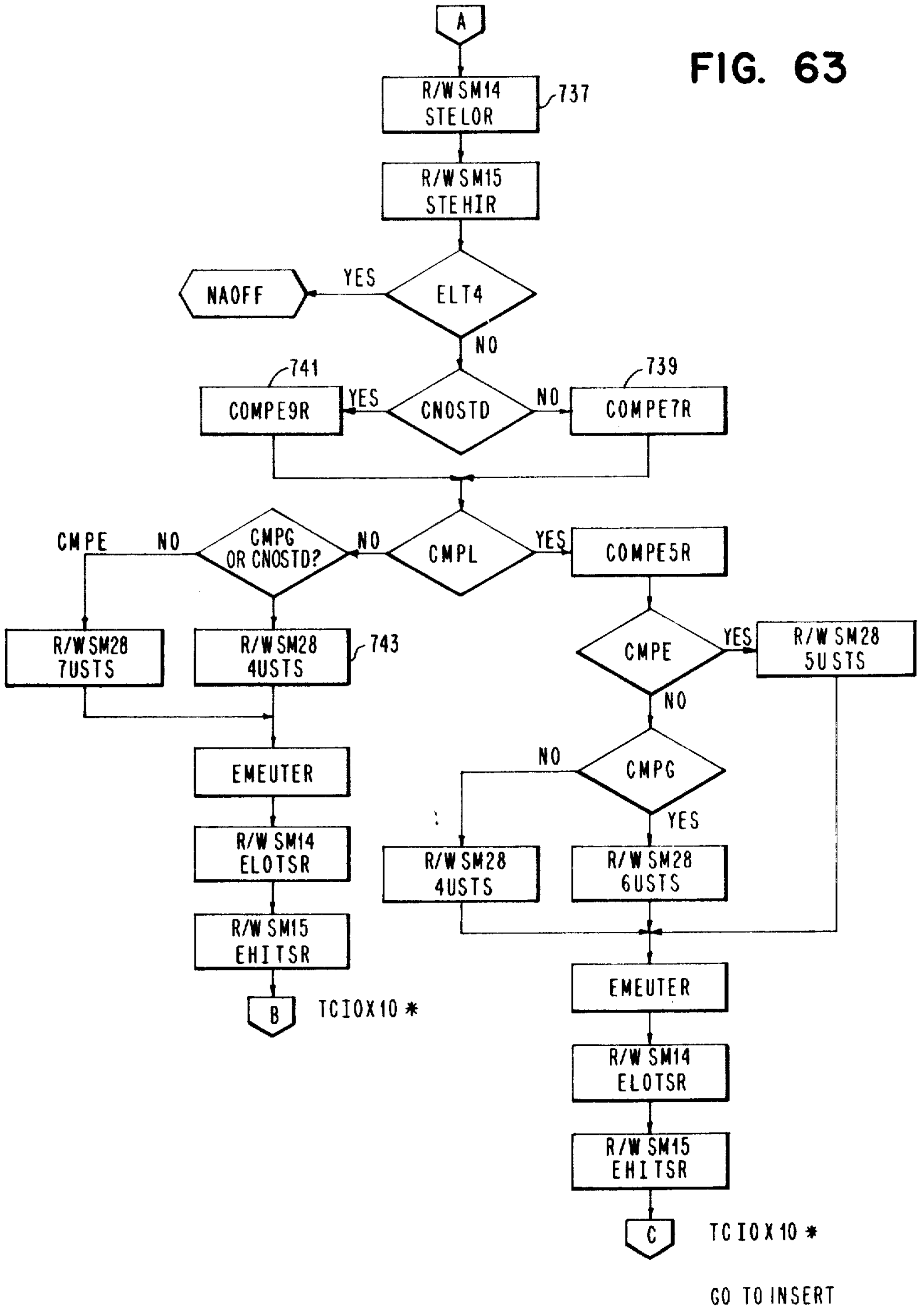

FIGS. 62 and 63 are flow diagrams of the system operation during partial adjust operations.

Figure 1:
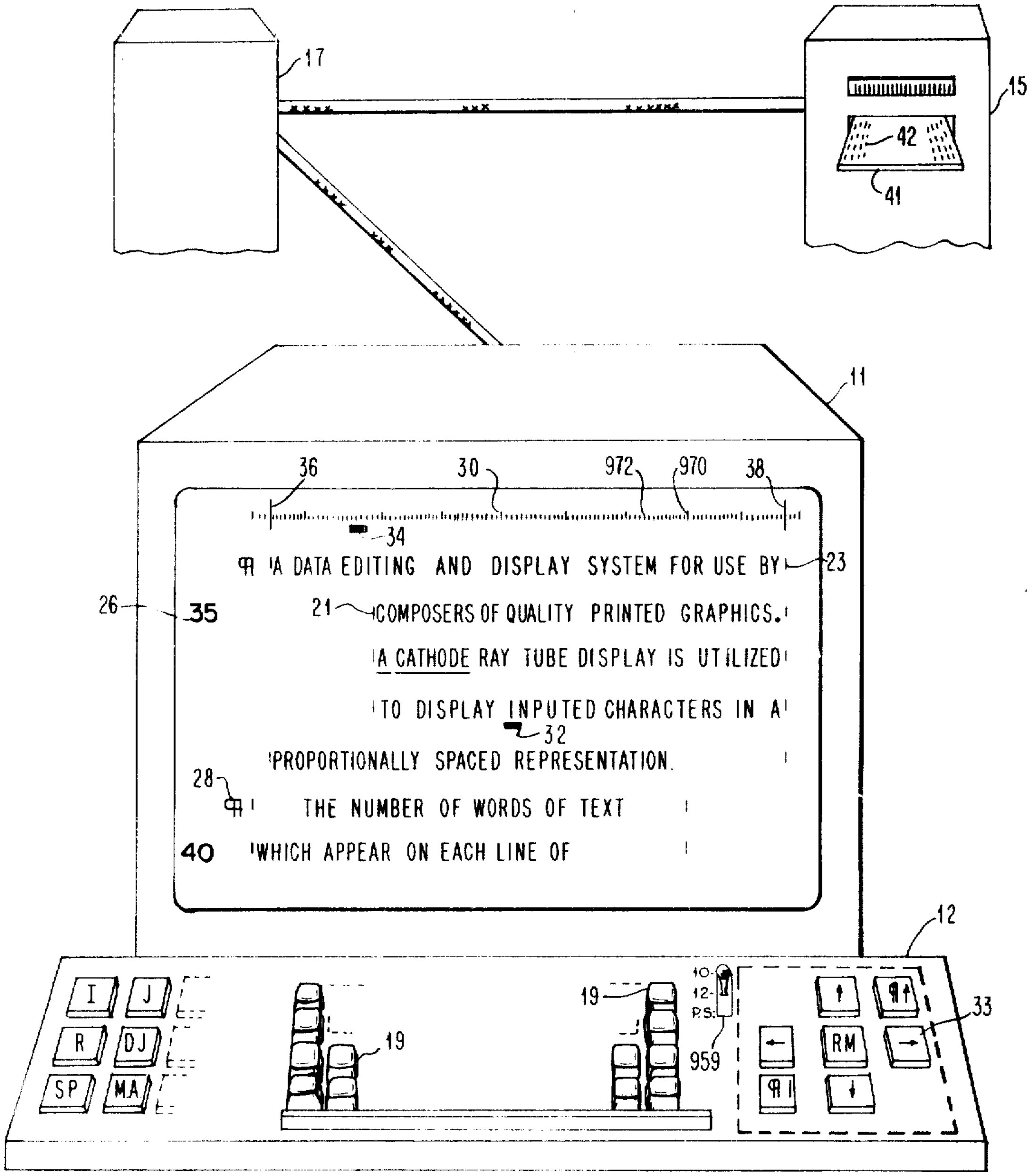
FIG. 1 is a pictorial illustration of the visual editing system incorporating selectable letter spacing display and associated scale display.

Referring now to FIG. 1 of the drawings, the visual editing system incorporating selectable letter spacing display and associated scale display of the present invention is depicted. The system comprises a display unit 11, a control and typewriter keyboard 12, a magnetic card reader recorder unit 15, and a processor 17. Information is entered into a bulk text storage unit (not shown) of the processor 17 from the magnetic card unit 15 or from selected keys 19 of the control and typewriter keyboard 12. Information thus entered into the bulk text storage unit of the processor is processed in accordance with its information content and displayed on the display unit 11. The information thus displayed is either in a proportional space display or in a standard space display. That is, when proportional space display is specified, each character is assigned an escapement value in accordance with its width. In standard display each character is assigned the same escapement value. The processor 17 calculates the number of escapement units of each character in accordance with the type of display specified and optimizes the number of words of characters which appear between the left margin boundary 21 and the right margin boundary 23 of each line of display. In the illustration, fewer words than normally fit on a line are depicted due to space and legible letter size requirements. Additionally, it should be noted that only uppercase characters are depicted although the system can display both uppercase and lowercase characters.

The processor determines which lines of the page are being displayed and effects the display of line numbers 26 to facilitate the operator in locating a specific portion of the text. Additionally, a special paragraph mark 28 is displayed adjacent to those lines on which a new paragraph is started. As will be described hereinafter, the word optimization operation proceeds on a paragraph basis. That is, words which are pushed off of one line of display become the first word of the next line of display unless that next line is the beginning of a new paragraph. In this case, the pushed off word is placed on a newly created line located between the optimized line and the first line of the new paragraph. In a similar manner, words are drawn up page when there is sufficient blank space at the end of the line unless the word is the first word of a new paragraph. When blank lines are thus created, they are deleted from the display.

A scale 30 may be displayed adjacent to the text characters. This scale enables the operator to determine in inches the width value of a line displayed. This information is utilized when the data displayed is later outputed to the printer. The set of scales which are displayed are determined in accordance with whether the operator has specified standard spacing or proportional spacing. If the operator specifies standard spacing, the operator has the further option of specifying a 10-pitch scale or a 12-pitch scale. That is, each data character displayed has the same number of escapement units when standard spacing is specified. A scale 30 is then displayed adjacent to the characters showing that each 10 characters of displayed information will take up one inch when printed on a 10-pitch machine. Alternatively, a 12-pitch scale can be displayed showing that 12 displayed characters will take up an inch when printed on a 12-pitch printer. When the operator specifies proportional spacing, a scale is displayed showing that 72 escapement units comprise an inch. The character "M" may be assigned an escapement value of nine escapement units while the character "i" may be assigned the escapement value of four units. Each such character displayed takes up an amount of space proportional to its escapement value. The scale 30 may be located adjacent to the displayed characters to show that every 72 such escapement units of displayed characters will result in an inch of printed material.

An additional operation enables the operator to display the scale 30 adjacent to the text, and specify a left margin location to the right of a character indicated by the cursor mark 32. Thereafter, by depressing the keybutton on the control keyboard, the character adjacent to the cursor is aligned with the left margin location displayed. A number of space characters are inserted between the character located to the left of the cursor mark 32 and the new position of the character adjacent to the cursor. This operation enables columns to be aligned and hanging indent format to be realized when switching from standard to proportional space display and vice-versa.

It should be noted that the display of the scale 30 is a special operation which supersedes the display of the first line of text characters. Scales are displayed only when the operator specifies their display when setting up the various margins and formats utilized.

As has been described, a representation of the left margin boundary 21 and a representation of the right margin boundary 23 is displayed for each line of display. These margin boundaries are specified by the operator. That is, the operator can insert up to 16 different sets of margin boundaries into the processor 17. Thereafter, the operator specifies which set of margin boundaries should be associated with the various display lines. The operator initially sets up the margin boundaries by effecting a display of the scale and thereafter placing the special cursor mark 34 adjacent to the left margin boundary 36 or to the right margin boundry 38. Movement of the special cursor mark as controlled by the cursor motion keyboard 33 causes the margins to be moved inward or outward in accordance with the desire of the operator. Once the margin is placed at the desired location, the operator then can effect the display of the next set of the 16 different sets of margin boundaries and effect their change.

The following general description relates to the overall configuration and operation of the processor 17 and the manner in which it controls the display device 11, the card reader-recorder unit 15, and the control and typewriter keyboard 12 while simultaneously performing text control operations to effect display of the optimum number of words on each line of the display in accordance with the width values of the characters and in accordance with the mode of display specified. Thereafter follows a description of the system operations when effecting the display of scaler information, the operation of the system when changing from proportional pitch display to standard pitch display and vice versa, the operation of the partial adjust operation, and finally a description of the entry of margin group information into the processor 17.

Figure 2:
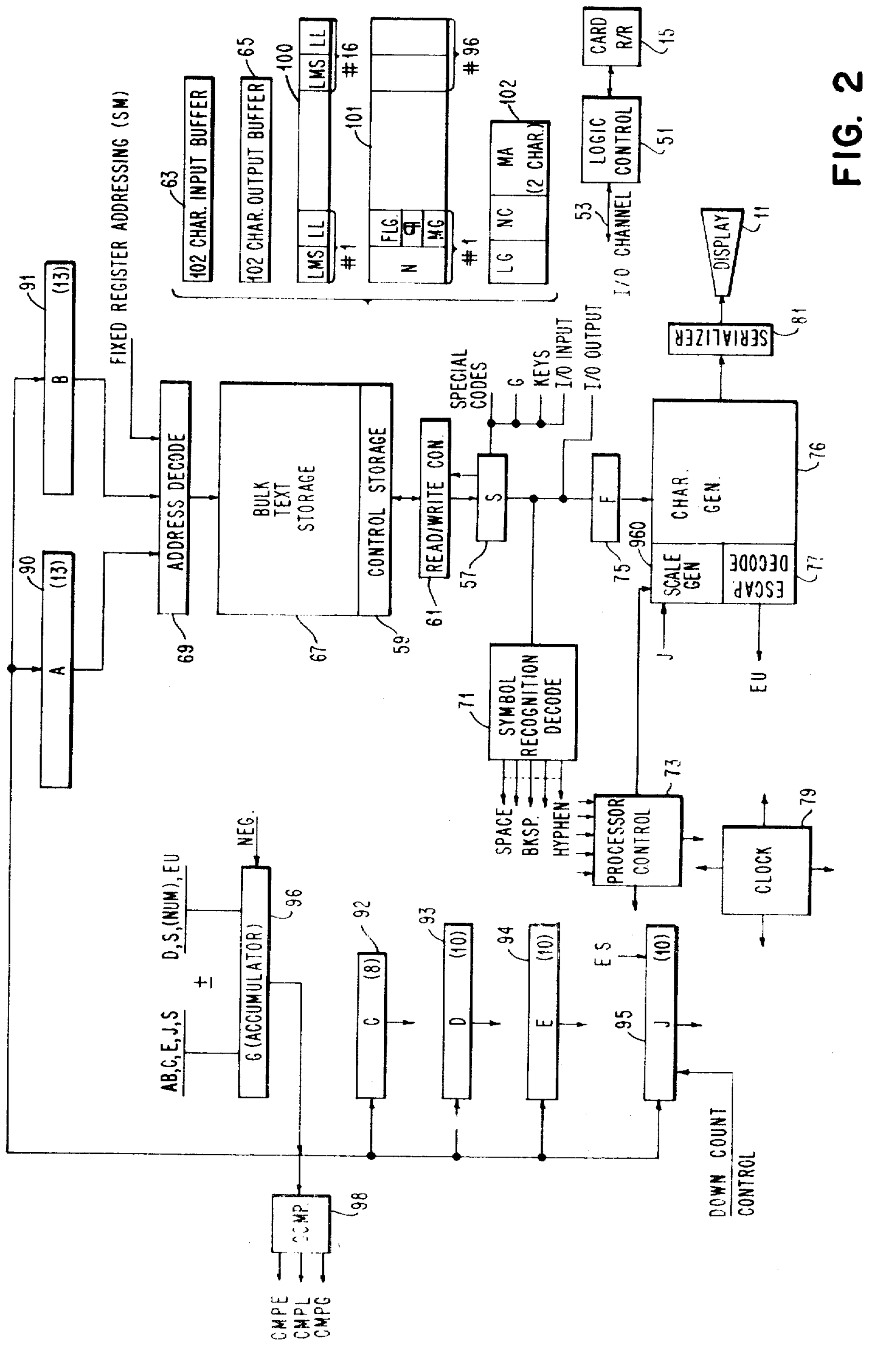
FIG. 2 is an overall block diagram of the data editing system.

Referring now to FIG. 2 of the drawings, an overall block diagram of the data editing system of the present invention is depicted. As has been described, bulk text is inputed into the system from the card reader-recorder 15. Information sensed by the card reader-recorder is gated under the control of logic control unit 51 through the input/output channel 53 to the sense register 57 of the data editing system. Characters thus read-in are gated from the sense register 57 to the control storage 59 under the control of read-write control 61. The control storage 59 includes a 102-character input buffer 63 and a 102-character output buffer 65. Characters which are accumulated in the input buffer 63 are transferred to the bulk text storage unit 67 at adjacent bulk text storage addresses defined by the address register decode 69. As the characters are transferred from the input buffer 63, they are gated first to the sense register 57 and decoded by the symbol recognition decode 71 which indicates the type of text character, such as a space code, backspace code, hyphen, etc., that has been received. The processor control 73 is responsive to the symbol recognition decode 71 to effect placement of the symbol in the bulk storage or to cause symbol to be deleted from the data stream which is transmitted to the bulk storage 67. Alphabetic and numeric character symbols which are received are all placed in the bulk text storage while typewriter function codes, input/output control codes and other special symbols are not stored in the bulk text storage. The processor control 73 is responsive to these special codes, however, to effect proper system response. Additionally, the processor control 73 is responsive to the text alphabetic and numeric characters received to determine their escapement value and placement within a line of displayed text as will be described hereinafter. The primary function of the processor during this latter operation is to optimize the number of text words which appear on the displayed lines of text storage. These words are optimized in accordance with the boundaries for the displayed lines which are defined by the system operator.

After the information in the 102-character input buffer 63 has been transferred to the bulk text storage 67, the logic control unit 51 initiates further input from the card reader-recorder 51 to the character input buffer. During this input operation the characters which have been received in the bulk text storage are displayed on the display unit 11. Display is effected on a time interleaved basis with the input of characters from the I/O channel. Thus, characters are gated to the sense register 57 and thence to the F-register 75. The character located in the F-register is decoded by the escapement decode 77 which provides an output signal indicating the number of scan lines for the particular character. Additionally, the clock 79 provides clocking signals to the character generator which effects the generation of a unique pattern associated with each scan line of each character. This pattern is serialized by the serializer unit 81 which controls the display 11 in a conventional manner. Such operation is generally described in the aforereferenced copending application of Paul E. Goldsberry et al. Once the complete character has been displayed as discovered by comparing the value of the escapement decode with the scan line being processed in the character generator, the next character to be displayed is transferred from the sense register 57 to the F-register 75.

A plurality of registers are associated with the processor and are utilized to perform various arithmetical, addressing and storing functions. As described heretofore, as each character is inputed into the storage unit, it is examined to determine its escapement value and groups of characters are examined to determine the optimum number of words of characters that can fit onto a display line. The registers are utilized to perform the arithmetic operations necessitated by this process. These registers include the A-register 90 and the B-register 91 each of which are 13-bit trigger registers used primarily to address characters in the bulk text storage unit 67 and to the control storage unit 59. The C register 92 is an eight-bit trigger register primarily utilized to count the number of characters on a display line. The D-register 93 is a 10-bit general purpose trigger register utilized for various functions, such as storing the horizontal position of the cursor symbol. The E-register 94 is a 10-bit trigger register primarily utilized to hold the weight in escapement units of a line of displayed characters. The J-register 95 is a 10-bit trigger reverse counter. It is used for various functions such as escapement unit computation and display of margin boundary definitions on the display unit. The G-accumulator 96 is a 13-bit accumulator. The contents of two of the registers 90–95 as well as the contents of the sense register 57 and the output of the escapement decode 77 can either be added or subtracted by the accumulator. The compare unit 98 is responsive to the accumulator to detect a zero condition and the borrow from the high-order bit during a subtract operation to indicate a compare less (CMPL), a compare greater (CMPG), or a compare equal (CMPE).

As has been previously described, the operator can select the margin boundaries for each displayed line and the inputed text is conformed to these boundaries. In order to facilitate processing the text information and to assure that the optimum number of words appear between the selected but variable text boundaries, certain factors are retained in the control storage and accessed under special gating control. In one such storage "register" of the control storage 59, register 100, operator-selected left margin boundaries and corresponding line lengths are stored. In the particular configuration described, the operator can select up to 16 sets of left margin boundaries and corresponding line lengths. Thereafter, the operator can specify one of the sets of left margin and line length information for each of the 96 lines of display. Thus, the operator could enter 16 successive left margin positions and corresponding line lengths. Of course, the specification of the left margin and line length necessarily effect placement of the right margin boundary. Thereafter, the operator can specify, for example, that the first three lines of display are associated with first group of margin boundaries, the next three lines with the second group, the next five lines with the third group, the next eight lines with the first group, the next 10 lines with the 15th group and so on, the number of successive lines associated with the group and the sequence of selection of the group being left to operator determination.

Register 101 also located in the control storage 59 retains information associated with each of the 96 lines of display. For each line of display, the register contains information as to the number of characters in the displayed line (N), the margin group associated with that line corresponding to the margin groups 1–16 in register 100 (MG), whether the line is associated with the beginning of a new paragraph of text information (paragraph mark), and a special flag bit (FLG) utilized for output operations. Each of the 96 lines of the display have these factors associated therewith and stored in the register 101 located in the control storage 59.

Additional factors are stored in register 102 of the control storage 59 relating to the location of the cursor with respect to the characters in the text storage 67. The line of display on which the cursor is located is stored in the register 102 (LG), the number of characters to the left of the cursor in that line is stored in the register 102 (NC), and the memory address in the bulk text storage of the character associated with the cursor mark is stored (MA). These factors along with the line factors retained in register 101 and the margin boundary format information contained in register 100 are utilized and revised during word optimization operations and display operations as will be described hereinafter.

In order to understand the overall sequential operation of the system and the operation of the processor control 73, it is first necessary to have an understanding of the basic timing involved in the system. Thus, the following is the description of the clock 79 which sets up various control times which are utilized to control the gating of information through the processor control 73 and from the bulk text storage 67 to and from the various registers described above. Referring now to FIGS. 3*a*, 3*b*, and 3*c*, a timing diagram of the various logical states of the clock 79 are depicted. The clock 79 of FIG. 2 consists of a plurality of bistable devices which gate one another to provide output signals. Each of the waveforms of FIG. 3 represents the output of one such bistable device. Outputs T1–T10 of FIG. 3A are utilized to define dot times one through 36. Thus, each of the dot times labeled 1–36 in FIG. 3A is defined by a unique combination of output signals T1–T10. The dot times are utilized primarily to effect display of characters on the display unit 11 of FIG. 2. For example, during the first three dot times the electron beam is blanked and deflected to the start of a scan line sweep. During the next 15 dot times, the electron beam is selectively unblanked under the control of the character generator to provide a vertical row of up to 15 illuminated dots thereby forming a segment of a displayed character. The 19th through 21st dot times are utilized to blank the beam and effect its motion to the start of the next scan line. The next scan line is effected during dot times 22–36. Thus, two scan lines of a character are displayed during a dot clock interval.

The terms which cause the output of T1 to go positive, or the set terms for T1, are located to the right of the waveform. Additionally, the terms which cause T1 to go negative, or to reset, are also located to the right of the waveform. Thus, T1 is set when both T9 and T0 are down and reset when T9 and T0 are up. T0 is generated by a master oscillator. In a similar manner, each of the set and reset terms for the clocks T1–T11 are defined to the right of the waveform.

As has been described, the clock 79 of FIG. 2 is also utilized to control access to storage, and gating of the various registers. Thus, time T10 defines the read and write cycles of the storage unit which includes the control storage 59 and the bulk text storage 67 of FIG. 2. Time interval T11 defines the first accumulator gate signal. Time interval T12 defines the second accumulator gate signal. Time intervals T19 and T20 define the sample pulses for the accumulator. The memory is read when there is a coincidence of a first current, a second current, a strobe signal, and a gating signal. These signals are defined as input to memory signals. Additionally, when writing information into the storage units, a write current and an inhibit current must be supplied which are further defined as inputs to memory. Time intervals T13 and T14 define those time intervals during which control latches may be set. A reset signal is provided to reset the sense registor 57 of FIG. 2.

In FIG. 3*c*, the read and write cycles of storage as defined by T10 have been drawn to a different scale. Each read and write cycle defines an H-cycle as noted by T15. Up to 16 different H-times can be defined by the output signals T15–T18.

Summarizing, the clock 79 of FIG. 2 provides output signals which control the scan rate of the cathode-ray tube display and control various processor functions. A series of H-times are defined, each of which consists of a read/write cycle, and two accumulator cycles. Additionally, sample pulses are provided to properly time the access to the contents of various registers. A typical H-cycle is depicted in FIG. 4 of the drawings.

Referring now to FIG. 5 of the drawings, the relationship of the H-clock and an overall machine operation is depicted. The terminology "machine operation" refers to an operation such as a word optimization operation, a display frame operation, a data input operation, etc. Each such operation is in turn defined by a unique sequence of an I-clock. Thus, for the hypothetical operation depicted, the I-clock steps from states I0 to state I2, I6, and thence to I1. At the completion of step I1, the operation is complete. Each I-state is in turn defined by a plurality of H-states defined by the H-clock. Thus, I0 is defined by H-states 0–8 while state I2 is defined by H-states 0–5. As described above, during each H-state, a read/write cycle is effected. Thus, nine read/write cycles of the storage unit are effected during clock time I0.

Referring now to FIG. 6 of the drawings, a block diagram depicting portions of the clock 79 and the processor control 73 of FIG. 2 are depicted. The clock circuit depicted in FIG. 6 comprises the H-clocks 115 and the I-process counter 117. The H-clocks 115 comprise a series of bistable devices, the timing for which has been described with respect to FIGS. 3–5. The H-clocks count successively from an H0 state to an H15 state. The counting can be terminated at any point and the counter reset to its H0 state. Additionally, the counter can continuously cycle through four sets of four states. For example, the counter can cycle from H0 to H3 back to H0 and up to H3 or from H4 through H7 and back to H4.

The I- or process-counter 117 consists of a plurality of bistable devices and generally counts in a forward direction. However, the branch control steering unit 119 can cause the I-counter to permute to any I-state. The branch control steering 119 is in turn responsive to machine conditions such as the status of the H-clocks 115, the overall operation to be performed, the state of the combinational logic, etc. Thus, the I-counter functions as the interal program counter of the device. In a similar manner, the H-clocks 115 are controlled by branch control steering unit 121 which is also responsive to machine conditions and to the sequential advance of the basic clock. A further machine state denoted "X10" is utilized to further define the I-states.

Control operations are initiated through the control and typewriter keyboard unit 12 and through the logic control unit 51 which provides a signal indicative of the status of the I/O unit. The operation control unit 123 is responsive to the operation initiation to define the overall control operations to be effected.

The processor control 73 of FIG. 2 consists in part of a program step definition and generation unit 125 and an encode unit 127. Each of these units consists of a plurality of combinational circuits as will be described. The program step definition and generation unit 125 is responsive to the H-clocks 115, the I-counter 117, the operation control unit 123 and various machine conditions to sequentially generate various processor commands which effect the programming of the overall system. The encode unit 127 is responsive to the program step definition and generation unit 125 to provide gating signals which control the data flow through the processor depicted in FIG. 2. For example, the program step and definition generation unit 125 provides an output signal during certain machine operations to take the contents of the A-register depicted in FIG. 1, add 1 to it, and transfer the result to the A-register during a read time interval. This output command is graphically defined as "AP1TAR" or A +1 to A at read time. The encoding unit 127 is responsive to this command to gate the contents of the A-register to the accumulator, gate a one bit to the accumulator, and transfer the result of the operation back to the A-register. These lines are graphically depicted as "ATG" or A to G, "BIT1TG" or bit 1 to accumulator, "GHITA" or accumulator high to A-register, and "GLOTA" or accumulator low to A-register. Additionally, further terms defining the address of the bulk text storage unit 67 and the control storage unit 59 of FIG. 2 are provided by the encode unit 127. Thus, the term "R/WA" or read/write bulk text storage at the address indicated by the A-register is provided. The term "R/WSM" denotes that the special memory portion of the control storage is read and written at the address defined by the fixed register addressing. The additional clock input defining a read cycle and a write cycle is provided to the encode unit 127.

Referring now to FIG. 7 of the drawings, a detailed diagram depicting the combinational circuits utilized to effect the addition of one to the contents of the A-register is depicted. Additionally, various ones of the registers depicted in FIG. 2 and the data paths between these registers are further shown.

As has been described, certain machine conditions initiate various programming step operations. In the example shown in FIG. 7, a text control or word optimization operation, TC, initiates the addition of one to the contents of the A-register at a particular time in the operation, namely, when the I-counter is in a one state, when the X10 counter is on (TC I1X10) and when the H-clock in a two state. At this time, if the general purpose indicator X1 is on and the word decoded from the sense register is a space ("SESPACE"), the AND-gate 131 provides an output signal to the OR-gate 133 which in turn provides an output signal indicating that one is to be added to the contents of the A-register and that the result will be stored in the A-register at a read time interval. This line is connected to OR-gates 135 and 137. OR-gate 137 provides an output signal indicating that a one bit is to be gated to the accumulator at read time. This output signal is ANDED with clock time T11 by AND-gate 139 and gates the OR-gate 141 to provide an output signal effecting the transfer of a one bit to the accumulator. In a similar manner, the output of the OR-gate 135 it utilized to gate OR-gates 143, 145, and 147. OR gate 143 provides an output signal indicating that the contents of the A-register are to be transferred to the G-register at read time which signal is ANDED by AND-gate 149 with clock interval T11 and provided to OR-gate 151 to cause the contents of the A-register to be transferred to the accumulator. The output signal of the OR-gate 145 is utilized to gate the contents of the high side of the accumulator to the A-registor. The AND-gate 153 insures that the operation is effected at clock time T19 which insures that the addition is complete. In a similar manner, the OR-gate 147 causes the OR-gate 155 to generate an output signal at clock time T19 to gate the contents of the low side of the accumulator to the A-register.

Summarizing, the combinational logic causes a one bit to be written into the accumulator at clock time T11 and effects a signal which gates the A-register to the accumulator at clock time T11. Additionally, at clock time T19, the contents of the high side and low side of the accumulator are gated back to the A register. Referring to the accumulator 96, it can be seen that the gating term provided at the output of the OR-circuit 141 is provided to the GB side input of the accumulator. Additionally, the output signal of the OR-block 151 causing the contents of the A-register to be gated to the accumulator 96 is provided to the GA side of the accumulator. Further, the 13 bits located in the A-register 90 are connected to the accumulator 96 in a parallel manner. These 13 bits are gated into the accumulator when the "ATG" gating signal is provided. Additionally, a one bit is gated into the accumulator when the "-BIT1TGB" line goes positive. Thereafter, an accumulator cycle is effected wherein the contents of the A-register and the one bit are added together. The addition operation is specified by the output signal of the OR-block 133.

Once the addition operation is complete, the output of the accumulator is thereafter gated back to the A-register. In a similar manner, the B-register 91, the C-register 92, and the D-register 93 are connected into the accumulator as depicted and the accumulator is connected into them as depicted. Each of these lines have similar gating terms which are generated by combinational logic (not shown).

As is appreciated by those skilled in the art, the combinational circuits utilized to define the program steps and to effect the generation of the program by gating the various registers and the control storage and bulk text storage are great in number. Some of the additional gating terms of this additional logic have been placed on the block diagram of FIG. 7. In order to describe the overall operation of the system, all of the control logic and combinational circuits utilized could be depicted. However, since such a representation could lead to unwanted complexity in the description of the preferred embodiment of the device, the operation of the system will be described by the utilization of flow chart diagrams. These flow chart diagrams define the operation of the device in terms of the data flow between the various registers and in terms of the system timing. Thus, block 146 of FIG. 8 would be utilized in a flow diagram description of the system operation to indicate that at clock interval time H2, the contents of the A-register are transferred to the accumulator, a one bit is transferred to the accumulator, the contents of the high portion of the accumulator are transferred to the A-register and that the contents of the low portion of the accumulator are transferred to the A-register.

Prior to entering into a description of the flow diagrams and operation of the machine, the following is a glossary of terms is utilized in the flow diagrams. These terms refer to the various registers and timing conditions which have been described with respect to FIGS. 2–7.

GLOSSARY

General Purpose Indicators

L1, L2, L3, L4, L5, L6 (latches)
X1, X2, X3, X4, X10, (triggers)
Operation Latches

| | | |
|---|---|---|
| CR | Cursor Right | |
| CL | Cursor Left | |
| CD | Cursor Down | |
| CU | Cursor Up | |
| DLTE | Delete | |
| DEJSY | Dejustify | |
| UNSCR | Underscore | |
| TRANS | Transpose | |
| JUST | Justify | |
| PU | Paragraph Up | |
| PD | Paragraph Down | |
| FADJ | Full Adjust | |
| HYP | Hyphen | |
| STRT | Start | Margin Control |
| REV | Reverse | Margin Control |
| ADV | Advance | Margin Control |
| FEED | Feed | Card I/O |
| READ | Read | Card I/O |
| REC | Record | Card I/O |

A register Decode (NOTE: The contents in each register are referred to by the name of the register.)

| | |
|---|---|
| AEEOM | - A Equals the End of Memory |
| AE0 | - A Equals Zero |
| AE53 | - A Equals 53 |
| AE71 | - A Equals 71 |

B Register Decode

| | |
|---|---|
| BEEOM | - B Equals the End of Memory |
| BEEOTBF | - B Equals the End of the Output Buffer |
| BE4 | - B Equals 4 |
| BEPFULL | - B Equals Page Full (Line 96) |
| BEEOFG | - B Equals the End of the Format Groups |
| BEBIHZ | - B Equals B in Hot Zone |
| BLT2 | - B Less Than 2 (Top Line) |
| BGTPFULL | - B Greater than Page Full |

C Register Decode

| | |
|---|---|
| CE0 | - C Equals 0 |

E Register Decode

| | |
|---|---|
| EE0 | - E Equals Zero |
| ELT4 | - E is Less than 4 |
| ELT6 | - E is Less than 6 |
| ELT8 | - E is Less than 8 |

S (sense register) Decode

| | |
|---|---|
| SESPACE | - S Equals 4 Unit Regular Space |
| SECR | - S Equals Carrier Return |
| SECODEDCR | - S Equals Required Carrier Return |
| SERCR | - S Equals Required Carrier Return |
| SEIR | - S Equals Index Return |
| SESPSPACE | - S Equals Special Space (Indented Format) |
| SEHYP | - S Equals Hyphen |
| SECRFLAG | - S Equals Cursor Flag |
| SETRKLK | - S Equals Track Link |
| SECDFN | - S Equals Card Finish (Card Repeat or Card Eject) |
| SE4USPSPACE | - S Equals 4 Unit Special Space |
| SE1UBS | - S Equals 1 Unit Backspace |
| SETAB | - S Equals Tab |
| SEINDEX | - S Equals Index |
| SE96L | - S Equals Line 96 |
| SE0 | - S Equals Zero |
| SGT130 | - S is Greater than 130 |

Processor Commands

| | |
|---|---|
| APDTAW | = A Plus D to A at Write Time |
| AMSTAR | = A Minus S to A at Read Time |
| AP1TAR | = A Plus 1 to A at Read Time |
| AM1TAR | = A Minus 1 to A at Read Time |
| AM1TAW | = A Minus 1 to A at Write Time |
| APSTAR | = A Plus S to A at Read Time |

AMDTAR = A Minus D to A at Read Time
AP1TADW = A Plus 1 to A & D at Write Time

AMDTSR = A Minus D to S at Read Time
ALOTSR = A Low to S at Read Time (Low 8 Bits)
AHITSR = A Hi to S at Read Time (High 5 Bits)
AMSTAW = A Minus S to A at Write Time
AP9TAR = A Plus 9 to A at Read Time
AP12TAR = A Plus 12 to A at Read Time
APSTAW = A Plus S to A at Write Time
APSTBW = A Plus S to B at Write Time
ATEW = A Plus O to E at Write Time
ATBW = A to B at Write Time
ATADW = A Plus O to A & D at Write Time BP1TBW = B Plus 1 to B at Write Time
BM1TBW = B Minus 1 to B at Write Time
BM2TBW = B Minus 2 to B at Write Time
BP3TBW = B Plus 3 to B at Write Time
BP4TBR = B Plus 4 to B at Read Time
BM4TBR = B Minus 4 to B at Read Time
BM3TBW = B Minus 3 to B at Write Time
BP2TBW = B Plus 2 to B at Write Time
BM1TBR = B Minus 1 to B at Read Time
BM2TBR = B Minus 2 to B at Read Time
BHITSR = B High (High 5 Bits) to S at Read Time
BLOTSR = B Low (Low 8 Bits) to S at Read Time
BMDTDW = B Minus D to D at Write Time COMPESR = Compare E to S at Read Time
COMPEDW = Compare E to D at Write Time
COMPESW = Compare E to S at Write Time
COMPE7R = Compare E to 7 at Read Time
COMPCDR = Compare C to D at Read Time
COMPE5R = Compare E to 5 at Read Time
COMPC5R = Compare C to 5 at Read Time
COMPC3R = Compare C to 3 at Read Time
COMPC4R = Compare C to 4 at Read Time
COMPE0R = Compare E to Zero at Read Time
COMPJSR = Compare J to S at Read Time
COMPC1R = Compare C to 1 at Read Time
COMPADR = Compare A to D at Read Time
COMPBDW = Compare B to D at Write Time
COMPEDR = Compare E to D at Read Time
CMPMTDW = Zero Minus D to D at Write Time
COMPADW = Compare A to D at Write Time
COMPEEUER = Compare E to EU and do an E Minus EU to E at Read Time
CMPCLR = Reset the Compare Triggers CMPG = Result of the Compare is Compare Greater
CMPL = Result of the Compare is Compare Less
CMPE = Result of the Compare is Compare Equal
CP1TCW = C Plus 1 to C at Write Time
CP1TCR = C Plus 1 to C at Read Time
CP2TCR = C Plus 2 to C at Read Time
CM1TCW = C Minus 1 to C at Write Time
CMDTSR = C Minus D to S at Read Time
CM1TCR = C Minus 1 to C at Read Time
CM4TCW = C Minus 4 to C at Write Time
CP1TER = C Plus 1 to E at Read Time
CPDTEW = C Plus D to E at Write Time
CTDR = C Plus 0 to D at Read Time
CTDW = C Plus 0 to D at Write Time
CTSR = C Plus 0 to S at Read Time DPCTDW = D Plus C to D at Write Time
DLOTSR = D Lo (Low 8 Bits) to S at Read Time
DHITSR = D Hi (High 2 Bits) to S at Read Time
DTEW = D Plus 0 to E at Write Time
DP4TDR = D Plus 4 to D at Read Time
DTAR = D to A at Read Time
DP1TDW = D Plus 1 to D at Write Time
DP1TDR = D Plus 1 to D at Read Time
DPEUTBDR = D Plus EU to B & D at Read Time EP1TER = E Plus 1 to E at Read Time
EM1TER = E Minus 1 to E at Read Time
EP1TEW = E Plus 1 to E at Write Time
EM1TEW = E Minus 1 to E at Write Time
EM4TEW = E Minus 4 to E at Write Time
ELOTSR = E LO to S at Read Time
EHITSR = E HI to S at Read Time
EMDTEW = E Minus D to E at Write Time
EPEUTER = E Plus EU to E at Read Time
EMEUTER = E Minus EU to E at Read Time
EMDTSR = E Minus D to S at Read Time
ETJ = E Plus O to J GTAR = Accumulator to A at Read Time
GTAW = Accumulator to A at Write Time
GTBR = Accumulator to B at Read Time
GTBW = Accumulator to B at Write Time
GTCR = Accumulator to C at Read Time
GTCW = Accumulator to C at Write Time
GTDR = Accumulator to D at Read Time
GTDW = Accumulator to D at Write Time
GTER = Accumulator to E at Read Time
GTEW = Accumulator to E at Write Time

| | |
|---|---|
| JDOWNW | = Count J Down at Write Time |
| JDOWNR | = Count J Down at Read Time |
| JTDR | = J Plus O to D at Read Time |
| KTS | = Keyboard Latches to S |
| STALOR | = S to A Low (Low 8 Bits) at Read Time |
| STAHIR | = S to A Hi (High 5 Bits) at Read Time |
| STBLOR | = S to B LO (Low 8 Bits) at Read Time |
| STBHIR | = S to B HI (High 8 Bits) at Read Time |
| STDLOR | = S to D LO at Read Time |
| STDHIR | = S to D HI at Read Time |
| STELOR | = S to E LO at Read Time |
| STEHIR | = S to E HI at Read Time |
| STGLOR | = S to G LO at Read Time |
| STGHIR | = S to G HI at Read Time |
| STJLOW | = S to J LO at Write Time |
| STJHIW | = S to J HI at Write Time |
| STCR | = S to C at Read Time |
| SPJTDR | = S Plus J to D at Read Time |
| SP1TSR | = S Plus 1 to S at Read Time |
| SP1TDR | = S Plus 1 to D at Read Time |
| SP2TSR | = S Plus 2 to S at Read Time |
| INBFSTBW | = Input Buffer & S to B at Write Time |
| OTBFSTBW | = Output Buffer & S to B at Write Time |
| LGSTBW | = Line Group & S to B at Write Time |
| LGSTAW | = Line Group & S to A at Write Time |
| LGSP1TBW | = Line Group & S Plus 1 to B at Write Time |
| FGS2TBW | = Format Group & S Plus 2 to B at Write Time |
| FGSTBW | = Format Group & S to B at Write Time |
| LGTBW | = Line Group to B at Write Time |
| R/WA | = Read & Write core memory at the address selected by the contents of the A register. |
| R/WB | = Read & write core memory at the address selected by the contents of the B register. |
| R/WSMX | = Read & write core memory at the location specified by X. The location is selected by a decode on the location selection mechanism of the core memory. Neither A nor B is needed to supply the address. In fact, R/WSM overrides any R/WA or R/WB command. |
| Read Only A | = Read A but don't write back. In effect this clears that memory location. |
| Write B | = Write the contents of the S register into the location selected by register B. |
| Read A Write B | = This allows the contents in storage core at A to be moved to location selected by B (two address transfer). |

WRITE CONTROL

The following codes may be written into the S register and giving a R/W command.

| | |
|---|---|
| CRTS | = Carrier Return to S |
| CFTS | = Cursor Flag to S |
| EOTFTS | = End of Text Flag to S |
| KTS | = Keyboard to S |
| RHTS | = Required Hyphen to S |
| SHTS | = Syllable Hyphen to S |
| TERMTS | = Card Eject Code to S |
| 4URSTS | = 4 Unit Space to S |
| 4USSTS | = 4 Unit Special Space to S |
| 5USTS | = 5 Unit Special Space to S |
| 6USTS | = 6 Unit Special Space to S |
| 7USTS | = 7 Unit Special Space to S |
| SPSPACETS | = Special Space to S |
| 0TS | = Zero to S |
| ZEROTS | = Zero to S |
| S7DCSET | = Write a 7 Bit Into Memory |
| S8DCSET | = Write an 8 Bit Into Memory |
| S7DCRST | = Reset the Seven Bit |
| S8DCRST | = Reset to Eighth Bit |
| S78INH | = Inhibit Writing a 7 to 8 Bit |

DETAILED DESCRIPTION

The following description relates to the sequential operation of the system depicted in FIG. 2. Several operations including word optimization, input-output, and display are described in detail.

WORD-LINE OPTIMIZATION

Referring now to FIG. 9 of the drawings, a block flow diagram showing the various machine operations which can effect a word optimization operation is depicted. As has been described with respect to FIG. 1 of the drawings, data characters can be inserted into the displayed text from the keyboard, they can be keyboarded to replace existing text, displayed characters can be deleted, syllable hyphens can be inserted into words, paragraph definition can be formed or omitted by control of the operator keyboard, characters, words or lines of words can be underscored, and preexisting margin boundaries can be changed by manipulation of the control keyboard. Additionally, as has been described with respect to FIG. 2 of the drawings, when it is desirous to input bulk text, such text can be inputed from a secondary media reader through an I/O channel. When performing each of these operations, the existing text in the bulk storage unit is reoptimized so that the maximum number of words occur on each line of displayed text. Thus, whenever there is a keyboard entry when in insert mode or whenever it is desirous to create a new paragraph by depressing the paragraph mark insert key on the control keyboard, an output signal is provided to the display system indicating the operation. This is denoted in FIG. 9 by block 161. This output signal causes the system program control to be set up to perform the designated operation. The system is placed in a specified state as denoted by block 163. Thus, when a keyboard entry is made while in insert mode, the system assumes a state denoted "TCIOX10*" which effects a character insert setup operation. During this text control operation, the I-counter is set to its zero state and the X10 latch is turned off. Various internal latches are set which will latter indicate to the system that a character insert operation is in progress. Once the internal latches have been set up, the system is transferred to the TCI9X10* condition. In this condition, the I-counter is advanced to a count of 9 and the Z10 latch remains off. This operation is denoted by block 165 and during this operation, various internal latches and conditions are set. Since these latches and conditions are set each time a word optimization operation is performed, for example, when a keyboard entry is effected in insert mode as denoted by block 161 or after a keyboard entry when in replace mode as denoted by block 167, block 165 is shown only once in the flow diagram operation depicted by FIG. 9. The detailed operations of the system which are effected when in a text control operation with the I-counter set at 9 and the X10 latch turned off are further described in FIG. 12 of the drawings. Referring briefly to FIG. 12 of the drawings, various operation and corresponding H-clock time intervals are depicted. These operations are those which are performed by the system when the program advances to block 165.

Referring once again to FIG. 9 of the drawings, operator depression of the backspace key when in insert mode as denoted by block 169 causes the system to assume a status wherein special conditions are set up indicating that a backspace operation is in progress as denoted by block 171. In a similar manner, the insertion of a syllable hyphen or the deletion of a paragraph mark as denoted by block 173 causes the system to be set up with different internal conditions as denoted by block 175 while a keyboard entry when in replace mode or delete mode as denoted by block 167 effects different machine setup conditions as denoted by block 177. A margin adjust operation which is effected by depressing a margin adjust keybutton and thereafter effecting movement of the margin is denoted by block 179. This operation causes the new margins to be placed in special storage for the line addressed by the cursor. This operation is effected when the system assumes the status denoted by block 181. Thereafter, as denoted by block 183, a test is made to determine whether the operator is specifying that the margins of the entire paragraph in which the cursor is located are to be adjusted. If the entire paragraph is to be adjusted, the system assumes a status denoted by block 185 and if the margins of the entire paragraph are not to be adjusted, the system assumes a status defined by block 177. When an input operation is effected as denoted by block 187, the machine assumes the status denoted by block 189. Once the initial setup operations have been effected, the system proceeds to the operational state defined by block 165 wherein various conditions are set up which are common to all word optimization operations. Thereafter, the X10 indicator is set and, according to the operation defined, the system proceeds to the adjust routine with an I1X10 status or with an I0X10 status as denoted by connectors "BB & EE." These connectors connect to the diagram depicted in FIG. 11 of the drawings.

Referring now to FIG. 10 of the drawings, a block diagram depicting the overall operation of the system when in a word optimization operation is depicted. As has been previously described, various system functions initiate a word optimization operation. When the system enters into such an operation, it is necessary that certain internal conditions and factors be set up and stored for future reference. This setup operation was briefly described with respect to FIG. 9 of the drawings and is connotated by block 201 of FIG. 10. Thereafter, the line length of the line being operated upon is retrieved from the control storage 59 of FIG. 2. Since the margin boundaries for each line are variable, it is necessary to first ascertain margin boundary, and line length in escapement units of the line prior to determining the number of characters and hence words that can fit onto the line. The operation of retrieving the line length is connotated by block 203. Once the line length has been retrieved, the text is scanned to determine the escapement values of the characters which will be located on the display line. If the first line of display were being optimized, the text scan would start with the first text character stored in the bulk text storage of FIG. 2. In a similar manner, if the word optimization operation is proceeding on the fifth line of display, the text scan would start with the first character to be displayed on that line. The operation of scanning text and determining the escapement values of each character scanned is denoted by block 205. As the text-scanning operation proceeds, there are basically two conditions which may exist: the number of characters in the retrieved display line exceeds the number of characters to be displayed in the newly defined optimized line or, the number of characters in the retrieved line are less than the number of characters to be displayed in the newly optimized line. When this latter condition exists, it is necessary to pull up the characters from the previously defined line of text characters following the line of text characters being optimized so that the newly created line of text characters will have the optimimum number of words appearing thereon. Thus, the control storage which defines the parameters of the next lower line of text characters is examined to determine whether that line is a special case such as the initial line of a new paragraph, the end of text, etc. This operation is denoted by block 207.

When a special condition does not exist, further text characters defined by the control parameters which previously defined the next lower line are retrieved as denoted by block 209 for the text-scanning operation. These newly retrieved characters from the next lower line are then scanned as denoted by block 205 until either all of the thus-retrieved characters are fitted onto the newly optimized line or until the escapement value of the characters scanned exceeds the line length. If the newly retrieved characters fit onto the line, the operation proceeds as before testing the next lower line for a special condition and, if no special condition exists, retrieving additional characters. If a special condition does exist when the test performed by block 207 is effected the routine proceeds to block 211 whereupon any blank lines existing between the newly tested line and the line being optimized are eliminated.

For example, if the margin boundaries had been expanded so that more than two lines of previously displayed text could fit within the new margin boundaries, the two lines of previously displayed text must fit onto the newly optimized line of displayed text and the next lower line would be tested for a special condition. If such a special condition were noted, such as, for example, a paragraph mark, the line of displayed characters which existed between the newly optimized line and the line containing a paragraph designation would have been eliminated. Thus, it is necessary to move the line containing the paragraph mark up on the display so that blank display lines are not created. This closeup operation is preformed by block 211.

Once the closeup operation has been completed, any text which must be shifted within storage and various internal indicators, such as the end of text line number, are updated as denoted by block 213 and the routine ends.

As previously described, it is also possible that the number of characters appearing in the previously defined line of text exceeds the number of characters which may be inserted into the newly optimized line of text. When this occurs, it is necessary to shift those characters which exceed the line length and which define whole words to the next lower line of display. Naturally, those characters appearing on the next lower line of display must shift to the right or down page. Thus, the stored factors which define the next lower line of text are examined to determine whether the next lower line is a special condition such as the beginning of a new paragraph. If the next line of text is the beginning of a new paragraph, it is desirous to shift this line down page and create a new line of text. Thus, the operation proceeds to block 217 whereupon a new line is created duplicating the margin boundaries and format of the last line optimized. Thereafter, the operation proceeds to scan the excess text and fit it onto the newly defined line. In this manner, multiple newly defined lines may be created so that all the text fits within the newly defined boundaries without contaminating the first line of the next paragraph.

When the next lower line does not define a special condition, the operation proceeds to block 219 whereupon the line length for this line is retrieved and the number of characters appearing in this line is also retrieved from the control storage. Thereafter, the operation proceeds to block 205 whereupon the remaining text is scanned. This remaining text consists of that text which overflowed plus the text defined by the next line. This text is placed on the next line within the boundries defined for that line and obtained by the operation of block 219. Thus, within a paragraph of text, the existing margins for each line are retained. When it is necessary to increase the length of the paragraph, the margin boundaries of the last line occurring in the paragraph are utilized for the further lines which appear in the paragraph.

As the text is being scanned, it is necessary to recall which line the cursor is located on. The operation of storing the cursor factors and recalling them from storage is generally indicated by block 221.

Summarizing, a text control operation consists of optimizing the number of words of characters which appear on a displayed line of text. Multiple machine operations such as inserting characters into existing text defining new margin boundaries, inputing additional information, etc., initiate the word optimization operation.

Referring briefly to FIG. 2 of the drawings, all text characters are stored in the bulk text storage 67 in adjacent storage addressed locations. The control storage unit 59 contains information which defines the margin locations as well as the number of characters which appear on each line of display. In effect, this information masks the characters which serially appear in the bulk text storage so that they are displayed on the display unit 11 as lines of characters, with an optimum number of words appearing within the margin boundaries associated with each line of display. The processor is arranged to scan the characters in the bulk text storage upon entry into a word optimization operation and redefine the number of characters which appear on a line of display in accordance with fitting the maximum number of words on each line of display within the defined boundaries for that line. Once a line has been newly defined and reoptimized, factors located in the control storage 59 associated with that line are updated and changed. Whenever the number of characters appearing in a display line are changed, it may change the number of characters which appear in the next line of display. In this case, the factors which define the next line of display must be examined and that line must be optimized. The optimization process thereafter continues to optimize each line of display until a new paragraph of words is found or until a line is found which does not need changing.

Various ones of the depicted registers are utilized to contain control information during the word otpimization operation. Since these registers almost always contain the factors necessary for proper performance of the operation, the following will briefly review the factors thus retained. In a word optimization or text control operation, the E-register is initially set up with the maximum number of escapement units which can appear on the line to be optimized. This number is derived from the line group information which defines the left margin boundry and the line length in turns of escapement units. As each character located in the bulk text storage 67 is scanned, it is gated to the sense register 57 and thence examined under the control of the processor 73 to determine its escapement value. This escapement value is subtracted from the contents of the E-register in the accumulator 96 under the control of the processor 73. When the E-register is equal to 0, it signifies that the maximum number of characters have been placed on the line being optimized.

Both the D-register and the J-register are initially set with the number of characters which appear on the line to be optimized. This information is obtained from the register 101. Thereafter, the J-register is decremented with each character scanned so that it contains the number of characters remaining in the line which have not yet had their escapement units evaluated. As described heretofore, there are essentially two conditions which may exist during a word optimization operation on a particular line of display: the escapement units of the number of characters previously existing in the line to be optimized exceed the number of escapement units allowable on the newly optimized line resulting in a character overflow or they are less than the number of escapement units which may appear in the newly optimized line resulting in a character underflow. When a character overflow exists, the contents of the J-register are subtracted from the D-register by the accumulator under the control of the processor control and the resultant factor is stored as the number of characters which appear in the newly optimized line of display text. Thereafter, the overflow characters are placed on the next line as will be described hereinafter. When an underflow situation exists, the J-counter reaches a count of 0 prior to the E-counter reaching a count of 0. When this condition exists, it is necessary to obtain the characters from the next line and place some or all of these characters on the newly optimized line. This operation will also be described hereinafter.

Summarizing, the E-register contains the number of escapement units which may thereafter be placed on the line being optimized, the D-register contains the number of characters previously appearing on the line, and the J-register is utilized to maintain a count of the number of characters in the defined line which have not yet had their escapement units added into the word optimization operation.

Of course, when the last character fitting in a newly optimized line is not a word-ending character such as an innerword space, hyphen, etc., it is necessary to back up in the line to a proper word ending condition. At this time, the J-counter is incremented with each character scanned until a word-ending condition is reached. Thereafter, the number of characters appearing inn the line is calculated and written into the control storage 59. Additionally, it should be noted that various ones of the registers may be utilized during the operation to contain other factors. Such use of these registers is incidental to their major use described above. The incidental use is merely to effect maximum utilization of the system components without occurring additional expenses.

One additional operation that should be referred to prior to entering into a detailed description of the operation of the processor 73 with respect to a word optimization operation is the storage of cursor factors referred to in the block diagram of FIG. 10. Whenever a character is to be inserted into the bulk text storage from the operator keyboard, it is stored in a special position of control storage. Additionally, the character located at the cursor position is removed from the bulk storage and stored in a second special location in control storage. A cursor flag character is inserted in the bulk text storage at the position thus vacated. During the scan line forward operation of the word optimization routine, when the cursor flag is encountered, it is necessary to provide an escapement decode for both the newly inserted character and thereafter for the character previously adjacent to the cursor. Further, if the character previously located adjacent to the cursor is caused to overflow the boundary of the newly optimized line, a special operation is necessitated whereby the word in which the cursor is located will be redefined as the first word appearing in the next line. Thus, several operations are effected upon encountering the cursor flag operation as will be described in detail hereinafter.

Referring once again to FIG. 9 of the drawings, once the device is set up for a word optimization process as denoted by block 165, the routine proceeds either to connection point BB or connection point EE in accordance with the count located in the J-register 95 of FIG. 2. If the count in the J-register is equal to 0 indicating that no characters remain in the line to be optimized, the routine proceeds through connection point EE. If, on the other hand, characters are remaining, then the operation proceeds through connection point BB to FIG. 11.

Figure 13:
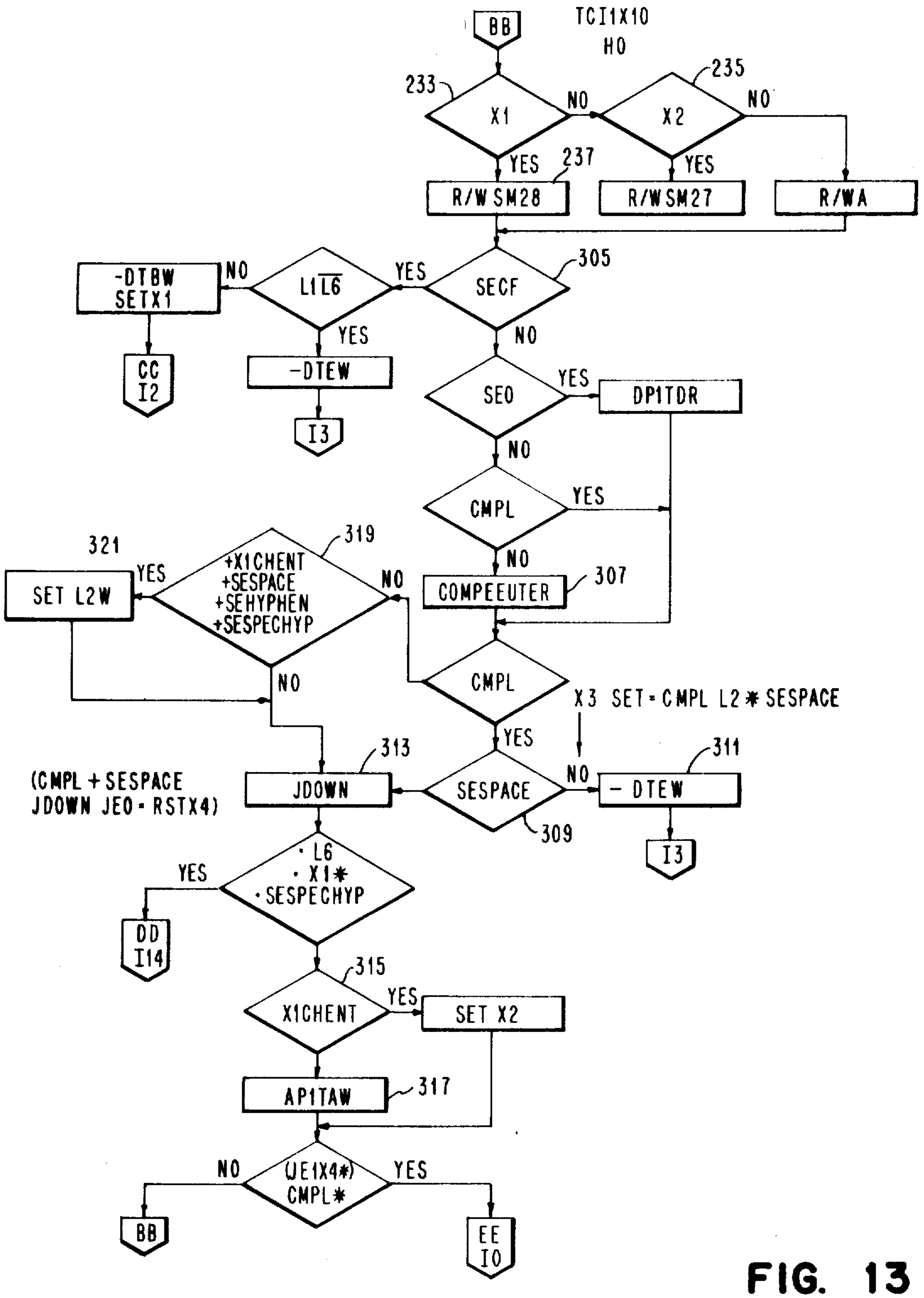

Referring now to FIG. 11 of the drawings, the connections from the initial setup operation described in FIG. 9 of the drawings are shown at connection points BB and EE. If the J-counter does not equal 0 when entering into the operation, the text control operation (TC) causes the control counter to assume its I1 state. At the same time, the X10 status indicator is turned on. This indicator remains on during the remainder of the text control operation. Thus, only the I-states will change to define further operations and hence, only these I-states will be referred to. Thus, when the processor control tests the J-counter and determines that it is not equal to 0, the operation preceeds to an I1 state as defined by block 231 thereby initiating the scan line forward operation. This operation is defined in detail by the block diagram of FIG. 13. Referring briefly to FIG. 13, it can be seen that the control state, namely a text control I1X10 operation is defined at the top of the drawing. Additionally, the operation is entered into through the BB connector. The first step of the operation is to test the X1 indicator as denoted by block 233 and the operation proceeds to either test the X2 indicator as denoted by block 235 or to read and write the special memory location 28 as denoted by block 237. The details of this operation will be described hereinafter, reference being made to this drawing here only to show that the scan line forward operation is defined by a particular I-counter state which further defines a detailed machine operation.

Referring once again to FIG. 11 of the drawings, a scan line forward operation is initiated as denoted by block 231 wherein the first character located on a line to be optimized is read out of the test storage unit, its escapement value determined and subtracted from the contents of the escapement register (E register), the J-counter is decremented denoting that a character has been read. Thereafter, the second character is read out and the same operation proceeds as denoted by the loop 239. This operation continues until the cursor flag is encountered or until the J-counter is equal to 0. If the cursor flag is encountered prior to the J-counter reaching the count of 0, the operation proceeds to the I2 state as denoted by block 241 whereupon the cursor information is updated and thereafter proceeds back to block 231 and the scan line forward operation. Another special condition which can exist is if a syllable hyphen is encountered during a scan line forward operation. When this occurs, the operation proceeds to an I14 state as defined by block 243 whereupon the syllable hyphen is removed. Again, the operation returns to the scan line forward operation until an underflow or overflow condition exists. If an underflow condition exists, the J-counter will reach a count of 0 whereupon the operation proceeds to the I0 state defined by block 245. In this state the next line of storage is tested to determine whether a special condition exists such as the existence of a new paragraph. If such a condition does not exist, the special memory register defining the next line of text is read to determine the number of characters which appear on that line. If no characters appear on that line indicating a blank line, the operation is again repeated. This operational loop is denoted by the loop 247. If a special condition does not exist and characters are located on the next line of text, the operation proceeds back to the scan line forward operation wherein the text characters located on the next line proceed to fill out the line being optimized. If a special condition does exist, the operation proceeds to the I3 state defined by block 249 whereupon internal indicators are interrogated to thereafter determine whether it is necessary to close text up-page, etc.

When a test overflow condition is determined because the character scanned would cause the escapement counter to assume a value less than 0, and when the character scanned is a nonspace character, the operation also proceeds to the I3 state defined by block 249. The operation proceeds from block 249 in accordance with the condition of the L2 indicator which indicates whether a valid line termination point exists in the line being scanned. If such a termination point exists (e.g. hyphen, innerword space, etc.), the operation proceeds to the I5 state denoted by block 251 whereupon a reverse text scan is initiated and the counter containing the number of characters located on the line to be optimized is decremented until the line end point is reached. If during the reverse text scan, a blank is encountered in text storage indicating that a hyphen previously existed at that point, the operation proceeds to the I4 state denoted by block 253 whereupon this syllable hyphen is replaced. Once a valid line end point is found either through the replacement of a syllable hyphen as denoted by block 253 or by the sensing of a line termination character such as innerword space as denoted by block 251, the operation proceeds to the I6 state as denoted by block 255. Block 255 is also reached from block 249 if the L2 indicator is off indicating a single word line.

When the processor advances to the I6 state, the number of characters which will appear on the newly optimized line is now contained in the external registers of the system. These factors are transferred to the appropriate registers in the control storage. At this point, a line of display has been optimized and it may or may not be necessary to reoptimize the next line of display. In order to determine whether the operation should continue optimizing additional lines, a check is made to determine whether the last line of the text which has been read is the same as the line of text being adjusted. If the lines correspond, a test is made to see whether the contents of the J-counter is equal to 0. This indicates that no letters of remaining text are to be scanned. If the J-counter is equal to 0, the operation proceeds to an I10 or I13 state as will be described hereinafter. If however, the contents of the J-counter is not equal to 0 or if the line adjusted does not correspond to the line read, it is necessary to add overflow text to the next succeeding line. This overflow text is added as a new line of text whenever the next successive line contains a new paragraph designation. If the next line does not contain a new paragraph designation, the overflow words are placed as the first characters of the next line pushing the information on that line to the right and then down-page. Thus, a test is made during the I6 state to determine whether the next line contains a paragraph designation.

When a paragraph designation is contained on the next line of text, the operation proceeds to an I7 state as denoted by block 257 whereupon the determination is made as to whether the line to be newly created will effect the generation of more than 96 display lines. If more than 96 display lines will be created, the text located in the bulk text storage unit which had previously been assigned to line number 96 is removed. Thereafter, the operation proceeds to an I8 state as denoted by block 259 to effect the creation of a new line which will contain the overflow text. The line boundaries of this new line are the same as the last optimized line. These new line boundaries are inserted in the register 101 of the control storage 59 of FIG. 2 and the information relating to the line numbers down-page from the newly created line are shifted to the right in the control storage.

The operation then proceeds to an I9 state as denoted by block 261 and the overflow text is placed on the newly created line. It should be noted that it may be thereafter necessary to create further lines of text upon which the overflow text characters are placed.

As described heretofore with respect to block 255, if the next line following the just optimized line does not contain a special designation, such as a paragraph mark, the characters of the next line of text are added to those which overflowed the just optimized line of text and the next line of text is thereafter optimized. Thus, the operation proceeds from block 255 directly to block 261.

At time I9, the number of escapement units of the new line to be optimized are gated into the E-register. Thereafter, a test is made to determine whether the contents of the J-counter is equal to 0 indicating that there are no additional characters to be added to the next line of display to be optimized. This occurs on a random basis when multiple lines of text are to be optimized. Whenever it occurs, the operation proceeds directly to an I0 state whereupon the number of characters appearing on the next line is ascertained and thereafter scanned. If the contents of the J-counter do not equal 0, the operation proceeds to an I1 state whereupon the overflow text is scanned until the J-counter equals 0 or until one of the other conditions described with respect to block 231 is met. In this manner, the operation proceeds from the leftmost portion of a line to be optimized to the rightmost portion and down-page until a paragraph definition or end of text condition is reached or until the same words appearing on a newly optimized line also appeared in the previous corresponding line. When this condition exists, the conditions which are examined as previously noted with respect to block 255 cause the system to proceed either to an I10 state as defined by block 263 or to an I13 state as defined by block 265. The operation proceeds to block 263 whenever text has been moved up page in the display thereby creating blank lines of displayed text which must be closed over and eliminated. This operation is effected in the I10 state by removing those line groups from the register 101 which contains no text characters as indicated in FIG. 2 by the letter "N" of register 101. Additionally, the remaining line groups located down page from those deleted are moved up in the register or shifted left as graphically depicted in FIG. 2.

Referring once again to FIG. 11 of the drawings, when new lines of text have been created, it is necessary to determine the new last line of the page. This operation is effected when the control counter advances to its I13 state and the X10 status latch is reset. With the system in this status, the end of text line number is updated and the operation proceeds to the I13 X10 status denoted by block 267 provided that an input adjust operation has not been specified. In a similar manner, the operation proceeds from block 263 to block 267 provided an input adjust operation has not been specified. The operation specified by block 267 is to replace the cursor flag with the character previously located at that position. In all operations except the insert operation but including the input adjust operation, the bulk text storage is closed to delete all blank characters as denoted by the I12 state defined by block 269. That is, text is actually shifted up page so that no blank characters appear in storage. Blank characters can be inserted into storage during delete operations and whenever a syllable hyphen is deleted as described heretofore.

During an insert operation, it is necessary to effect the shifting of all characters located to the right of the cursor-marked character in the bulk text storage and the cursor-marked character down-page to make room for the character to be inserted. This operation is defined by the I11 status noted by block 271. When this operation occurs, it may be possible that the newly added character exceeds the capacity of the bulk text storage. In this case, the last character is eliminated from the end of the text storage as defined by the I15 state denoted by block 273 and thereafter the operation proceeds back to the I11 state whereupon the actual opening of the memory is effected. Thereafter, the operation is terminated as denoted by block 275. If more than one syllable hyphen were deleted during the text adjust operation, the operation proceeds from block 271 to block 269 to effect the closing up of the memory over the thus-created blanks. If one syllable hyphen were deleted, it would not be necessary to proceed to block 269 since the newly inserted character would utilize the blank space created by the deletion of the syllable hyphen. The operation also proceeds from block 279 to the termination of the operation as defined by block 275.

As has previously been described, the various operations specified by the blocks of FIGS. 9 and 11 are further defined in terms of internal system timing and in terms of the processor control gating effected to shift data from the various registers and storage devices. Referring briefly to FIG. 9 of the drawings, the operations defined by block 165 or the I9 X10* machine status are depicted in FIG. 12 of the drawings.

Referring to FIG. 12 of the drawings, that portion of the setup operation common to all word optimization operations is depicted. During the first clock time interval, H0, the character to be inserted is read from its special memory location 27 and rewritten back into the special memory location as denoted by block 301. If a character entry or insertion operation other than the insertion of a paragraph mark is being performed, the character read from the special memory location 27 is rewritten back in. However, if any other operation is being performed, a blank character is written into the special memory location. During the next clocking interval, H1, the line number of the line being optimized is read from the B-register and stored in special memory locations 25 and 26. Thereafter the B-register addresses the margin group corresponding to the line number. This margin group is read at clock time H4 from the register 101 of FIG. 2. Thereafter, high-order bits are added to this information now located in the sense register 57 so that the B-register thereafter contains the address in the register 100 of the margin group pertaining to the line to be optimized. Since a plus two operation was also specified, the line length portion of the margin information is addressed by the contents of the B-register. Thereafter, at clock time H6, this information is gated into the sense register and transferred to the E-register 94 of FIG. 2. Thus, the E-register now contains the escapement units of the line to be optimized. An additional operation that takes place at H4 time is that the contents of the J-register are transferred to the D-register. At time H8, special memory 7 is set to 0. This special memory location indicates the number of hyphens read during a text scan forward operation. Additionally, at clock time H8, the X10 indicator is set on and a test is made to determine whether the J-counter is equal to 0. If the J-counter is equal to 0, the I-counter is set to its I0 state whereas it is set to its I1 state if the J-counter does not equal 0.

Assuming that the J-counter does not equal 0, the operation proceeds to block 233 of FIG. 13. It will be recalled that this operation defined by the I-counter being in its one state is a scan line forward operation whereupon text characters are scanned for their escapement values until an overflow or underflow condition exists or until a syllable hyphen is encounterd or the cursor is encountered. All of the operations depicted in FIG. 13 are done during clock interval H0. The operations specified by blocks 233 and 235 insure that the character which has been replaced by the cursor flag and is located in special memory and that the character to be inserted are recalled at the proper time from their special memory locations. Thereafter, a check is made to determine whether the cursor flag has been sensed as denoted by block 305. If the cursor flag has been sensed, and if a paragraph mark is being inserted, the operation transfers the contents of the D-register and proceeds to program step I3. If a paragraph mark is not entered and the cursor flag is encountered, the algebraic sign of the contents of D-register is inverted and transferred to the B-register, the X1 indicator is set and the operation proceeds to an I2 state. This insures that when the operation is reentered, that the X1 indicator will be set effecting the reading of the special memory location containing the character displaced by the cursor flag instead of reading the memory location specified by the A-register.

Assuming that the cursor flag is not encountered, the operation tests the contents of the sense register to determine whether a blank character was detected. If a blank character was not detected, the operation proceeds to block 307 whereupon the contents of the E-register containing the remaining escapement value in the line is compared with the decoded escapement value of the character sensed. Additionally, the escapement value of the character is subtracted from the contents of the E-register and the resultant factor is rewritten back in the E-register.

If the comparison is less indicating that the just read character will exceed the line length, and if the just read character is not a space character as indicated by block 309, the operation proceeds to block 311 where the algebraic sign of the contents of the D-register are transferred to the E-register and the operation proceeds to the intermediate setup operation defined by I3. If a space character is encountered which causes the overflow, the J-counter is decremented as denoted by block 313 and a test is made to determine whether a special hyphen situation exists. If this situation exists, the control counter is stepped to state I14 for the removal of a hyphen. Otherwise a test is made to determine whether the X1 indicator is on during a character entry operation as denoted by block 315. In this occurrence, it is necessary to thereafter address the special memory location containing the character to be inserted. Otherwise, the contents of the A-register are incremented by one as denoted by block 317. Thereafter, a test is made to determine whether the J counter will be equal to zero indicating that no further characters exist and a test of the compare latch is made to insure that there are remaining escapement characters. Assuming that the J-counter did not decrement to zero, the operation is reinitiated with the next character being read either from the special memory locations where a cursor flag has been found or from the bulk text storage defined by the address located in the A-register.

When, as a result of the compare operation performed by block 307, it is indicated that there are additional escapement units to be utilized in a line (no overflow), the operation proceeds to block 319 to determine whether the character thus decoded is a valid line ending character. If it is a line-ending character, the L2 latch is set as indicated by block 321. In either instance, the operation proceeds to block 313 whereupon the J-counter is decremented by one and then to the exit points BB or EE depending upon the contents of the J-counter.

As has been previously described, during a scan line forward operation when the J-counter is equal to zero, it is necessary to read the number of characters on the next line so that they may thereafter be examined during the scan line forward operation. This operation is defined by the I0 state and it is entered through the EE connector depicted by block 325 of FIG. 14. The overall operation is depicted by block 245 of FIG. 11.

Figure 14:
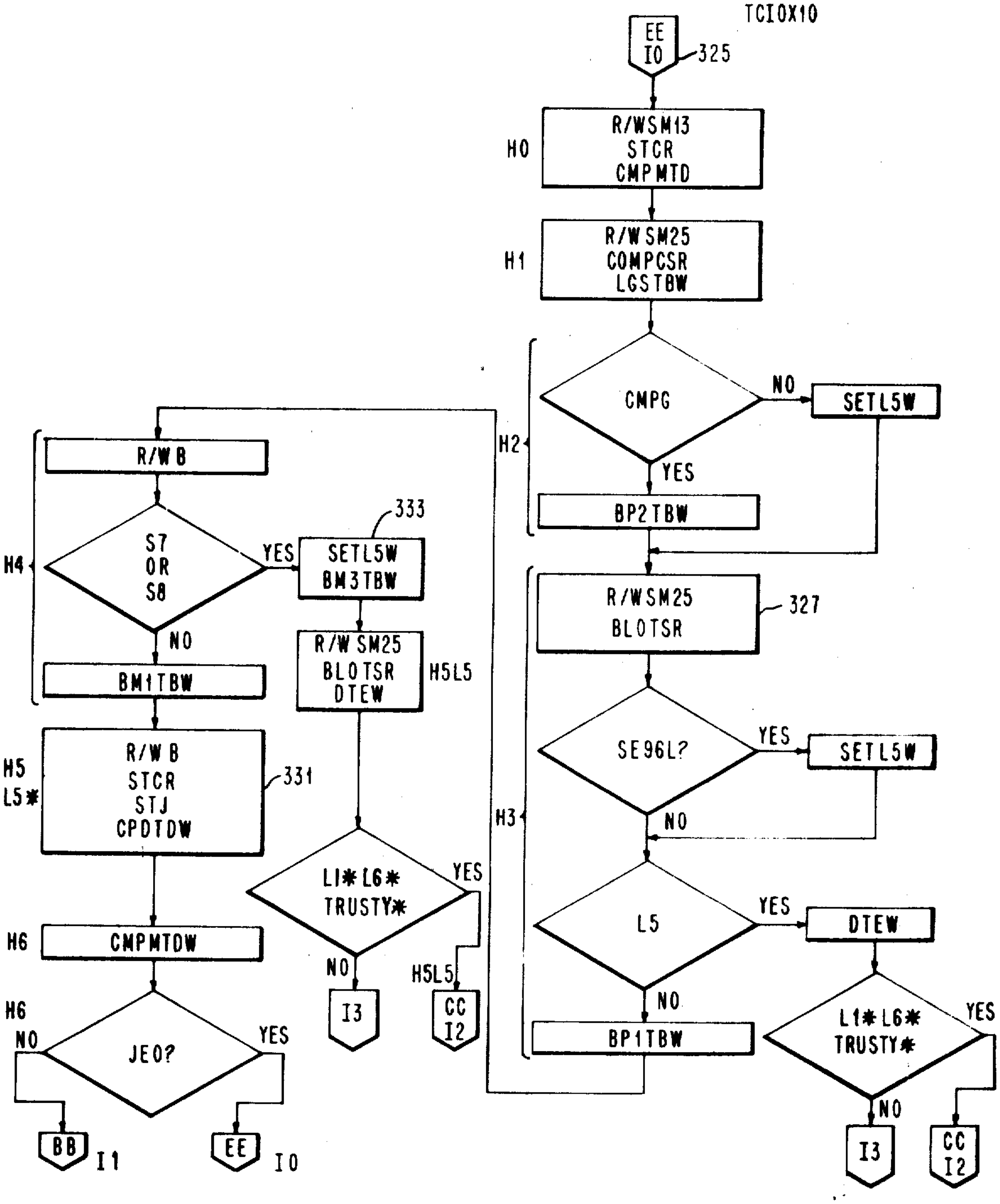

Referring now to FIG. 14 of the drawings, when the I-counter assumes a zero state, the end of text line number is read from special memory location 13 during clock H0, the line number of the last previous line read for a scan line forward operation is read from special memory 25 during clock time H1. The last line read is then compared with the end of text line number and the L5 indicator is set indicating that additional lines cannot be read if the last line of text has already been read. If, however, the last line of text has not been read, the B register is incremented by 2 so that it now addresses the next line to be read and this factor is stored in special memory location 25 as denoted by block 327. A test is then made to determine whether the last line is being operated upon at which time the L5 indicator is set on. If the L5 indicator has been set on by the operation, the contents of the D-register are transferred to the E-register and various internal indicators are sampled to determine whether the system assumes an I3 or an I2 status. If the last line of text is not being operated upon, the B-register is incremented to address the paragraph mark location of the newly addressed line to be read.

Thereafter, the paragraph information is gated out of storage and a test is made to determine whether the paragraph indicator is on or off. If the paragraph indicator is off, the B-register is decremented so that the number of characters on the line can be thereafter read. This number is added to the contents of the D-register and also placed into the J-register at clock time H5 as denoted by block 331. A test is thereafter made to determine whether the J-counter is equal to zero. This can occur if a blank line has been addressed. If the J-counter does not equal to zero, the system assumes an I1 status which has previously been described with respect to FIG. 13 of the drawings.

If a paragraph indicator is sensed, the L5 indicator is turned on as denoted by block 333 and the B register is decremented by three so that it addresses the last line number read. Thereafter, this information is stored in special memory 25. Various indicators are thereafter sampled so that the line group information may be appropriately updated by the system assuming either an I3 or and I2 state.

Figure 15:
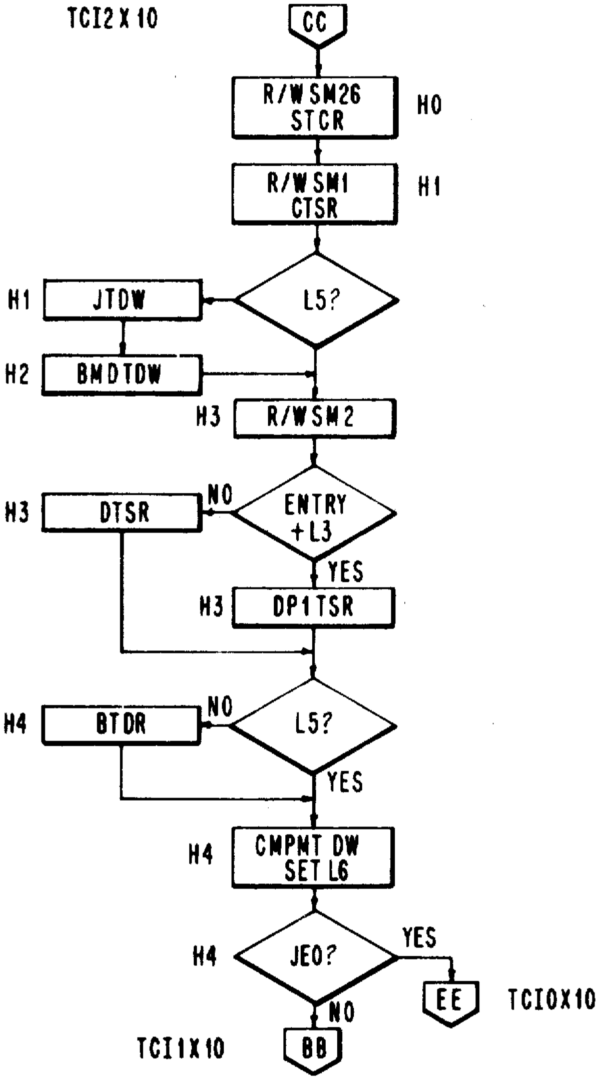

Referring now to FIG. 15 of the drawings, the operation effected when the cursor information is updated as shown by block 241 of FIG. 11 is depicted. The cursor horizontal position is defined by a line number and the number of characters from the first character in the line. The operation effected by this flow diagram effects the generation of the cursor address and its storage in special memory locations 1 and 2.

Figure 16:
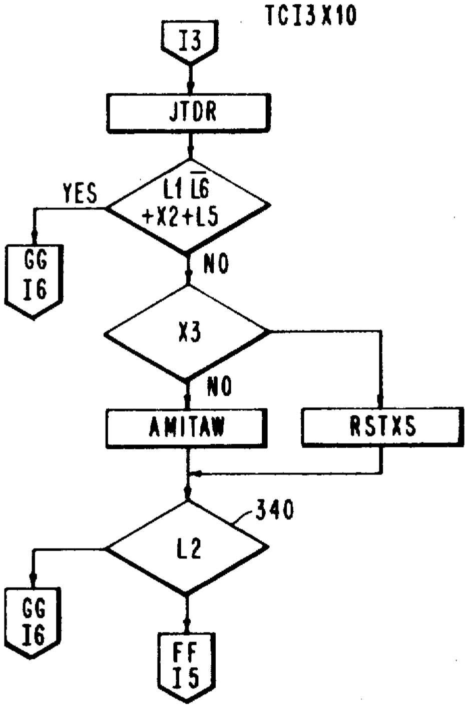

Referring to FIG. 16 of the drawings, the intermediate setup operation defined by I counter state I3 as depicted by block 249 of FIG. 11 is shown. Various internal indicators are quizzed by this operation to determine whether the I counter assumes an I5 or an I6 status. For example, the L2 indicator is sampled as denoted by block 340 to determine whether a valid line ending exists in the line being optimized.

Referring briefly to FIG. 11 of the drawings, it can be seen that when the I5 state is entered, a reverse scan operation is initiated and the line end point is searched. If a blank character is encountered during the reverse scan, it is possible that this blank character may be a deleted syllable hyphen. Therefore, the operation proceeds to state I4 as denoted by block 253.

Figures 17, 18:
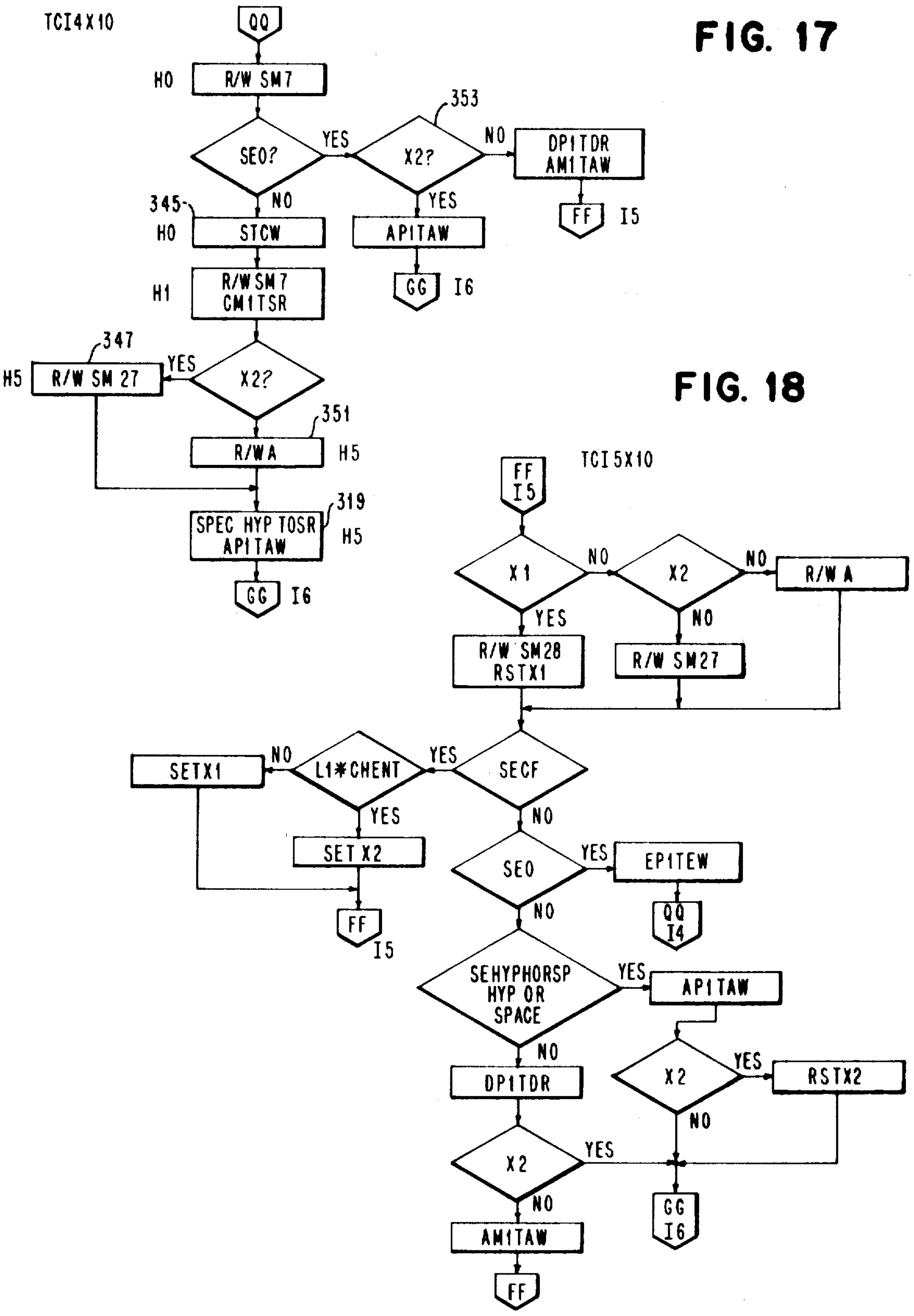

Referring now to FIG. 17 of the drawings, the operation defined by state I4 checks to determine whether a hyphen character has been previously encountered. This information is stored in special memory location 7. If hyphens have been deleted, the operation will proceed to block 345 and the number stored in the special memory location indicating the number of hyphens previously deleted is decremented during clock time H1. Thereafter, a check is made to determine whether the character located at the cursor flag is being operated upon. If this character is being operated upon, it is necessary to write the hyphen character in special memory location 27 as denoted by block 347 and block 349. Otherwise, the text location defined by the A-register is written with the special hyphen character as denoted by block 351.

If no hyphens have been eliminated previously during the operation and a blank had been encountered, a test is made as denoted by block 353 to determine whether the blank is located at the cursor address. In this case, the line is terminated and the system assumes an I6 status. If a blank is encountered at other than the cursor location and no hyphens have been deleted, the operation assumes its I5 status and continues backing up trying to find the line termination character.

Referring now to FIG. 18 of the drawings, the reverse scan operation is depicted. This operation is similar to the forward operation previously described. The characters are read from the text storage and the counter containing the number of characters remaining to be inserted into the line is incremented since the scan is in the opposite direction. Various tests are made to determine whether a valid line-ending condition is detected. Once such a line-ending condition is detected, the system assumes its I6 status.

Figure 19:
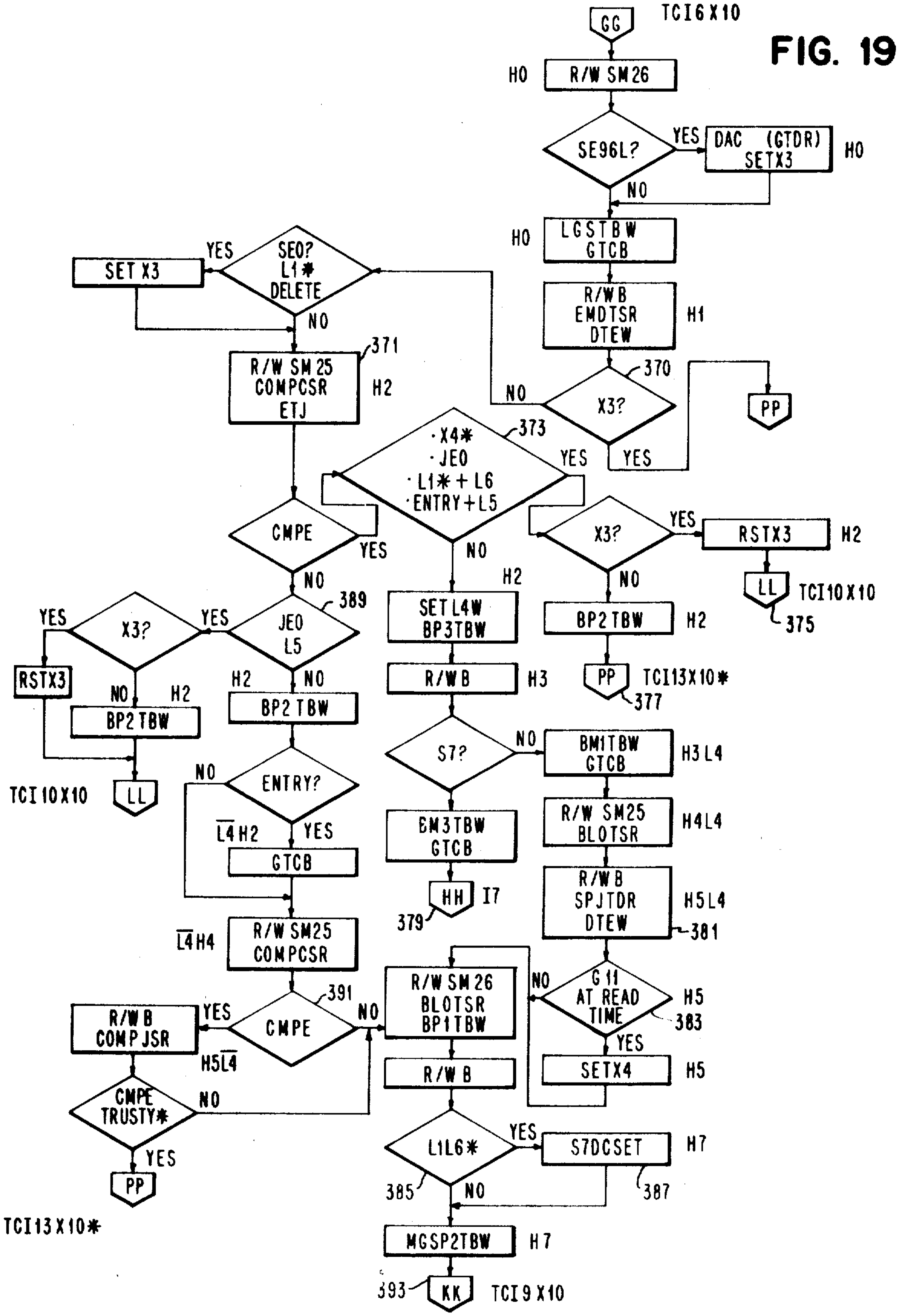

Referring now to FIG. 19 of the drawings, the operations performed by the system when the program counter assumes its I6 state are depicted. During this operation, the number of characters which appear on the newly optimized line are defined and applied to the register 101 of the control storage of FIG. 2. This operation occurs during clock intervals H0 and H1. Thereafter, a test is made to determine whether the X3 indicator is on as denoted by block 370. This indicator defines that the operation has been completed with the exception of updating certain internal factors and insuring that the memory is properly opened or closed. Assuming that the operation has not be completed, the sense register which contains the number of characters on the newly optimized line is sampled to determine whether it is equal to zero thereby indicating that a blank line has been optimized. In this instance, the X3 indicator is set. If the sense register does not equal zero, the operation proceeds to block 371 whereupon the line number of the last line optimized is compared with the line number of the characters scanned during the scan line forward operation. If these two factors are equal, there is a possibility that the operation can be terminated. Thus, as indicated by block 373, a test is made to determine whether the contents of the J-counter is equal to zero indicating no further characters to be placed on succeeding lines and the X4 indicator indicating that the J-register had been previously overflowed is not on. When these conditions are satisfied along with various other internal latches, the X3 indicator is sampled to indicate whether blank lines are existent which must be closed. If such blank lines exist, the operation proceeds to the I10 state as denoted by connector block 375. If no blank lines which must be closed exist in the text storage, the X10 indicator is turned off and the operation proceeds to satus I13X10* as denoted by connector block 377.

If the J-counter does not equal zero as indicated by block 373 or if the other conditions are not met, the L4 steering indicator is set and the next line is checked for a paragraph mark. If a paragraph mark exists, it is necessary to create a new line of display text having the same margin information as the last line optimized. When this occurs, the operation proceeds to connector block 379 and the system changes status to an I-count of 17. If no paragraph mark is detected, it is thereafter necessary to determine the format information of the next line which must be reoptimized. The information content of the next line which is reoptimized will contain those characters which overflowed the preceding line along with those characters previously existing on the new line. The number of characters on the new line are added to the number of characters in the J-counter as denoted by block 381. A test is then made as denoted by block 383 to determine whether the number of characters stored in the counters is exceeding the capacity of the registers. In this event, the X4 indicator is set for later inquiry to insure that the information is not lost. The line number of the new line is thereafter stored in the special memory location and the operation proceeds to machine status I9.

In the special case of a paragraph mark insert operation wherein a new paragraph has been designated, the L1 L6* indicator is on as denoted by block 385. When this event occurs, a paragraph mark is set into the format information of the new line as denoted by block 387.

It will be recalled that the operation defined by block 371 compared the line number of the line just optimized with the line number of the line last scanned during a line scan forward operation. The description thus far has related to the operation thereafter effected when these two line numbers are equal. When they are not equal, the operation proceeds to block 389 whereupon a test is made to determine whether a blank line has been written. If a blank line has been written, the system assumes its I10 status whereupon blank lines of text are thereafter closed. If the J-counter does not equal zero, a check is made to determine whether the last line read during a scan forward is the line following an optimized line. In this special case, a comparison is made with the number of characters appearing on this line and the contents of the J-counter as indicated by block 391. When this comparison is equal, the operation proceeds to the I13 state indicating that the optimization process has been completed. When these two are not equal, the word optimization process is not completed and the processor is set to its I9 state as has been previously described through block 393. Referring once again to FIG. 11 of the drawings, the I7 state is entered when an overflow condition exists and a paragraph mark is encountered on the next line indicating that a new line must be created between the newly defined paragraph to contain the overflow information.

Figure 20:
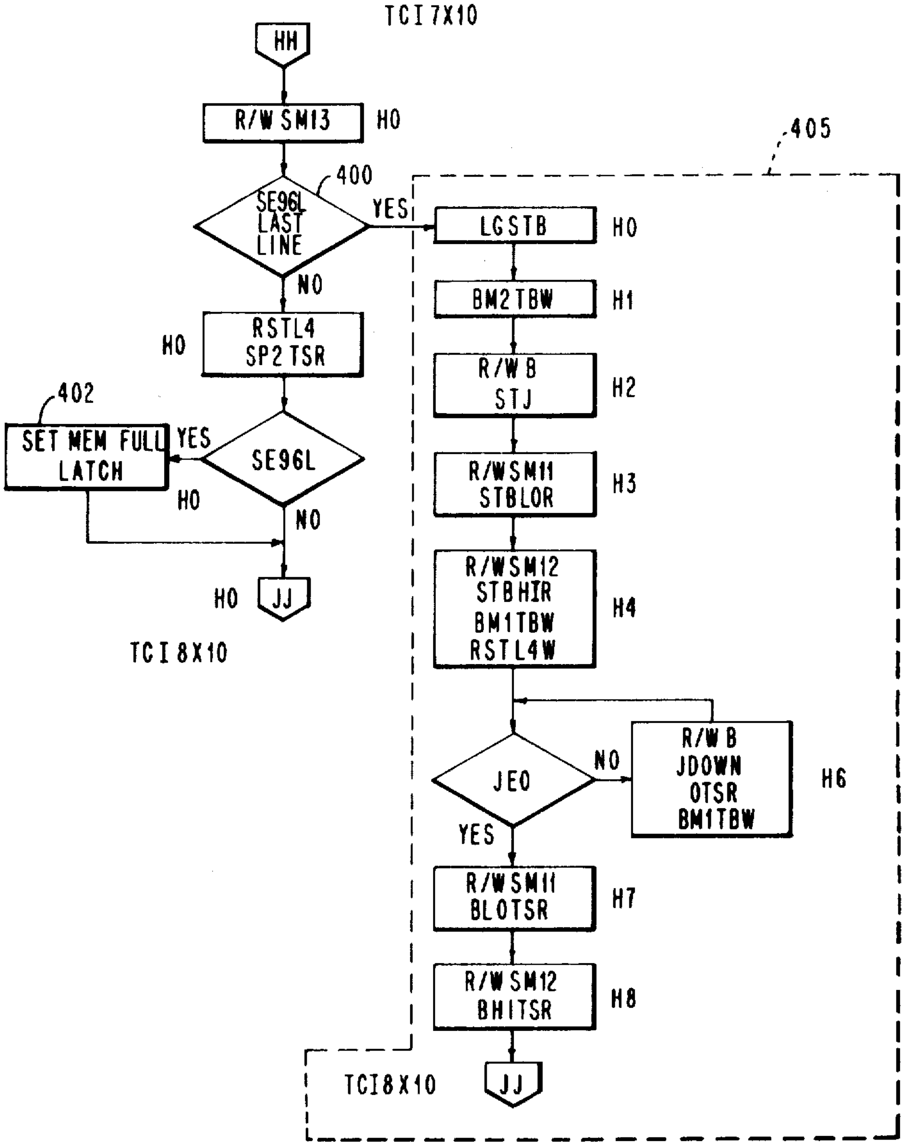

Referring now to FIG. 20 of the drawings, the system operations performed during the I7 state are depicted. During this operation, a test is made to determine whether 96 line groups have previously been defined as indicated by block 400. If 96 line groups have not been defined, a test is made to determine whether the newly created line will cause the creation of the 96 lines. In this special case, the memory full latch is set as indicated by block 402. In the special case where 96 lines have previously been defined and a new line must be defined, the characters on the last line are deleted as indicated by the blocks in loop 405. In either event, the operation then proceeds so that the program counter is set to its I8 state.

Figure 21:
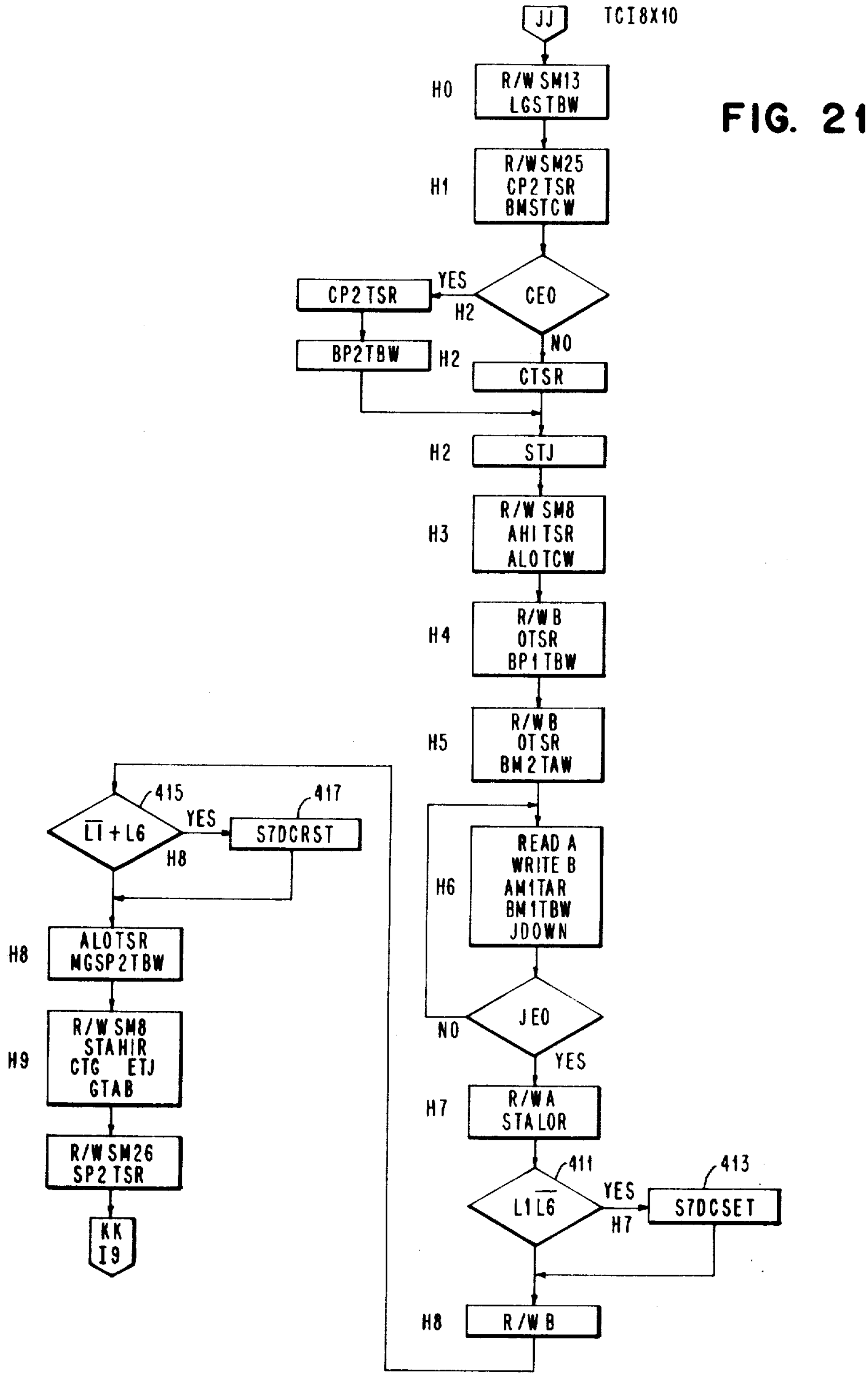

Referring now to FIG. 21 of the drawings, the operation which effects the creation of a new line is depicted. In this operation, all line group information contained in register 101 of FIG. 2 having a line number greater than the next line to be optimized is shifted to the right in the register as depicted. Thereafter, the line group information of the line previously optimized is transferred into the thus vacated position. Once this operation is complete, the system proceeds to its I9 state. A special test is made as indicated by block 411 to determine whether a new paragraph is being created. If a new paragraph is being created, a paragraph mark is set into the line group information as denoted by block 413. The test performed by block 415 and the operation defined by block 417 insures that a paragraph mark from the previously optimized line group information is not transferred to the newly created line group.

Figure 22:
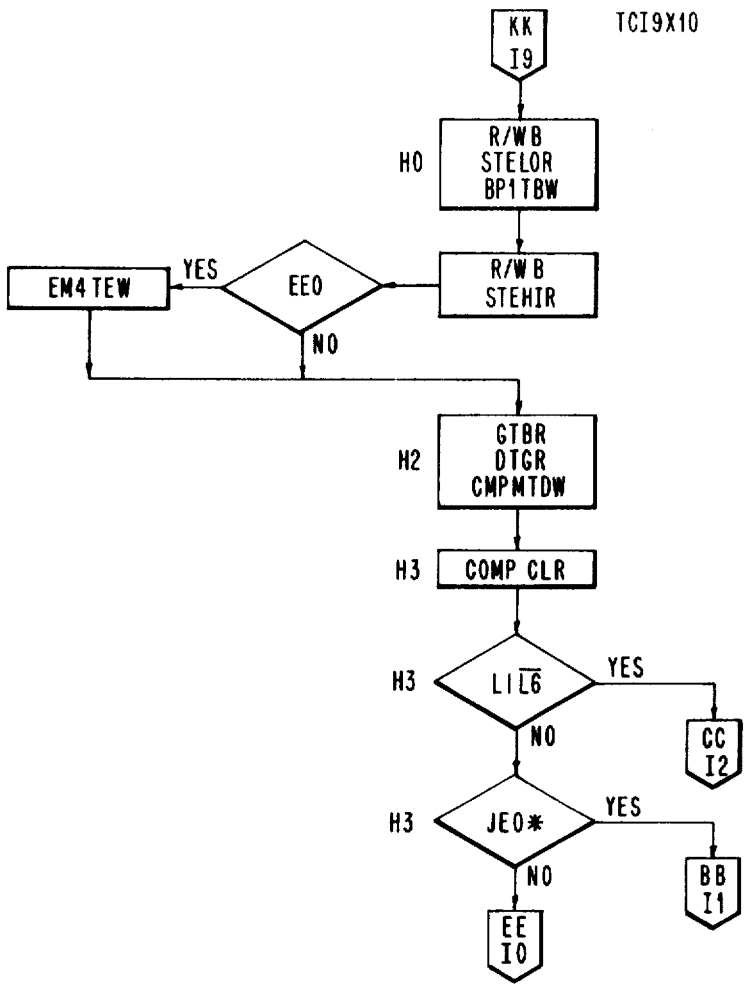

Referring now to FIG. 22 of the drawings, the system operation effected by the processor control unit 73 of FIG. 2 when the I-clock assumes its I9 state is depicted. During this operation, the escapement units for the newly created line created during the I8 operation or for the next line defined by the I6 operation are transferred into the E-register. Various indicators are then tested to determine whether the operation proceeds to an I0, I1, or I2 state.

Figure 23:
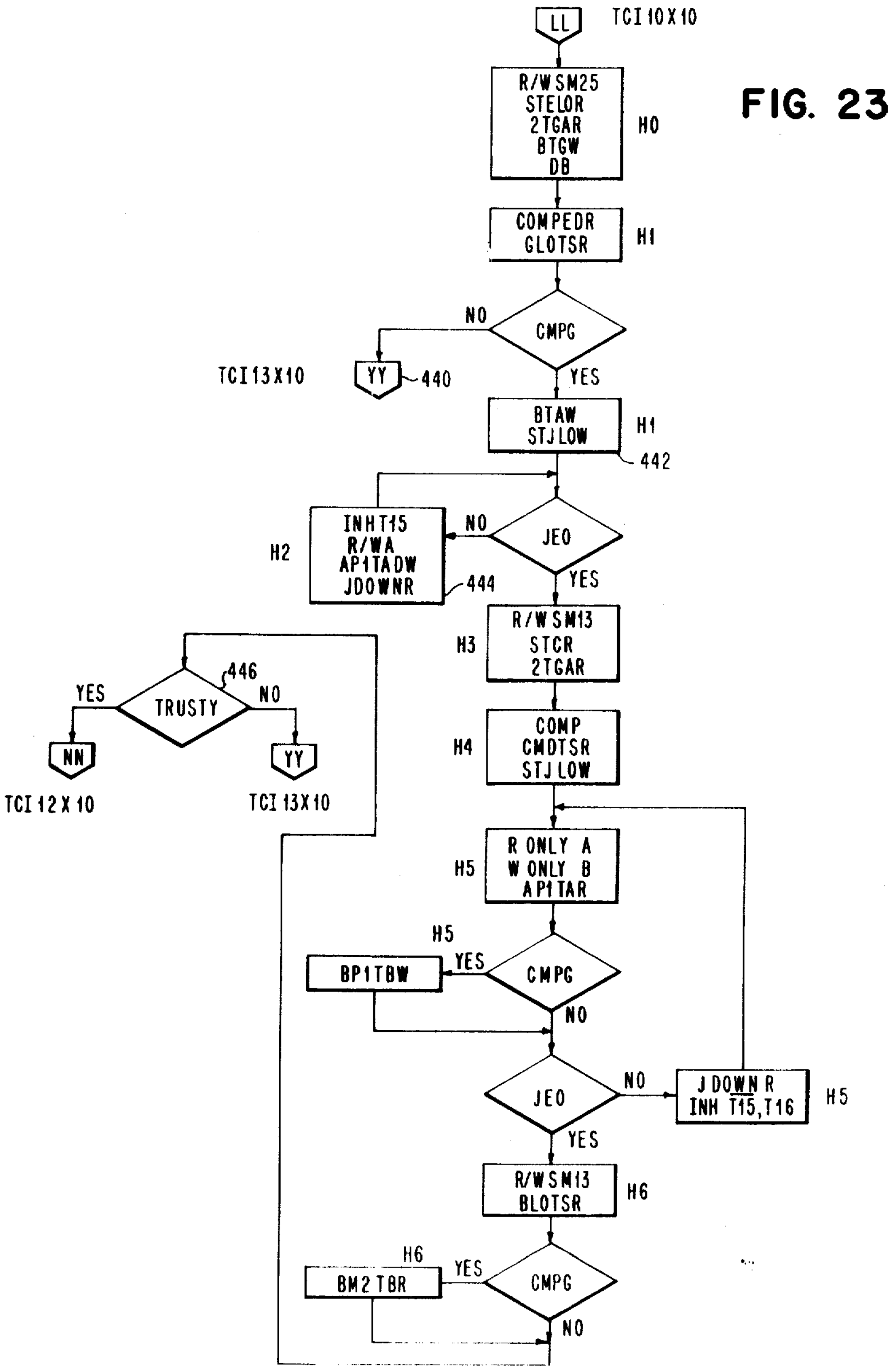

Referring now to FIG. 23 of the drawings, the system operations effected when the processor counter assumes its I10 state are depicted. During this operation, blank lines which may exist in display storage are closed over. It will be remembered that the text is stored in serial fashion and that the line group information specifies the display that the text appears on. When the line group information specifies that no text characters appear on a particular line number, a blank line would be created. This can occur when text is pulled up-page during a word optimization as the result of a character insertion operation, character deletion operation, margin adjust operation, etc. In order to close over the blank lines, it is only necessary to shift the line group information relating to display lines located down-page from the blank lines upward thereby eliminating the blank line group information. This operation is effected during the I10 state as shown in FIG. 23. During clock interval H0 and the first portion of clock interval H1, a test is made to insure that blank lines do exist in the register 101 of FIG. 2. If a blank line does not exist, the operation proceeds to the I13 state as noted by the connector block 440. If a blank line does exist, the number of blank lines is transferred into the J-register as denoted by block 442 and a test is made to determine whether the contents of the J-register is equal to zero. If J does not equal 0, the line group information relating to the blank lines stored in register 101 of FIG. 2 is deleted and the J-counter is stepped down as indicated by the operations performed by block 444. Once all of the information relating to the blank lines has been deleted (margin group number, number of characters in the line), the J-counter will be equal to zero and the operation proceeds to its H3 state. At clock times H3 and H4, a test is made to determine whether the blank line just eliminated is the last line of text. Additionally, the number of lines which must be moved upward in the line group storage register 101 of FIG. 2 is calculated and placed in the J-register of FIG. 2. During clock time H5, the information in the register is shifted upward starting with the first line occurring after the blank line(s) and shifting that line group information into the first vacated line group information. Once all of the line groups have been shifted upward to thereby eliminate the blank line, the end of text line number is stored during clock time H6 and the operation proceeds to block 446 to determine whether to proceed to the I12 state or the I13 state. The I13 state is assumed when it is necessary to replace the character at the cursor location.

Figure 24:
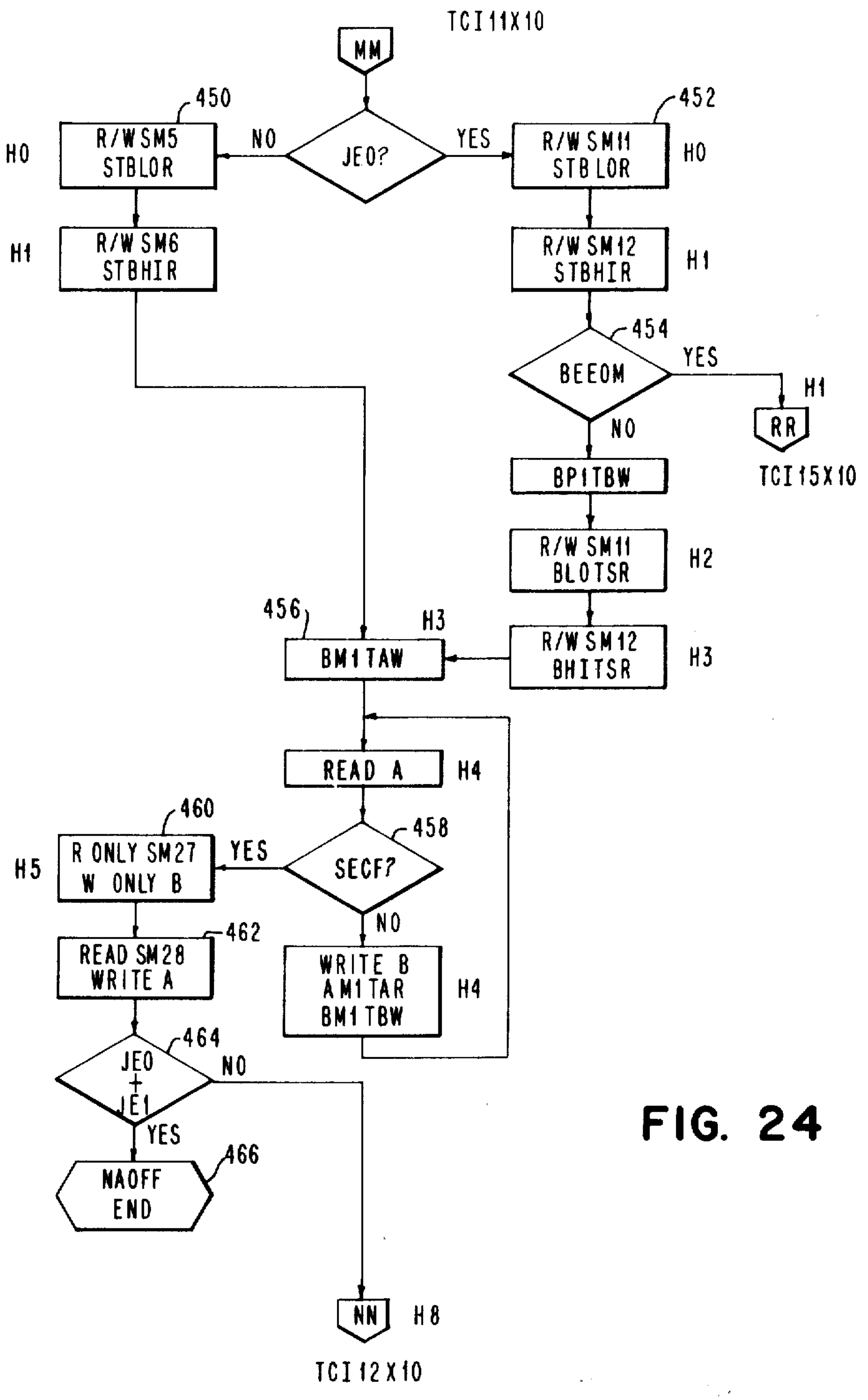

Referring now to FIG. 24 of the drawings, the system operation when opening up the text storage as defined by the I11 state of the program counter is depicted. When entering into this operation, the number of hyphens which have been replaced is contained in the J-register of FIG. 2. This information is stored in the J-register during the operation performed when the control counter is in its I13 state as will be described hereinafter. If a hyphen had been deleted from the text storage, the operation proceeds to block 450 whereupon text is shifted up page into the blank storage location. If no hyphens had been deleted during the insert operation, the operation proceeds to block 452 whereupon the last character in the text storage is examined to determine that it is not located in the last text storage position. If it is thusly located, it is necessary to shift this character out of the text storage unit and make room for the newly inserted character. Thus, a test is performed as noted by block 454 to determine whether the end of memory has been reached. Assuming that the end of memory was not reached, the end of memory address is updated by 1 and the operation proceeds to block 456. When the routine reaches the operation defined by block 456, the B-register contains either the location of the first blank text position created by a deleted hyphen or the end of text address. It is from the point defined by the B-register that text is shifted to during an open storage operation. Thereafter, text is shifted down-page to the blank location defined by the address in the B-register until the cursor flag is reached in text storage. At that time, the operation proceeds from block 458 to block 460 whereupon the character replaced by the cursor flag is restored to the location of the cursor flag and the character to be inserted is placed immediately preceding that character as defined by block 462. Thereafter, a test is made as indicated by block 464 to determine if further hyphens had been eliminated from the text storage. If the J-counter is equal to zero or to one, the word optimization operation ends as denoted by block 466. If, however, additional blank characters resulting in the removal of further hyphens exist, the operation proceeds to a text close operation defined by process counter condition I12.

Figures 25, 26:
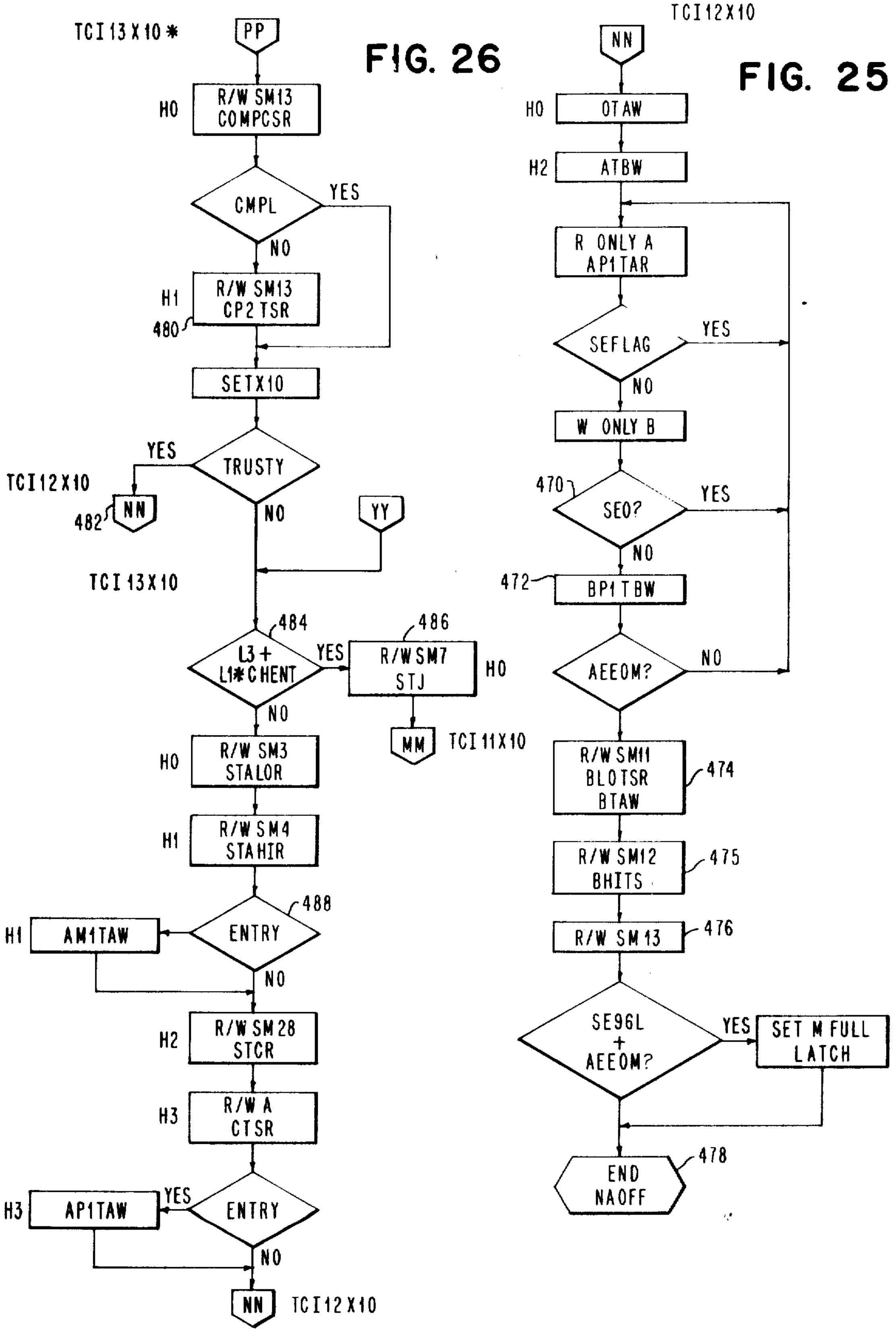

Referring now to FIG. 25 of the drawings, a text close operation is depicted which is defined by the process counter reaching an I12 state. During this operation, blank characters located in the text storage are removed and characters located down-page from the blank storage positions are moved upward to fill the blanks. This operation starts at the beginning of the text store and each character is successively gated out. A test is made as denoted by block 470 to determine whether the character thus gated out is a blank. If the character is a blank, the operation proceeds to read the next character and write it in over the blank character. If the character is not a blank, the B address counter is incremented by one as denoted by block 472 thereby insuring that the next read character will be stored in the next location. When the end of memory is reached, the end of text address is thereafter updated as indicated by blocks 474, 475, and 476 and the memory full latch is set if the end of text character is equal to the end of memory location or the end of text line number is equal to 96. Thereafter, the word optimization operation halts as denoted by block 478.

Referring now to FIG. 26 of the drawings, the operation utilized to update the end of text line number which occurs when the process counter obtains an I13 state is depicted. During this operation, if the last line optimized corresponds to the end of text line number, the end of text line number is updated and incremented by one. In the actual operation defined by block 480, 2 is added to the end of text line number because of the particular system configuration utilized wherein two bits of addressable text storage are required to define the line number. A test is then made to determine whether an input adjust operation was in progress. If such an operation was in progress, the operation proceeds to its I12 state as denoted by block 482. A test is then made to determine whether a character insert operation is in progress as denoted by block 484. If a character insert operation is in progress, the number of hyphens which have been deleted is inserted into the J-counter as denoted by block 486 and the operation proceeds to that defined during the I11 state. If an insert operation is not in progress, the cursor flag location is determined and the character displaced by the cursor flag is rewritten back into the text storage. A test is performed as denoted by block 488 to determine whether a replace operation was in progress. If a character replace operation is in progress, the cursor position would have been incremented at this point and it is therefore necessary to decrement the contents of the A-register to insure that the character replaced by the cursor flag is properly written into its location in storage. Thereafter, the operation proceeds to the I12 state described heretofore.

Figure 27:
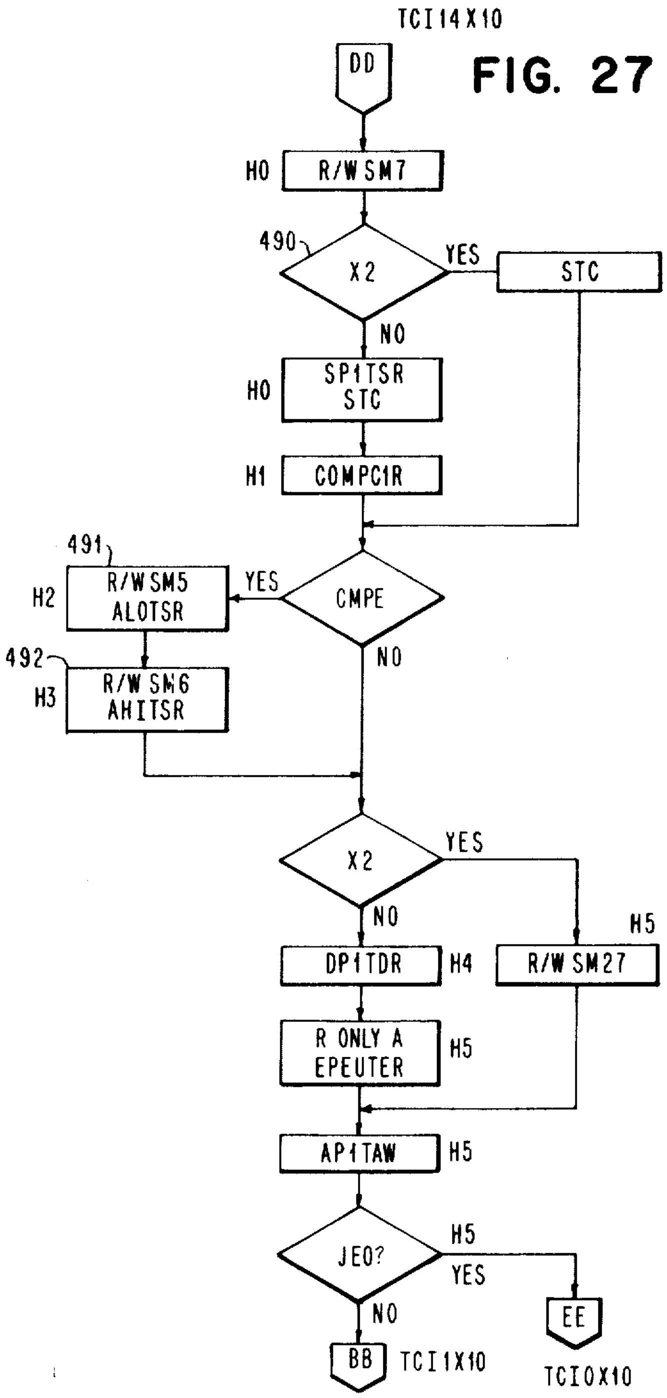

Referring now to FIG. 27 of the drawings, the operation of replacing syllable hyphens incurred during a scan line forward operation which is effected during an I14 state is depicted. The number of hyphens previously removed is first ascertained and a test is made as denoted by block 490 to determine whether a hyphen is being inserted. If a hyphen is not being inserted, the number of hyphens deleted is incremented and a test is made to determine whether this is the first hyphen deleted. The address of the first hyphen is stored as denoted by the operations of blocks 491 and 492. If a hyphen character is not being inserted, the D-register is thereafter incremented so that a proper count is contained relating to the number of characters on the line being optimized and the hyphen is replaced with a blank. Additionally, the escapement unit register is updated to delete the escapement units previously added for the character. In the special case where a hyphen is inserted, it is known that that is the desired line-ending point and therefore the hyphen is not deleted.

Figure 28:
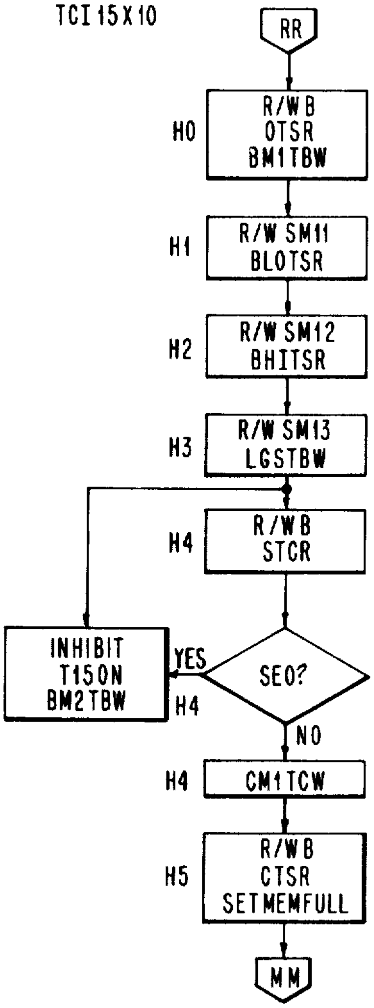

Referring now to FIG. 28 of the drawings, the operation defined when the process counter assumes its I15 state is depicted. This operation causes the last character located in the end of memory location to be removed to create a vacant spot during on open up memory operation which has previously been described with respect to the I11 state. In this operation, a blank character is inserted into the end of memory location and the line number containing that character is determined. Thereafter, the number of characters stored for that particular line number in the register 101 of FIG. 2 is decremented to show the last character is no longer associated with that line. The memory full latch is thereafter set.

Referring once again to FIG. 11 of the drawings, the operations effected during each status of the system depicted has been described. As has been previously described, the text control or word optimization operation can be initiated by several system operations. This operation preempts the display operation and utilizes the same hardware registers to effect its operation as are utilized during the display operation. Referring to FIG. 9 of the drawings, the various operations initiated by the system operator which place the system in a word optimization operation are depicted. As has been described, various setup operations are effected in accordance with the operation defined prior to entering the word optimization operation. These setup operations are further described in the following description relating to FIGS. 29–34 of the drawings.

When the operator desires to insert a character in the data stream at the point defined by the cursor mark or desires to insert a paragraph mark at the point defined by the cursor thereby causing text located to the right of the cursor to form a new paragraph, an appropriate keybutton located on the typewriter keyboard corresponding to the character desired to be inserted is depressed. This operation is depicted by block 161 of FIG. 9. For example, in the insert paragraph mark operation, the cursor would be located at any intermediate point in the text such as a sentence beginning in the center of a paragraph. The proper key is depressed which effects the formation of two paragraphs. The reverse operation can be accomplished to rejoin any paragraphs. Thereafter, the character or paragraph insertion operation is set up prior to proceeding to the word optimization operation. Referring to FIG. 29 of the drawings, the setup operation for the character and paragraph mark insertion operation is depicted. As noted by block 500, this operation is entered only when the character located on the keyboard latches during an insert operation is not a backspace character, is not a tab character, and is not a delete operation specifying the deletion of a carrier return. If The keyboard latches contain a carrier return symbol, this designates a paragraph insert operation. Thus, a special latch is set as denoted by block 501. The character to be inserted is stored in special memory location 28 and the cursor address is determined. The character located at the cursor address is stored in special memory location 27 and replaced in the text storage by a special cursor flag character. This latter operation is accomplished during time intervals H4 and H5. If the operation is a character insert operation, the cursor address is updated by one and the A-register is thereafter decremented to address the cursor flag location. During time H9, the address of the first character located on the line containing the cursor is calculated and stored in the A-register. At clock time H10, the number of characters located on the line to be optimized containing the cursor flag is incremented by one and placed into the J-register. The operation then proceeds to the word optimization operation.

Referring now to FIG. 30 of the drawings, the setup operation effected by the system when the operator depresses the backspace key when an insert mode is depicted. The horizontal position of the cursor is ascertained and a test is made as denoted by block 510 to determine whether the cursor is located at the left margin boundary. If the cursor is located at the left margin boundary, the operation is terminated since it is undesirous to move the "print point" beyond the margin boundary. If the cursor is not located at the left margin boundary, the cursor horizontal position previously stored in the C-register is decremented and the cursor address is also decremented. It should be pointed out that the cursor address corresponds to the address in the bulk text storage unit of the text character having the cursor located adjacent thereto. This information is in addition to the information relating to the cursor line number and cursor horizontal position which is also stored. The cursor flag is then stored in the test storage position defined by the cursor address. The number of characters located on the cursor line number is then stored in the J-counter during clock time H6. Thereafter, the updated cursor address is stored in its special memory 3 and special memory 4 locations and the address of the first character on the cursor line is thereafter determined and placed in the A register. A blank character is then written into the special memory 28 location so that no character is thereafter placed where the cursor flag is now located. Thereafter, the operation proceeds to the word optimization routine previously described.

Referring now to FIG. 31 of the drawings, the operation effected when a paragraph mark is deleted or when a syllable hyphen is inserted is depicted. This operation sets the system up to optimize the line preceding the cursor line. This is because the deletion of the paragraph mark from the line addressed by the cursor enables the first words located on that line to be placed on the preceding line if they fit. Thus, it is necessary to optimize the preceding line. In a similar manner, when a syllable hyphen is inserted, the word being split with the syllable hyphen is placed on the preceding line if it fits. Therefore, it is again necessary to optimize the line preceding the cursor line. During clock times H0 and H1, the cursor address is stored in the A-register and the L3 indicator is set if a syllable hyphen operation is in progress. The character located at the cursor address is then stored in the C-register and the special cursor flag is stored in its position in text storage. In a paragraph delete operation, the displaced character is stored in special memory location 28 while in an insert hyphen operation, the hyphen character is stored in special memory 28 and the displaced character is stored in special memory 27. The cursor address is thereafter incremented by one and stored in special memories 3 and 4 during clock times H5 and H6. Thereafter, the cursor line number factor is read and if in a paragraph delete operation, the paragraph mark associated with that line number is deleted from the register 101 of FIG. 2. If the operation is a hyphen insert operation, the cursor horizontal position is incremented by one and stored in the D-register. During clock times H9 and H10, the line number of the line to be optimized is decremented provided that a paragraph mark does not exist on that line number during a syllable hyphen insert operation. Thereafter, the address of the first character on the line to be optimized is calculated and the operation proceeds to the word optimization routine previously described.

Referring now to FIG. 32 of the drawings, the replace operation setup is depicted. This operation is entered whenever the operator places the system in the replace mode to replace a preexisting character in text storage with a newly entered text character from the keyboard. Additionally, the operation is entered when the operator deletes previously stored text characters from the storage and also is utilized as a portion of the margin adjust operation to be described hereinafter. Referring now to FIG. 32, the cursor address is stored in the A-register during clock times H0 and H1. Thereafter, the character located at the cursor address is replaced with the special flag character and if a replace operation is in progress, the character located on the keyboard latches is stored in special memory location 28. Otherwise, the replaced character is stored in the special memory location 28. During clock times H4 and H7 the cursor line number is determined and thereafter, the number of characters located on the cursor line is ascertained. During clock time H8, the location of the cursor is checked to determine whether it is beyond the last character on the line and the L3 indicator is set if it is beyond the last character when in a replace operation. When in replace mode, the cursor horizontal position is incremented by one during clock times H9 and H10. Further, during clock time H11, the replaced character located in the C-register is stored in special memory location 27 and the number of characters on the cursor line located in the E-register is transferred to the J-register. During clock time H12, the address of the first character of the line addressed by the cursor is calculated and the operation proceeds to the word optimization routine previously described.

Referring now to FIG. 33 of the drawings, the initial setup effected when the operator performs a margin adjust operation is depicted. During this operation, the operator specifies a new margin group to be utilized with the displayed line of text containing the cursor. That is, the operator specifies new left and right boundaries for a line or text or for an entire paragraph of text. Thereafter, the words located between the old margin boundaries are reoptimized to the new margin boundaries.

The format group containing the new margins to which the text will be adjusted is read from its location in special memory 9. The cursor line number is then read and the new format number is placed into the register 101 in place of the old format number for that line number. If the line addressed by the cursor has a paragraph mark associated therewith, the paragraph mark is rewritten back into the register 101. A test is then performed to determine whether the entire paragraph is to be adjusted. If the entire paragraph is to be adjusted to the new margins, the end of text line number is read for later utilization during a compare operation and the cursor line number is incremented by one during clock time H0 of the new I3 state. If the thus incremented line number does not equal the end of test line number and if this line number does not contain a paragraph indication, the operation continues. The operation is halted when the end of text is reached or when a paragraph mark is found. During clock time H3, the new format number is written into each line number accessed. Thus, each line of a paragraph or each line until the end of the text is set with the new format number specified by the operation. Thereafter, the operation proceeds to the replace setup routine previously described.

Referring now to FIG. 34 of the drawings, the input adjust setup operation is depicted. This operation is effected each time the input buffer 63 of FIG. 2 is transferred to the bulk text storage 67 of FIG. 2. During clock times H0 and H1, the end of text address is accessed for later utilization and two indicators, L6 and TRUSTY are set. The end of text line number is then placed in the B-register and from this point, the line groups stored in the register 101 are sequentially adjusted in reverse scan until a line group containing a paragraph mark or until the end of text is reached. At that point, the word optimization operation is initiated by setting the text control latch which resets the input latch.

Referring once again to FIG. 2 of the drawings, it has been described how information can be inputed into the device from the card reader-recorder 15 through the I/O channel 53. In a similar manner, information can be outputed from the bulk text storage unit 67 through the sense register 57 and the I/O channel 53 to the card reader-recorder. In the description which immediately follows, the overall operation of reading characters from the card reader-recorder will be described. Thereafter, a description of outputing character information to the card reader-recorder will follow.

Referring now to FIG. 35 of the drawings, a card input operation is initiated when the operator depresses a read key located on the control keyboard of the system. Thereafter, a magnetic card is incremented with respect to a recording transducer so that a serial track of data characters is sensed. As the card is travelling, the data character is sensed and loaded into a register associated with the card deck.

Thereafter, the card deck requests a system interrupt to load the character into the input buffer 63 of FIG. 2. In this manner, each of the characters are serially read until all of the characters located on a track on the card have been read into the input buffer. At this time, the indicator 550 indicates that a complete track has been completed. Thereafter, the number of spaces located at the beginning of the input buffer 63 are examined to select a desired left margin location. If no space characters are located at the beginning of the track, the format information contained in the register 100 having the leftmost left margin location is selected. If a tab code is sensed prior to the sensing of character information, the format information containing the left margin location located immediately to the right of the leftmost left margin location is selected and the operation thusly proceeds for each tab code sensed. Once the format information has been selected, it is assigned to the line group contained in register 101 for the line being inputed. Thereafter, the characters located in the input buffer are sequentially scanned and examined to determine whether each code is to be stored in the bulk text storage unit. Certain control codes are not stored while all remaining codes are stored. The characters are sequentially stored in the bulk text storage unit 67 until the track terminate code is sensed. Since this is a code which is not stored in the data stream, and which indicates that all of the characters have been examined, the operation proceeds to block 554 whereupon the newly inputed text is adjusted to the selected margins as has been previously defined. Thereafter, the next track of information is read from the card until all of the tracks containing information have been read.

If a code to be ignored is sensed which is not a track terminate code, it is analyzed as connotated by block 556 and written into the text memory location. During certain special cases, it is necessary to convert a code or sequence of codes on the card to a code, sequence of codes, or other action that is recognizable by the data editing system. This operation is defined by block 558.

Referring now to FIG. 36 of the drawings, the data output operation is depicted. This operation is initiated when the operator depresses a record key located on the control keyboard. The operator must further specify the last line that is desired to be outputed and the lines located after the designated line in the text storage being retained and shifted upward to fill in the blank locations left by the outputed text. The format information of the line to be outputed is examined by the operation denoted by block 560 to determine the left margin location. Thereafter, the number of space codes necessary to create this left margin location is determined and transferred to the character output buffer. Next, each character on the line to be outputed is sequentially read from the text memory and stored in the output buffer until the complete line of text characters has been outputed at which time a track terminate code is loaded into the output buffer as denoted by the operation defined by block 562. As in the input operation, codes and code sequences in the data editing system may be converted for the output card. Thereafter, an interrupt control is initiated which effects the transfer of text characters from the output buffer to the card track. If the code thus transferred is not a track terminate code as denoted by block 564, or a card terminate code as denoted by block 566, the next character is thereafter accessed. Eventually, the track terminate code is reached at which time the operation proceeds back to block 560. If the page end flag indicator is found indicating that text located down-page is not to be transferred to the output device, a card terminate code is loaded into the output buffer as denoted by the operation of block 568. Thereafter, the text which has been outputed to the output device is deleted from the bulk text storage unit and the remaining text is shifted up-page.

DISPLAY

Referring once again to FIG. 2 of the drawings, the various operator-initiated functions such as character insert, margin adjust, character replace, input and output, etc., have been described. Each of these operations utilizes the various registers 90–95 and the format information contained in the control storage 59. Additionally, the characters located in the bulk text storage are examined during these operations. As has been described, the same registers and storage devices are utilized during the display of the information contained in the bulk text storage unit. That portion of the system which is unique to the display consists of the F-register 75, the character generator 76, the serializer 81, and the display unit 11. The processor control 73 contains additional logic to effect the display operation. The clock 79 is also utilized to effect the display operation. This dual utilization of the registers for text control and display functions effects the efficient use of these registers for the complex text calculations as well as for the display.

Referring briefly to FIG. 3 of the drawings, the dot times of the clock 73 of FIG. 2 are depicted. As has been described, 18 dot times are utilized to effect a single scan line of one displayed character, the first three dot times being utilized for retrace. Dot times 4–18 are thus utilized to effect the display of a scan line of one character. The CRT beam is selectively blanked and unblanked in accordance with the information to be displayed during that scan line. The number of scan lines per character is dependent upon the escapement value of the character. When standard spacing is utilized, the number of scan lines is a constant and is equal to nine.

The scan lines are vertical scan lines and are serially effected to form a character representation. Each character is sequentially generated in the same manner until the beam has completed displaying a line. The beam is then blanked and returned to the leftmost position awaiting the next line of display. In all, eight lines of display are generated. The 96 possible lines of display are divided into frames of eight lines each for the purpose of effecting the display. The initiation of each display frame is synced to the line frequency. Thus, a 60-cycle line will initiate a display every one-sixtieth of a second. This results in a display which does not flicker or jitter.

Referring once again to FIG. 2 of the drawings, the processor control 73 controls the gating of the characters and the calculation of the various factors which are necessitated during the display operation. During this operation; the A-register 90 is primarily used to contain the address in the bulk text storage of the character to be displayed and the B-register contains the address of the line number to be displayed. Additionally, the number of characters appearing on the line to be displayed, the cursor vertical and horizontal position, the left margin location and the line length of the displayed line are also necessary factors utilized during the display operation and are retained in various ones of the registers.

As has been described, the processor control 73 controls the gating of the text from the bulk storage to the display unit. The operation of this device is depicted in FIG. 37 of the drawings. Referring now to FIG. 37, the various I-states assumed by the process counter during a display operation are depicted. As described heretofore, a display operation is initiated with the 60-cycle sync detector. At this time, it is desirous to initiate the display of the top line of display. The operation thus proceeds from an I15 state denoted by block 600 to an I7 state denoted by block 602. During this time, initial factors are set up. These factors include the line number to be displayed, the text address of the first character of that line, and the cursor line number. The operation then proceeds to its I8 state as denoted by block 604 whereupon further initialization is effected. Thereafter, the operation proceeds to control state I0 as denoted by block 606. It should be noted that 21 H-states are utilized by the operation defined by blocks 600–604. During this time interval, the blanked beam is reset to the leftmost display position. During control state I0, various transient conditions effected by the high-speed retrace of the beam are allowed to be dampened. During control clock times I1 and I2, the line number of the line to be displayed is displayed. Although each line number could thusly be displayed, only every fifth line has a line number displayed with it. This line number refers to the line number 1–96 of the line as it is located in the text storage. During clock time I3, the paragraph mark is displayed if there is a paragraph mark associated with the line being displayed. During clock time I4, the blank space between the paragraph mark and the display of the left margin is effected, the display of the left margin is effected, the text character display is effected, blank space between the last text character displayed and the right margin is effected and the display of the margin is thereafter effected. The operation then proceeds to an I15 state as denoted by block 608. Since the top line is not to be thereafter displayed until the next frame, the memory address of the first character to be displayed on the next line is calculated, the left margin and line length of the next line is calculated, etc., during clock time I7 as denoted by block 610. Thereafter, each of the remaining lines to be displayed are processed in a similar manner. When the eighth line has been displayed, the operation proceeds to block 600 awaiting the next sync pulse to initiate the display of the next frame. It should be noted that the operations effected by block 600 and 602 are timed with the beam sweep as are each of the operations performed during the various I states. In this manner, the processor is synced to the dot clock which in turn controls the display.

Figure 38:
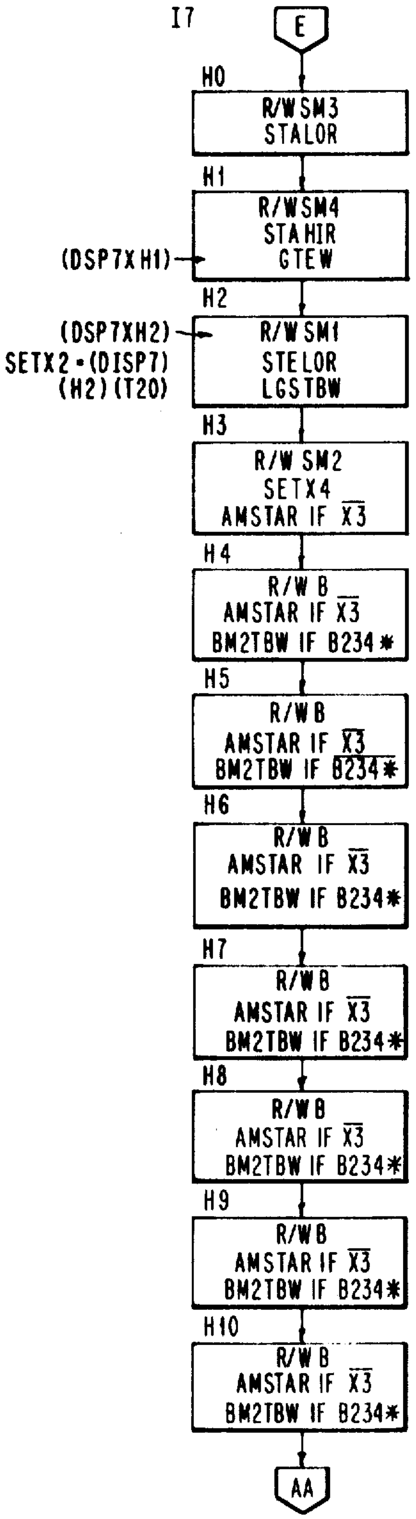

Referring now to FIG. 38 of the drawings, the operation performed when the process counter is in its I7 state is depicted. This operation establishes the position of the eight-line viewing frame on the 96-line page based on the cursor vertical position. When the top line is to be displayed, the cursor address is accessed to determine the line number addressed by the cursor. Thereafter, a determination is made to see whether this line number is any multiple of eight in which case the line addressed by the cursor is displayed as a top line of display. If the line number is not an even multiple of eight, one is subtracted from the line number count and the comparison is further made until a line number having a multiple of eight is determined. This is then utilized as the first line of display. It will be noted that at clock time H4, two is subtracted from the B-register which contains this line number factor. This is due to the hardware utilized to implement the system which utilizes binary numbers to maintain the line number count. Once the top line is determined, the operation proceeds to clock time I8. It should be noted that this operation is entered for each line to be displayed. For these additional lines, the only operations performed are those in clock times H1 and H2 denoted by the term "DSP7X." Other than these two operations, the H-clock is utilized merely to control the amount of time utilized by the processor during retrace of the beam.

Figure 39:
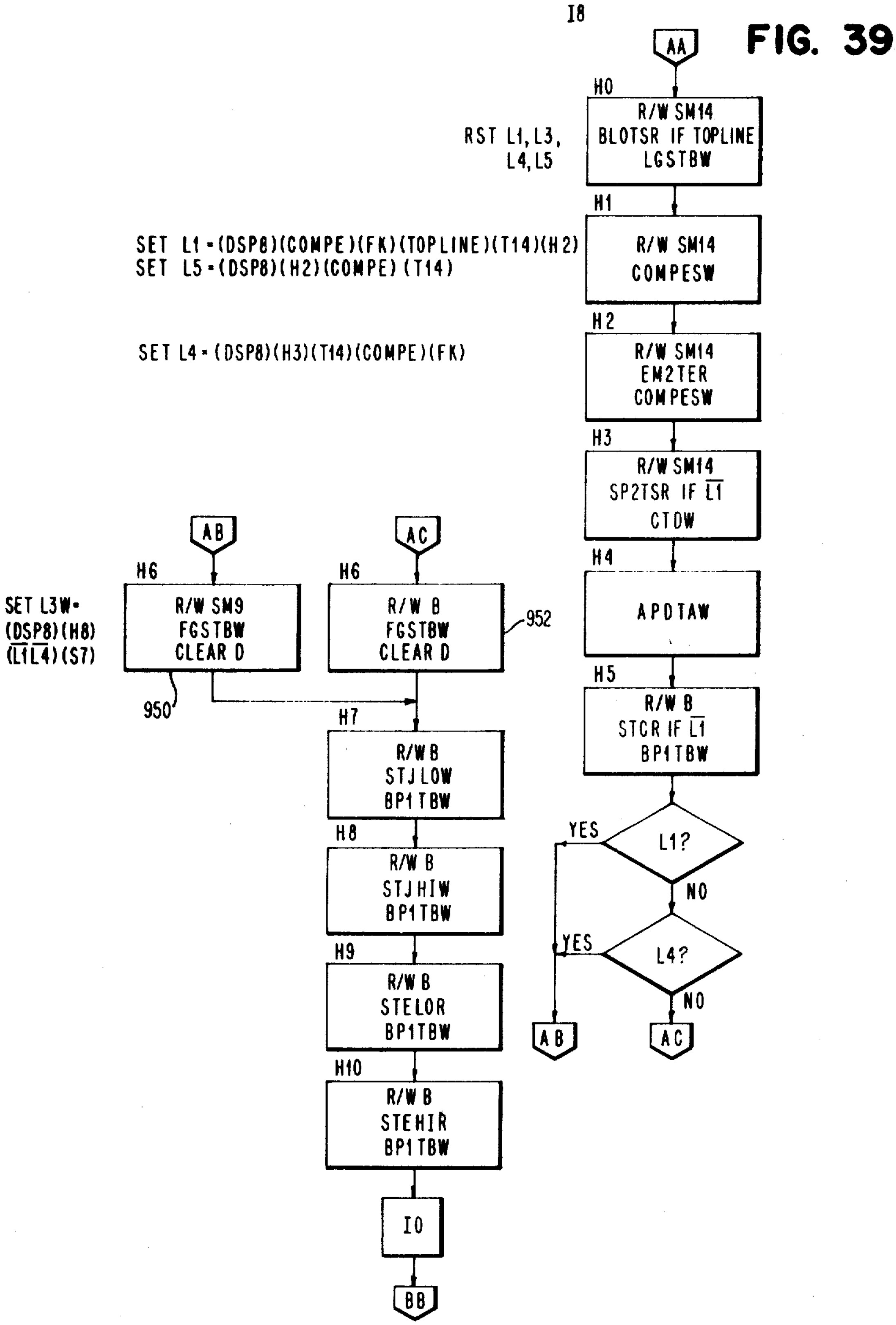

Referring now to FIG. 39 of the drawings, the operations effected during clock time I8 are depicted. During clock time H0, the number of the line to be displayed is stored in the B-register. Thereafter, a determination is made as to whether the cursor will be displayed during this line and an appropriate indicator is set. Additionally, various indicators relating to the display of scale information are set during clock time H2. During clock time H3, the display line number is updated and during clock time H4, characters of the preceding line which were not displayed are skipped over by changing the address of the A-register to the text character which is the first character of the line to be displayed. This can occur for one or more space codes past the last word on a line that exceed the right margin and are not to be displayed on either line. During clock time H5, the number of characters on the line to be displayed is loaded into the C-register if a scale display is not effected. During clock time H6, the format number of the line to be displayed is obtained provided a scale is not to be displayed. Thereafter, during clock time H7 and H8, the left margin for the line to be displayed is stored in the J-register and during clock times H9 and H10, the line length in escapement units of the line to be displayed is stored in the E-register. As has been described before, during clock time I0, blank timing cycles are effected.

Figure 40:
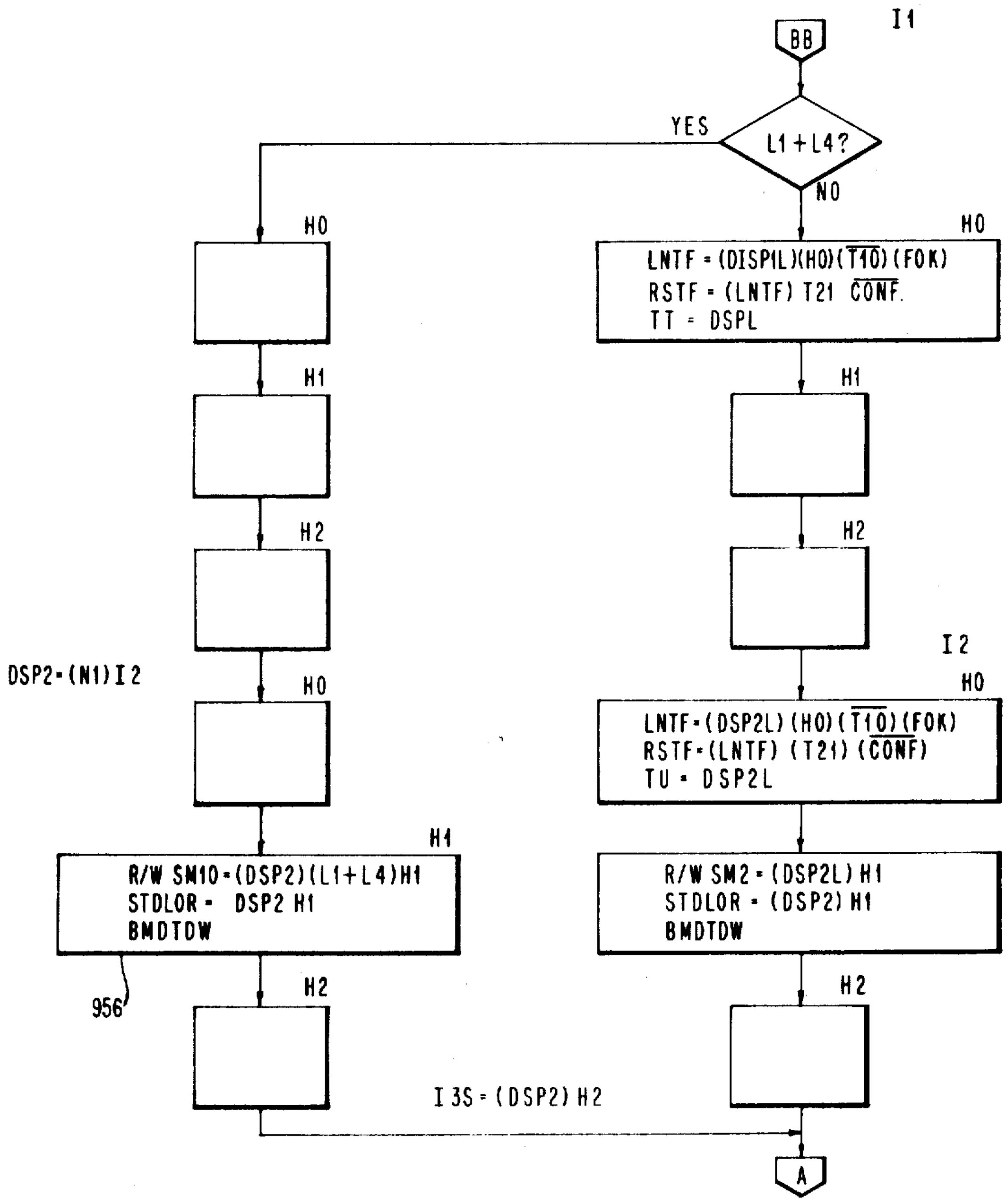

Referring now to FIG. 40 of the drawings, the system operation during clock time I1 is depicted. A test is first made to see whether scales are being displayed. Assuming the scales are not to be displayed, the ten's position of the line number of the line to be displayed is gated into the F-register 75 of FIG. 2 during clock times H0–H2 and this digit is displayed. Thereafter, the system progresses to its I2 state whereupon the units position of the line number is displayed. As previously described, only the line numbers which are multiples of five are displayed. Additionally, during the H1 time of this operation, the cursor horizontal position is stored in the D-register.

Figure 41:
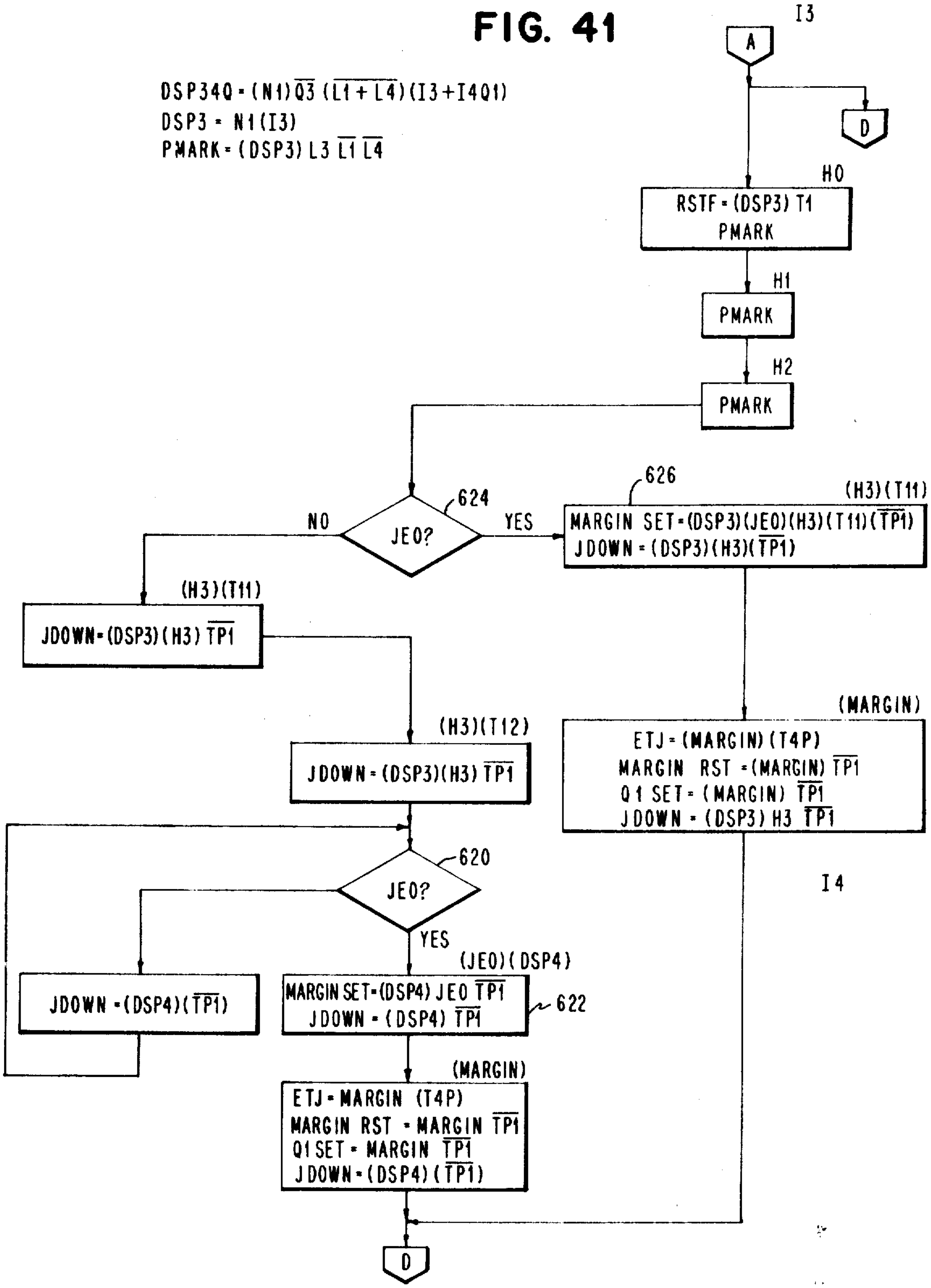

Referring now to FIG. 41 of the drawings, the operations effected by the system during clock time I3 are depicted. During this operation, the format character containing a paragraph mark designation for the displayed line is checked to determine whether a paragraph mark should be displayed. This paragraph mark is displayed during clock times H0 through H2. It will be recalled that the location of the left margin is contained in the J-counter in terms of escapement units. After the display of the paragraph mark, if J does not equal zero, each scan line counts the contents of the J-counter down until the point at which the left margin is to be displayed is reached. At this time, the contents of the J-counter is equal to zero and the operation proceeds from block 620 to block 622 which effects the display of the left margin indicator at that point. Additionally, the contents of the E-register which designates the line length is transferred to the J-register. Once the display of the margin has been effected, the spaces and characters on the line to be displayed are successively gated out. Eventually, the J-counter reaches a count of zero whereupon the right margin indicator is displayed. A special condition exists when the left margin is at its full leftmost limit. When this occurs, the count in the J-counter is equal to zero immediately after the display of the paragraph mark and the operation proceeds from block 624 to block 626. At this time, the left margin is immediately displayed and the contents of the E-counter are transferred to the J-counter and the operation proceeds as previously described.

Figure 42:
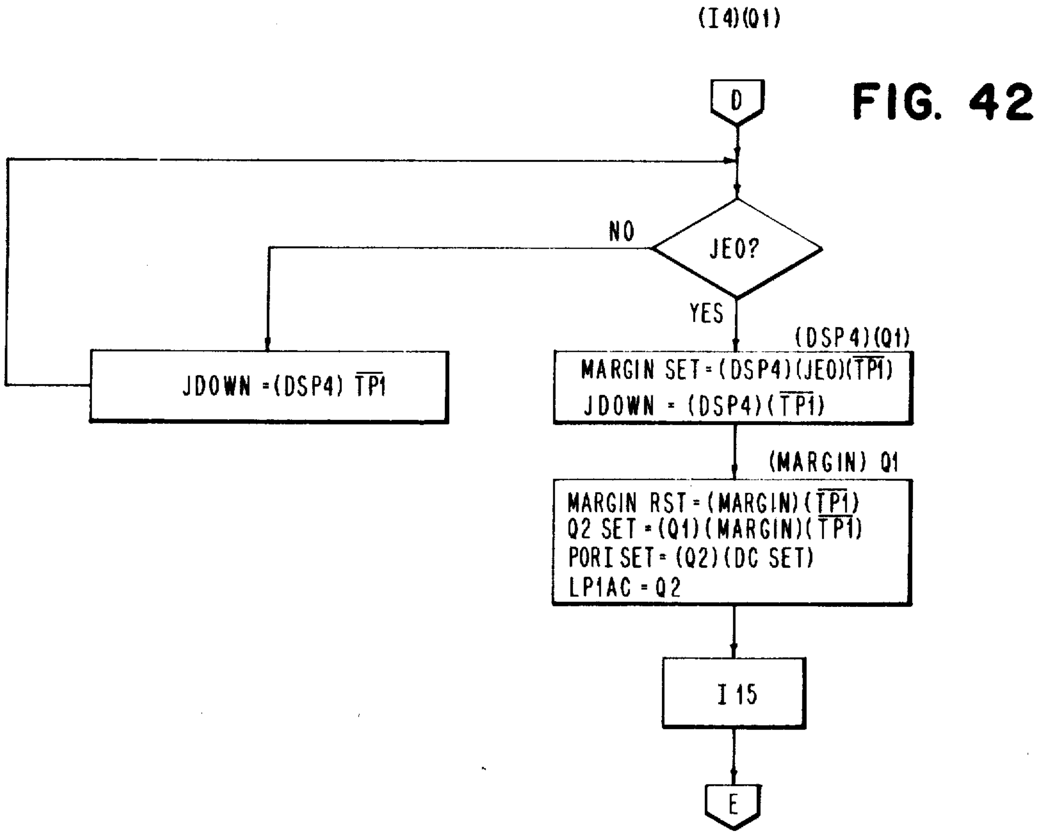

Referring now to FIG. 42 of the drawings, the operation which keeps track of the display of the right margin is depicted. This operation runs in parallel with the processor which is displaying the text. That is, the information content of the J-counter is decremented with each scan line which in turn is a function of the display device. When the count in the J-counter reaches zero, the right margin is displayed and the control clock is advanced to I15.

Referring now to FIG. 43 of the drawings, the operation of the processor when displaying text characters in a line of display is depicted. It will be recalled that two scan lines are effected for each H-cycle which in turn includes a read/write cycle. Since the character having the minimum escapement contains four scan lines, it is necessary to effect two H-cycles to display that character. Since the access of the next character to be displayed and the appropriate calculations made during this access can be accomplished during one H-cycle, the other H-cycle is free for a cursor motion calculation or an interrupt operation. During this interrupt operation, a character may be processed from or to the card input/output unit. This interrupt cycle takes place when it is desirous to make such an I/O transfer during clock time H1 of the I4 display cycle. If no such input/output operation is effected during this time, the horizontal position of the cursor located in the D-register is decremented by one. If an I/O interrupt is effected, it takes three H0 cycles to perform the I/O operation. Thus, the I/O operation is effectively overlapped with the display of three characters. If an interrupt operation had been effected, it is necessary to decrement the horizontal position of the cursor located in the D-register by four instead of by one to insure that the cursor is displayed in the proper position. During clock time H1, the next character to be displayed is accessed and retained in the S-register and the address in the A-register containing the text storage address of the character to be displayed is incremented by 1. As depicted in blocks 650 and 653, when the T-clock keeping track of the number of scan lines does not equal the number of escapement units for the character displayed, the T-clock continues providing additional dot times until the complete character is displayed. For proportional display, the escapement units are furnished by the EU decode identified as block 77 in FIG. 2. For standard display, this same decode is forced to render a nine-unit value. Once the complete character is displayed, the next character to be displayed is gated from the S-register into the F-register. Providing the number of characters does not equal zero and the cursor horizontal position is not yet detected, the next character is thereafter displayed during clock times H0 and H1 and additional necessary clock times depending upon the width of the character. When the cursor position is located, it is displayed by the set cursor operation. When the last character on the line to be displayed has been displayed, the C-counter equals zero and the Q3 indicator is set. The Q3 indicator keeps the operation cycling through the H0 and H1 states without displaying text characters thereby providing for an I/O interrupt. Once the right margin location is reached, the right margin is displayed and the operation is terminated.

FIG. 44 relates to the display of scale information.

FIG. 45 is a timing diagram of the I2 through I4 states of the system during the display operation. As has been described, during the I3 state, the location of the left margin which is to be displayed is determined by counting the J-counter down. When the J-counter reaches the count of zero, (initial value assumed to be nine), the left margin is displayed and the line length escapement value (assumed to be 45) is transferred into the J-counter. Thereafter, the I4 operation is initiated and the text characters are displayed.

CURSOR OPERATION

Referring once again to FIG. 1 of the drawings, it has been described how a cursor indicates visually the point of action. For a character operation, the point of action is defined as the character located adjacent to the cursor which is, of course, stored in the bulk text storage of FIG. 2. If a line operation is specified, multiple characters appearing on a line addressed by the cursor are involved in the specified operation. Thus, the cursor specifies, for example, the point at which a new character is inserted during an insert operation, a character to be replaced during a replace operation, a character to be deleted during a delete operation, a character to be underscored, the point at which a paragraph mark is to be inserted during a paragraph mark insert operation, and the character to be removed during an error correct backspace. All of these operations are character at a time operations. Additionally, the cursor specifies line operations such as the line to be adjusted to new margin boundaries, a line justification operation, deletion and underscore of all characters located to the right of the cursor on the line, and display frame control whereby movement of the cursor to a different multiple of eight lines effects the display of the newly addressed eight lines. The cursor may be moved incrementally a character at a time, or when in a different mode, can be moved a word at a time, line at a time, paragraph at a time, or frame at a time. The cursor may be moved to the right and to the left, up-page and down-page. All cursor motion is controlled by the cursor control keyboard 33 of FIG. 1.

Referring now to FIG. 46 of the drawings, the overall state diagram for cursor motion operations is depicted. A cursor motion operation is effected when the operator depresses a cursor key on the cursor keyboard. As has been described, the cursor moves a character at a time, a word at a time, a line at a time, a paragraph at time, or a frame at a time forward or backward in accordance with the keybutton depressed and in accordance with the mode of operation which the machine is placed into. For example, when the machine is in insert mode, the cursor is moved a word at a time when the operator depresses a horizontal motion cursor key. When the system is in replace mode, depression of the same key effects motion of the cursor by one character position. It should be noted that the cursor is also moved under the control of the word optimization operation, the input/output operation and various other control operations during the internal processing of text data. As has been described, the display operation always determines the frame to be displayed in accordance with the location of the cursor position.

During a cursor motion operation, the cursor factors which include the cursor line number, cursor horizontal position, and memory address of the character adjacent to the cursor are accessed. A test is then made to determine whether a page record operation has just been completed. If so, it is desirous to move the cursor to the first position of text storage and delete all text which was outputed and move the remaining text intact to the page start. If a record operation was not completed, the characters are restored to their special memory locations. Storage of the cursor factors in a special memory location prevents their being lost when a power-off operation and a subsequent power on operation is effected. The cursor factors are again accessed from their special memory locations when the process counter assumes its I1 state as denoted by block 703. These cursor factors are located in various registers so that they may be later updated in accordance with the operation specified.

When the operator specifies a cursor left operation, the process counter assumes its I12 state and the text characters are scanned in the reverse direction from the text character adjacent to the cursor position. If the system had been in replace mode, and the rapid motion key had not been depressed, the text character located to the left of the cursor would be accessed from the storage unit and replaced. The address of this text character would then be utilized to denote the new cursor storage address and the register containing the horizontal position of the cursor is decremented by one character thereby giving a new horizontal position for the cursor. If, however, an insert mode operation was designated, the text characters are accessed until a space character following a previously accessed text character is found or until the left margin boundary is reached. As each character is read out, the cursor horizontal position is decremented by 1. When the operation ceases, the address of the character located to the right of the space character is utilized to define the new cursor address. If the rapid motion key had been depressed, the operation moves at three-word jumps. Release of the rapid motion key during this type of scan causes the cursor to halt its motion at the beginning of the next word which is accessed following the release of the key or the motion will halt at the left margin. If the operator places the cursor adjacent to the left margin and thereafter specifies a cursor left operation, the cursor is moved to the rightmost position of the preceding line and proceeds as has been described. Once the new cursor factors have been determined, the process counter is set to its I3 state and these factors are stored in their special memory locations.

In the one instance where the cursor is moved to the preceding line or when an operation other than a cursor left operation is specified, the process counter assumes its I2 state. This state has graphically been depicted as two blocks, 705 and 707 although these blocks are both part of the I2 cycle time of the system and are defined by their unique H-times. During the first portion of the I2 state, the output flag information specifying the last line of a page being outputed which the cursor is prevented from addressing, the paragraph information, and the margin group information is accessed from the line group information register. During the cursor left operation as has been described, the line factors for the next higher line are thereafter accessed and the cursor vertical and horizontal positions are calculated so that the cursor may be placed adjacent to the rightmost keying position of the line. Thereafter, the I3 state is assumed as has been previously described. Also, during a cursor up operation or a paragraph up operation, the factors for the next higher line are obtained and the cursor horizontal position is moved so that the cursor is adjacent to the leftmost character of the line. If a single cursor up operation has been specified or if the line group information indicates that the next line has a paragraph mark on it, the processor assumes its I3 state. If the paragraph up key had been depressed and a paragraph mark were found located on the next higher line, the cursor continues to move upward until such a paragraph designation is found or until the top line which can be accessed is located.

If the rapid motion key has been depressed, and the cursor up key is depressed, the operation remains in the loop between block 705 and 707 until eight lines have moved up which is cursor motion by frame. At this time, the operation proceeds to the I3 state.

Thus far, a cursor up, paragraph up, and cursor left operation have been described. In the following description, a cursor right, cursor down, and paragraph down operation will be described. When such an operation is specified, the operation proceeds to its I4 state from block 705 to block 709. During time I4, the factors which define the next lower line including the number of characters located on the line are accessed. Thereafter, the operation proceeds to an I5 state whereupon the line group information defining the line which was previously accessed controls movement of the cursor to the right and down. It is during this operation that the text is actually accessed and modified in accordance with the operation specified (e.g., delete, underscore, etc.) and the operation continues until a stopping point is reached. If a single character is to be deleted or if the cursor is to be moved one character to the right, the operation proceeds immediately from block 711 to block 713 after one character has been accessed. However, if the cursor is to be moved through an entire word or if the word is to be deleted etc., the operation remains in block 711 until all of the characters of the word have been deleted. In a similar manner, if a cursor down or paragraph down operation has been defined, all of the characters remaining on the line addressed by the cursor are accessed in block 711 until the rightmost margin is reached. Thereafter, the operation proceeds to block 713 whereupon various tests are made to determine whether the operation should be terminated or should continue. In all operations except a delete operation, the cursor factors are stored in their special memory locations prior to accessing the next lower line. Thus, the operation proceeds from block 713 to block 715. If a valid stop point had not been reached, the operation proceeds from block 715 back to the I4 state defined by block 709 and the factors for the next lower line are obtained. This operation continues until a stop point, such as a paragraph mark found during a paragraph down operation is reached. At this point, once the cursor factors have been stored during processor control time I3, the operation halts.

If a delete operation had been specified, the operation loops from block 713 to block 709 until a valid stop point is reached. At this time, the operation ceases and the word optimization operation is entered. The cursor factors which are presently in storage at that time locate the cursor location which existed at the beginning of the operation. That is, during a delete operation, it is desirous to leave the cursor in its present position and to shift text which is not deleted up-page so that it is adjacent to the cursor, the deleted information being removed from the text storage unit.

Figure 47:
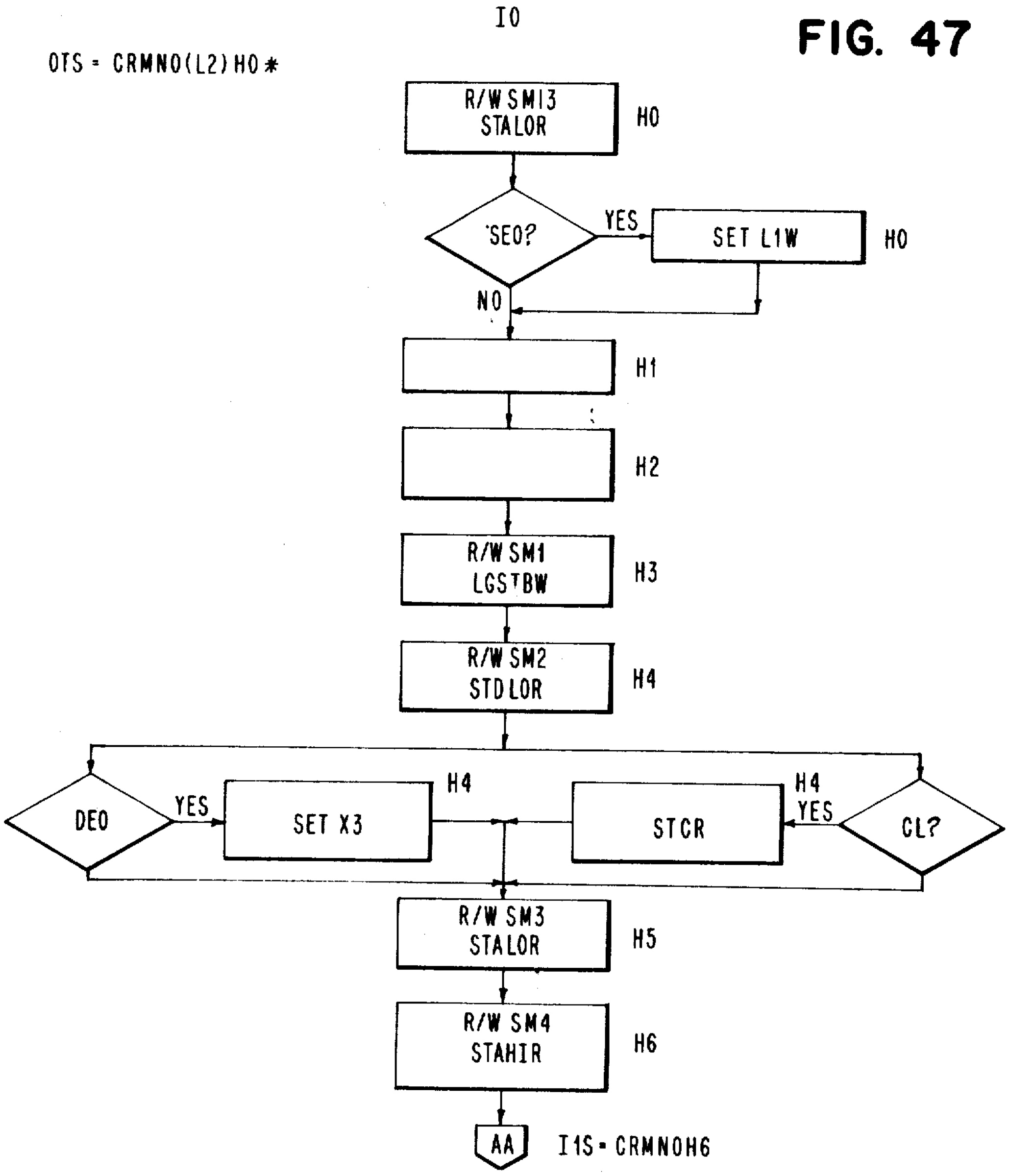

Referring now to FIG. 47 of the drawings, the processor operations defined during the I0 state of a cursor motion operation are depicted. During the I0 state, the end of text line number is sampled to check if it is located at the top of the text storage unit. If it is, the L1 indicator is set for later utilization. Thereafter, the cursor factors are accessed from the special memory locations and various indicators are set if the cursor is located at its leftmost horizontal position or if a cursor left operation is specified. The remaining cursor factors are read during clock times H5 and H6. As has been described, a zero is set into the sense register during all clock times except H0 during a page delete operation. In this manner, the cursor is placed adjacent the first position in the memory and located at the leftmost position of the top line of display. The delete operation is thereafter effected until the output flag indicator is found.

Referring now to FIG. 48 of the drawings, the operations effected during clock time I1 are depicted. This operation is virtually identical to that described previously with respect to the I0 state, except that the page delete operation is not effected and a test is made as denoted by block 717 to determine whether a cursor left operation is in progress. If such an operation is in progress and the various other conditions described heretofore with respect to a cursor left operation have been satisfied, the I12 state is assumed.

Figure 49:
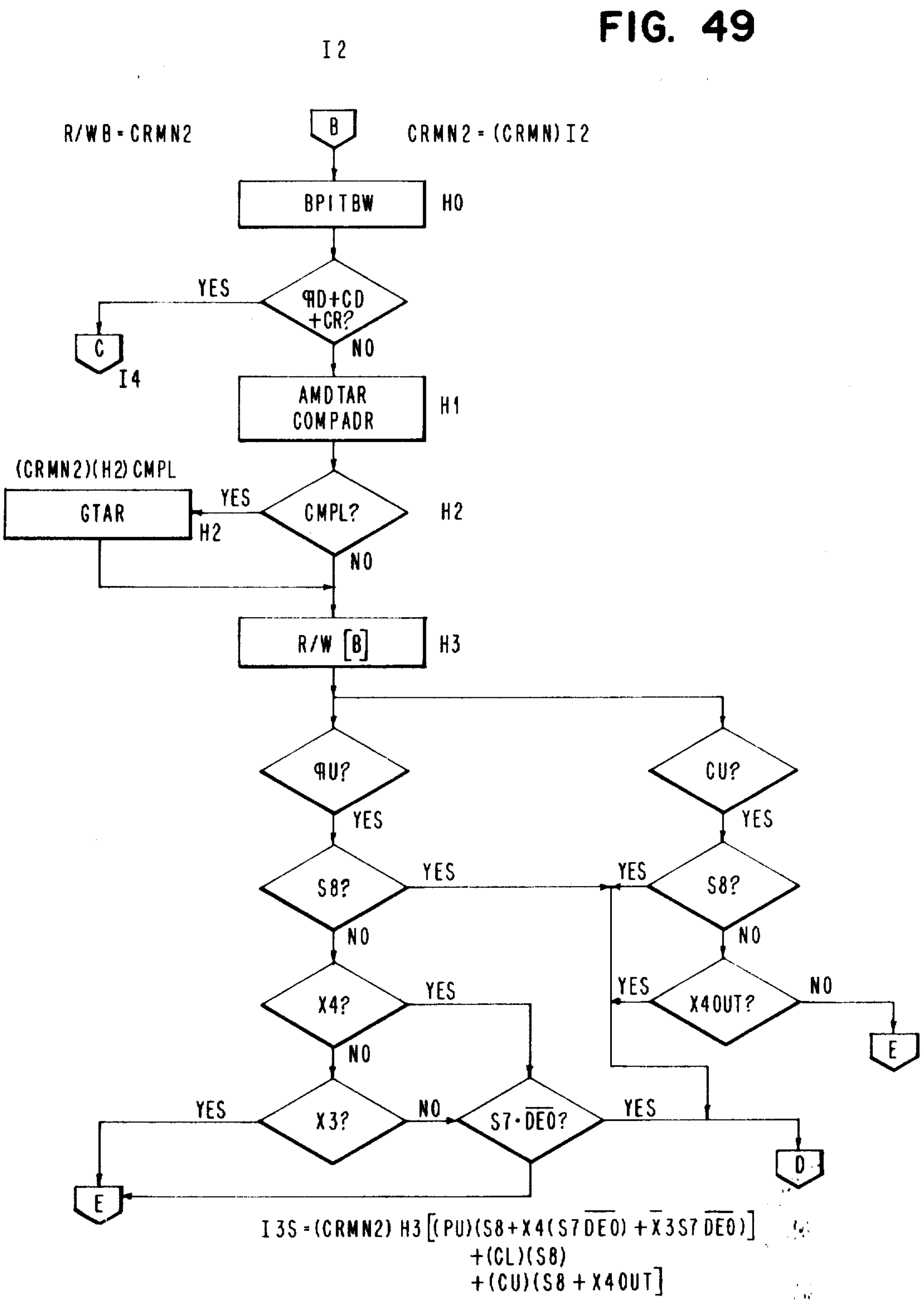

Referring now to FIG. 49 of the drawings, the operation effected during processor time I2 of a cursor operation is depicted. During this operation, the B-register is advanced to address the line group information of the line on which the cursor is located and, if a paragraph down, cursor down or cursor right operation is specified, the operation proceeds to clock time I4. During a cursor left or cursor upward operation, the text address is set to the start of the line during clock time H1. An error check is made during clock time H2 and the line group information is accessed during clock time H3 with tests being made to determine whether paragraph marks, etc., exist. Thereafter, the operation proceeds directly to the I3 state during a paragraph up operation and an output flag is found, or if a paragraph symbol is found and the cursor was not originally located at the left margin. Additionally, the I3 state is assumed when the output flag (S8) is located during a cursor up or cursor left operation or when it is determined that during a rapid motion operation, eight lines have been examined. If the operation does not proceed directly to the I3 state, it proceeds through connector block E to connector block E of FIG. 50. A check is made as denoted by block 719 of FIG. 50 to determine whether the top of the page has been reached, in which case the I3 state is assumed. If the top line is not being accessed, the next higher line is accessed and the number of characters on the line is transferred to the D-register and to the C-register if a cursor left operation is specified. If a cursor left operation is specified, the operation proceeds directly to I3. It continues to loop through I2 if a cursor left operation is not specified.

Figure 50:
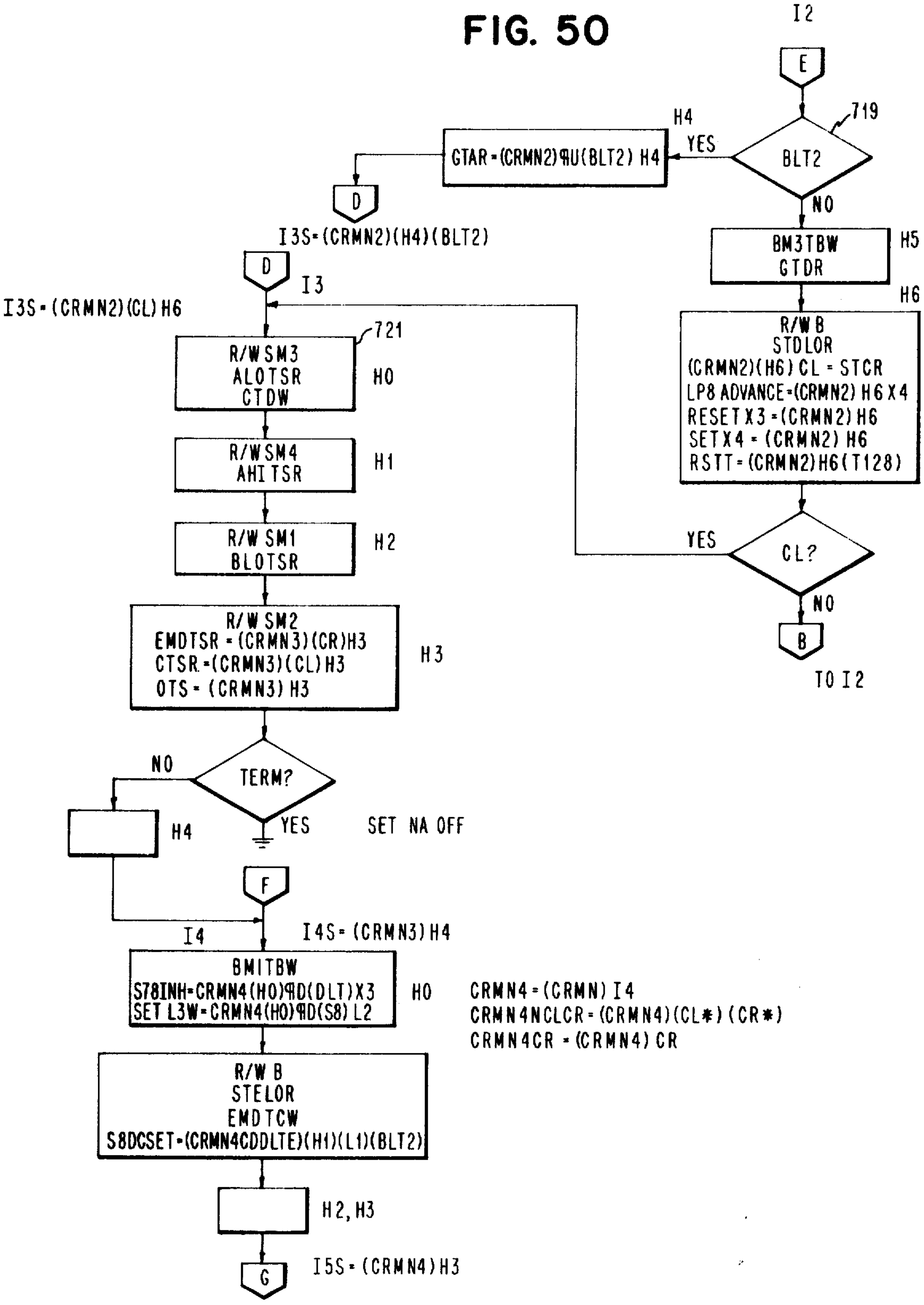

The operation of the system during clock time I3 is further described in FIG. 50. During clock time H0 of that cycle, as defined by block 721, the low part of the cursor memory address is stored. Thereafter, various other cursor factors are stored and indicators are checked to determine whether the operation should be terminated or to determine whether a cursor right, cursor down, or paragraph down operation is in process without having found a valid stop point. Thereafter, the operation proceeds to clock time I4 during which time the number of characters located on the cursor line to the right of the cursor is determined and the paragraph mark is deleted if the line initially addressed by the cursor is being deleted. The output flag is sampled and sets the L3 latch for later utilization, and an automatic delete operation is specified if the L1 latch had been previously set indicating an error condition. Thereafter, the operation proceeds to the read forward operation defined by clock interval I5.

Figure 51:
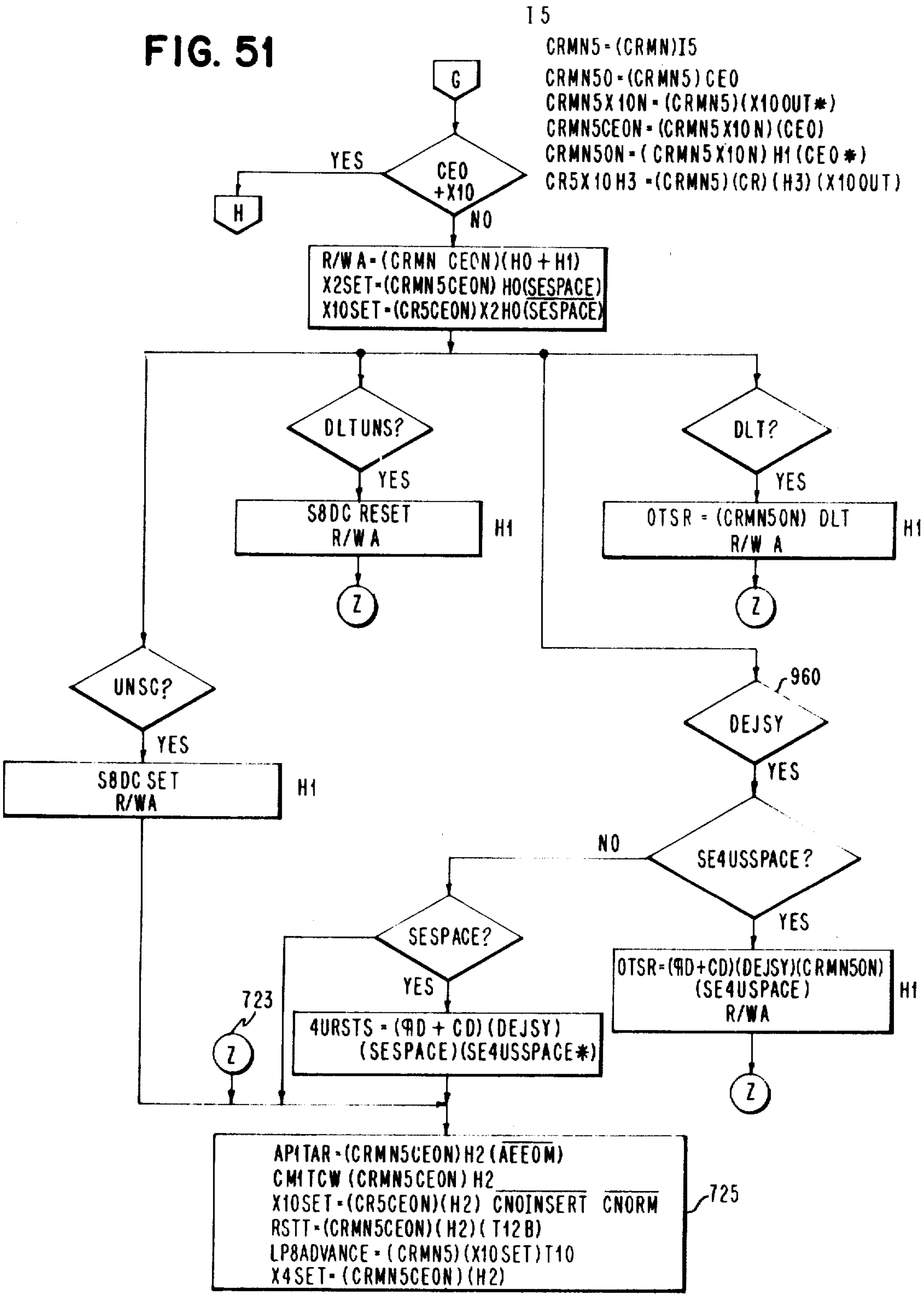

Referring now to FIG. 51 of the drawings, when the I5 operation is entered, a check is initially made to determine whether any characters remain on the line addressed by the cursor or whether the X10 latch indicating termination of the operation has been set. If a termination condition has not been noted, a text character is read and the X2 latch is set if a space character is detected. The X10 latch is set if a space character had been previously found and a nonspace character was thereafter found. At H1 time, the storage location is again read and a check is made to determine whether it is an underscore operation, a delete underscore operation, a dejustify operation, or a delete operation. If none of these operations are specified, the operation proceeds directly to entry point Z denoted by numeral 723. If an underscore operation had been specified, the character is rewritten back into text storage with an underscore flag. If a delete underscore operation is specified, the character is rewritten into text storage without its underscore flag. If a delete operation is specified, a blank character replaces the character read out of memory and if a dejustify operation is specified, a test is made to determine whether the character read is a character other than a special space character having more than four escapement units. Thereafter, the operation proceeds to block 725 where the memory address is incremented and the number of characters remaining on the line is decremented. The X10 latch is set if in the character mode, the counter which keeps track of multiple operations is advanced, and the X4 latch is set to remember that the loop has been passed through at least one time.

Figure 52:
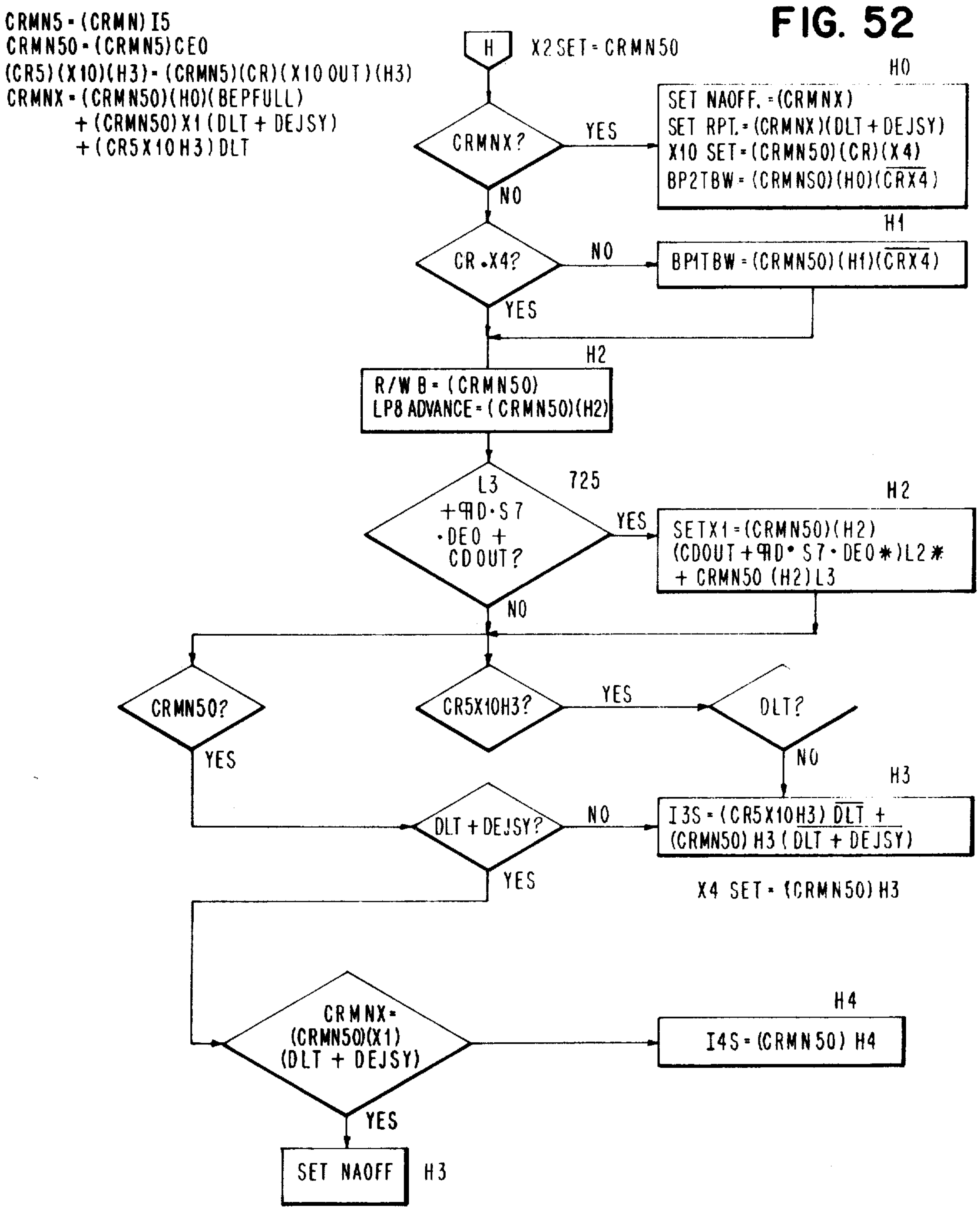

Referring now to FIG. 52 of the drawings, that portion of clock interval I5 is depicted wherein an ending condition has been met. When a delete or dejustify operation has been completed, the word optimization operation is to be specified. As denoted by block 725, a test is made to determine whether the output flag was found, whether a paragraph down operation is specified and the paragraph mark found is a nonzero line, whether a line-down without rapid motion is specified, or whether the cursor had moved through eight lines during a rapid motion-down operation. In each of these cases, the X1 indicator is set so that the operation may thereafter be terminated. Provided that a delete or dejustify operation has not been specified, the operation thereafter proceeds to clock state I3 whereupon a test is made as has been described to determine whether the X1 indicator is on or other terminating conditions are met. If so, the operation is terminated. If, however, these conditions are not met, the operation continues to loop through, as has been described, with respect to the delete operation.

Figure 53:
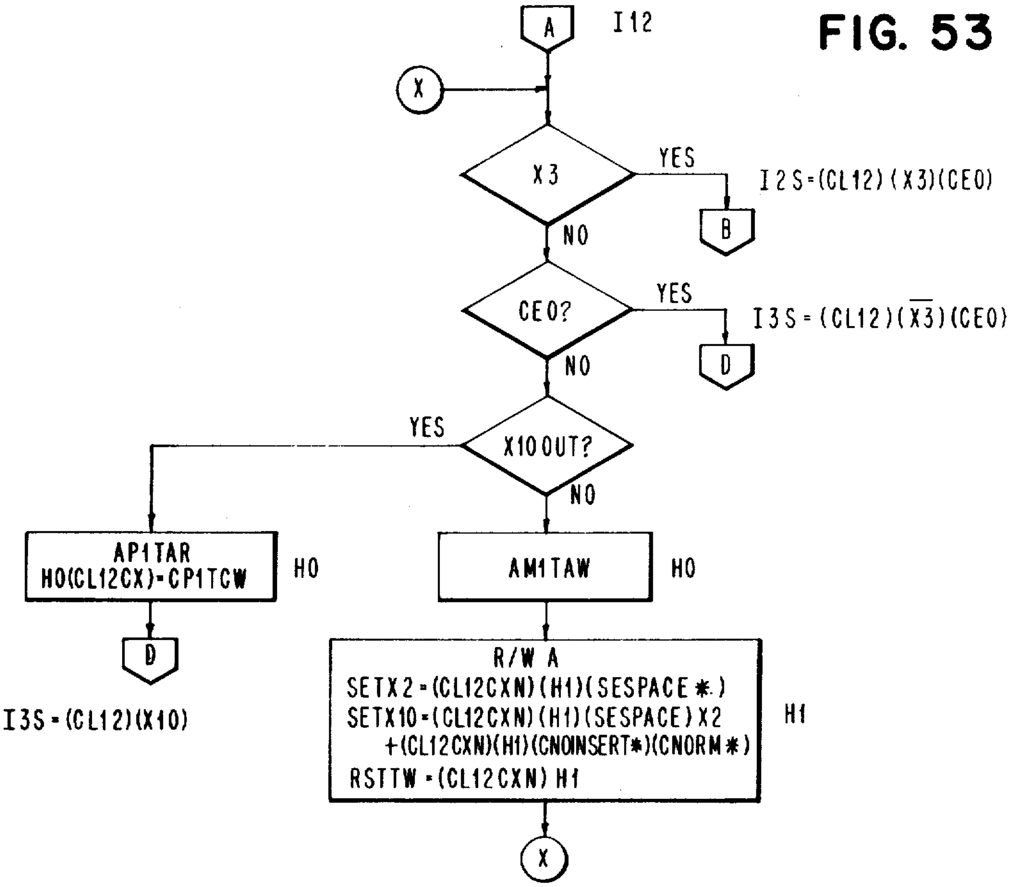

Referring now to FIG. 53 of the drawings, the operation of the processor during clock time I12 is depicted. This operation is effected during the reverse scan of the line when a cursor left operation has been specified. The X3 indicator is tested to determine whether the operation was initiated when the cursor was adjacent to the left margin. A test is then made to determine whether the left margin has been reached. Thereafter, the stopping condition is tested to determine whether the operation is complete. If the operation is not complete, the first nonspace character is accessed and thereafter, the first space character is accessed. Once the first space character has been accessed, the cursor is backed up one position to the right to address the first text character of a word.

Thus far, the description has related to the operation of the visual editing system incorporating a selectable letter spacing display and associated scale display when the system is optimizing the words which are displayed, displaying the various text words and displaying the cursor. In the description which follows, the operation of the system when it displays the scaler information adjacent to the text information will be described. Thereafter will follow a description of the analog method by which margin information is entered into the system, a description of the operation of the system when the pitch of the displayed characters is changed from standard spacing to proportional spacing, and a description of the partial adjust operation. Of course, changing pitch causes the characters to assume new positions with respect to the margin which has been assigned for the line resulting in further optimization of the displayed lines so that the maximum number of words appear on the line in accordance with both the pitch utilized and the variable margin settings.

Referring now to FIG. 54 of the drawings, a graphic illustration of the scales which are displayed adjacent to the text characters when a 10-pitch display has been specified, when a 12-pitch display has been specified and when a proportional display has been specified is depicted. These scales are displayed only when specified by operator depression of a keybutton. The scales are shown one above the other as they would appear with respect to the first line of print if the pitch were successively changed without altering the text characters appearing on the first line. In FIG. 54*a*, the words MISTER JONES are displayed adjacent to the scale. It can be seen that the scale displays 10 nine-unit increments between each inch mark 800. Thus, 10 nine-unit characters are displayed between adjacent inch marks. Additionally, the left margin boundary (LMS) and the right margin boundary (RMS) are displayed on the scale. The right margin boundary is specified by the system in escapement units, as has been described and is located 648 escapement units from the leftmost display position in the illustration. Since there are 90 escapement units per inch in a 10-pitch display, the 648 escapement units between the leftmost position and the right margin boundary would be indicated as 7.2 inches on the scale. Thus, the operator would know that the right margin boundary would be located 7.2 inches from the full left margin when the words stored in the text storage are printed out on a 10-pitch printer.

In a similar manner, there are 12 nine-unit increments between inch marks 802 for the 12-pitch scale display depicted in FIG. 54*b*. This would indicate that a right margin which is located 648 escapement units from the leftmost boundary would be located 6 inches from the full left margin when printed out on a 12-pitch printer. As can be seen, the words MISTER JONES align with one another indicating that the displayed words when either in 10 pitch or 12 pitch do not change, but instead, a different scale is utilized to apprise the operator of the amount of space that the words utilize when printed out respectively on a 10-pitch or 12-pitch machine.

Referring now to FIG. 54*c* of the drawings, it will be noted that six 12-unit increments are displayed between inch mark notations 804 when a proportional display is specified. Further, the left margin boundary is located 24 escapement units from the leftmost position instead of 18 escapement units as in standard pitch. This is because 18 is not a multiple factor of 12 and, therefore, the left margin location is shifted to the next highest even multiple of 12 nearest to 18. The right margin boundary is depicted as the same since 648 escapement units are divisible by 12 as well as by nine. Since there are 72 escapement units per inch when in proportional display, the right margin is indicated as being located 9 inches from the left edge of the display which would effect its placement 9 inches from the full left margin when printed out on a proportional spacing machine using an escapement unit of one seventy-second of an inch.

It will be further noted that the words MISTER JONES take up less space because the average escapement value of the characters is less than the nine units required when displayed in standard display.

A special cursor mark 806 is displayed adjacent to the scale in addition to the cursor mark displayed adjacent to the text. This cursor mark can be moved only when in a scale display operation by depressing the appropriate keys on the cursor keyboard of FIG. 1. In order to move a margin, the scales are first displayed indicating a left margin stop and a right margin stop. The left margin and right margin stops thus indicated are one of the 16 sets of margin stops stored in the register 100 of FIG. 2. These margins can be sequentially accessed by pressing appropriate keybuttons on the control keyboard. If it is desirous to change the left margin or the right margin, the cursor 806 is placed adjacent to a displayed left margin or right margin and moved to the desired margin location. As the cursor moves, the left margin or right margin which is adjacent to the cursor is moved simultaneously with it on the display. The description which follows describes the internal operation of the system during such a margin motion operation.

Referring now to FIG. 55 of the drawings, a flow diagram of the margin control operation is depicted. This operation is effected when the operator depresses a "start," "advance," or "reverse" key (not shown) on the control keyboard of FIG. 1. This effects the display of scales such as that shown in FIGS. 54*a*, 54*b*, or 54*c* in accordance with the pitch previously selected. Additionally, when the "start" key is depressed, the first group of margin information located in the control register 100 of FIG. 2 is accessed and displayed adjacent to the scales. When the "advance" key is depressed, the next set of margin information is accessed for display adjacent to the scales and so on for each depression of the advance key. In a similar manner, the reverse key effects the display of the next lower number group of margin information.

During clock state I0, the address of the margin groups specified through the operation of the "start" etc., keys is generated and the information of that margin group is accessed. During clock time I1 and clock time I2, this information is normalized. This normalization operation accesses the margin information which is in terms of escapement units and insures that it is divisable by nine when a standard pitch display is specified and by 12 when a proportional display is specified. If the margin information had been set up in standard pitch and standard display was being effected, the information would already be in its proper form. If, however, the information was set up in standard pitch and thereafter, the operator switched the pitch to proportional spacing, it would be necessary in certain instances to generate new left or right margin boundaries in terms of escapement units. Referring once again briefly to FIG. 54 of the drawings, it can be seen that when standard pitch is specified, the left margin stop is located 18 escapement units from the left most position while in proportional display, it is located 24 escapement units from the leftmost position. Thus, if the margin was initially set at 18 escapement units and thereafter, the operator switched the pitch to proportional display, the normalization operation would effect the generation of the margin at a location 24 escapement units from the leftmost position.

Referring once again to FIG. 55 of the drawings, once the margin information has been normalized into proper escapement units, it is converted into character position units and the operation proceeds to its I3 state wherein a check is made to determine that the cursor is located intermediate to the left margin location and the right margin location and further, that the left margin location is not located beyond the right margin location. Thereafter, a test is made to determine whether a cursor left or cursor right operation has been specified. Assuming that the operator had depressed the start key or the reverse key, the operation proceeds to its I12, I13, and I14 states wherein the margin information is denormalized from its character position specification to escapement units.

If, after depressing one of the control keys, the operator determines that the margin displayed should be changed, the operator depresses the cursor left or the cursor right keybutton on the control keyboard causing the cursor which is located intermediate to the left margin and the right margin to move accordingly. If the cursor is moving to the left and meets the left margin or if the cursor is moving to the right and meets the right margin, the margins are thereafter moved along with the cursor in the direction of cursor motion until the leftmost or rightmost stop is reached or until cursor motion is halted. In order to move the margins toward the center of the page, it is necessary to place the cursor character adjacent to the margin and depress a code key located on the control keyboard. Thereafter, the depression of the appropriate cursor motion key causes the margin to move inward. If the operator depresses the rapid motion key along with the cursor key, the cursor and margin move eight character positions at a time to effect the rapid motion. All of these operations are effected during clock interval I4 which will be described hereinafter. It should be noted that a display cycle is effected after each operation is complete so that the operator has immediate feedback for the control keybuttons depressed.

Figure 56:
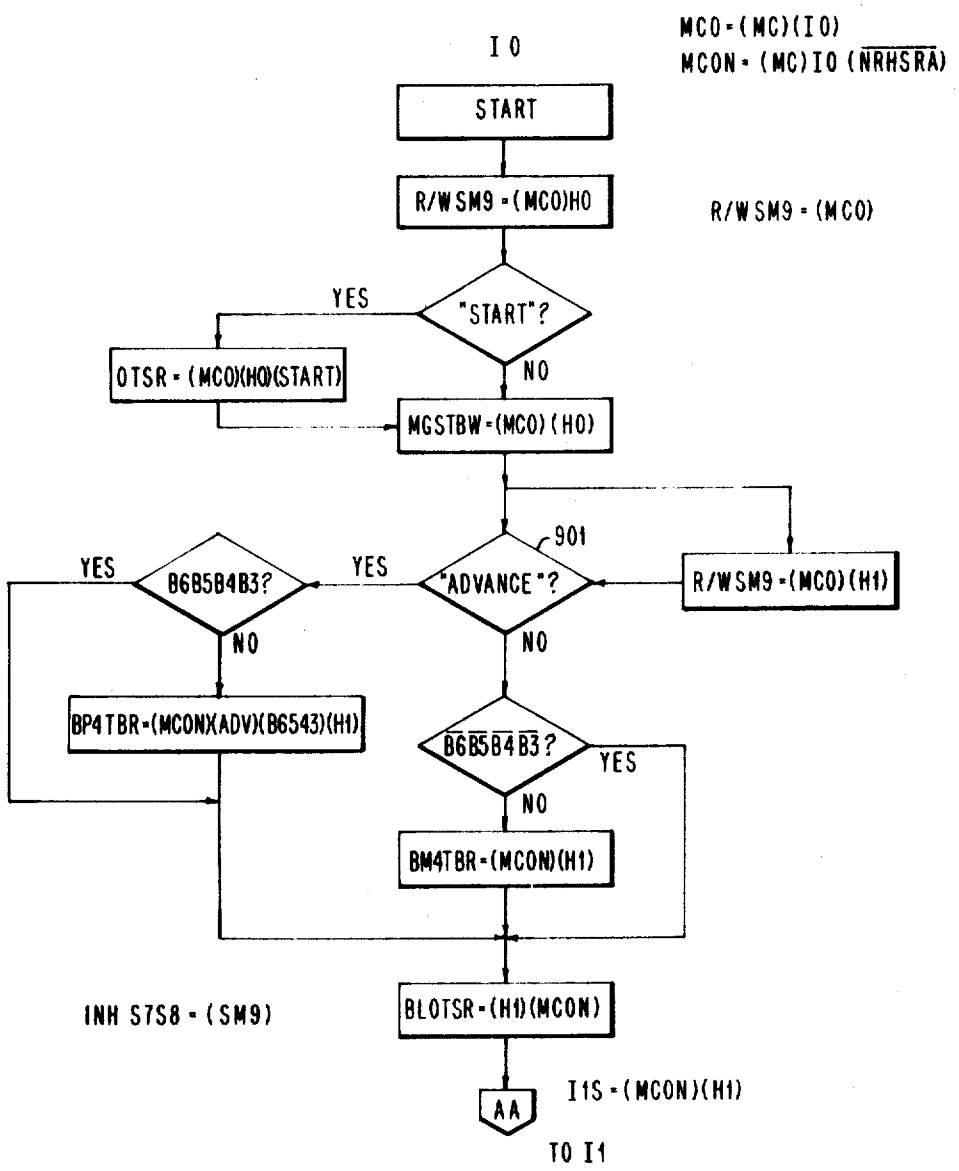

Referring now to FIG. 56 of the drawings, the operations effected by the system during clock interval I0 of the margin control operation are depicted. When the operator depresses either the start, advance, or reverse keys, the special memory 9 location is read which contains the selected margin group address. If the start key had been depressed, a zero is restored into the special memory location so that the first group is selected. If the advance key is depressed as indicated by a block 901, a test is made to determine whether the 16th group is being addressed and if it is not, one is added to the address. If the advance key is not depressed, a test is made to determine whether the first group is being addressed and, if it is not, one is subtracted from the margin group number. If a cursor key had been depressed, the operation proceeds directly to its I1 state as it does after the operations described above have been completed.

Figure 57:
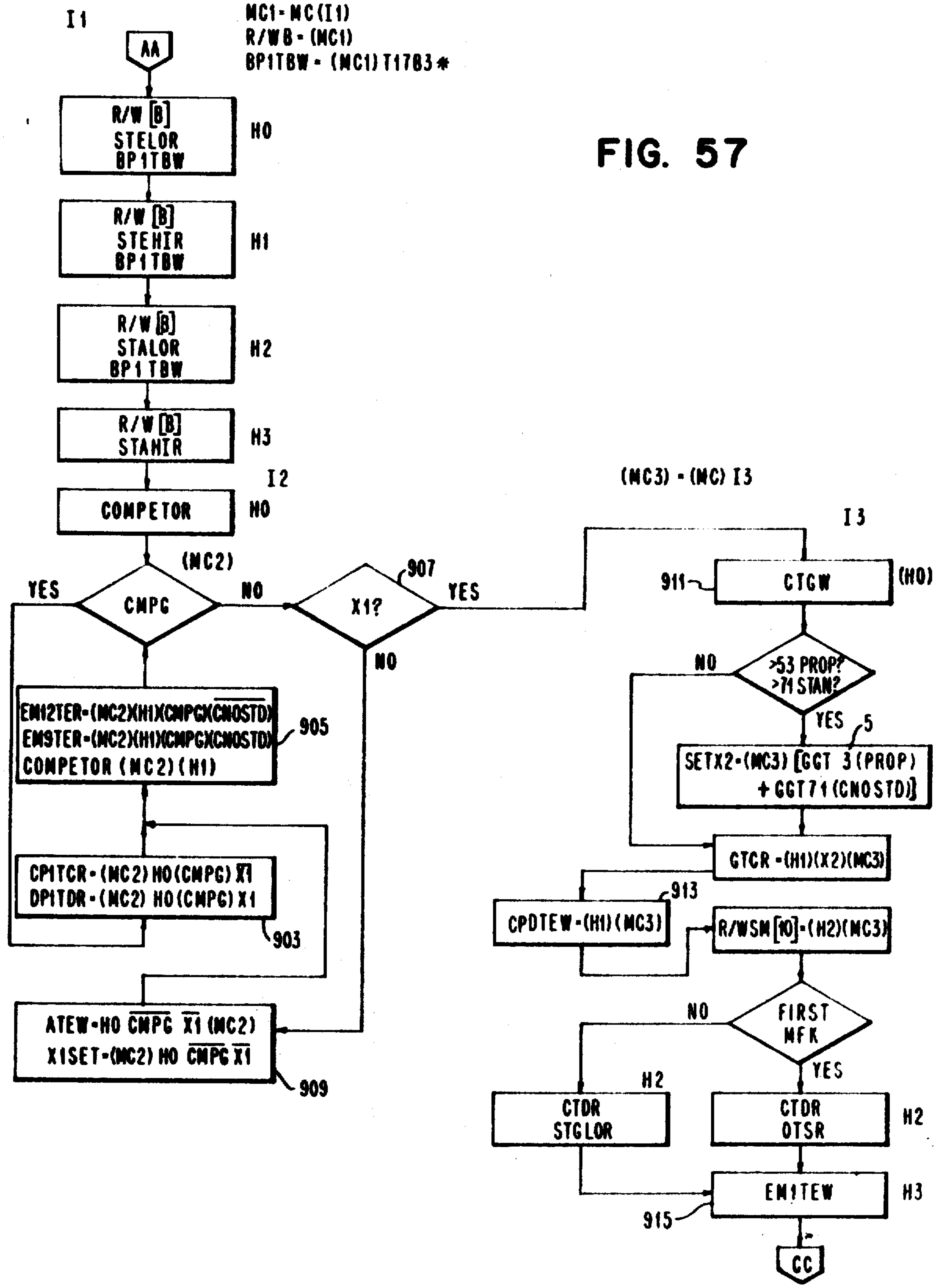
Figure 58:
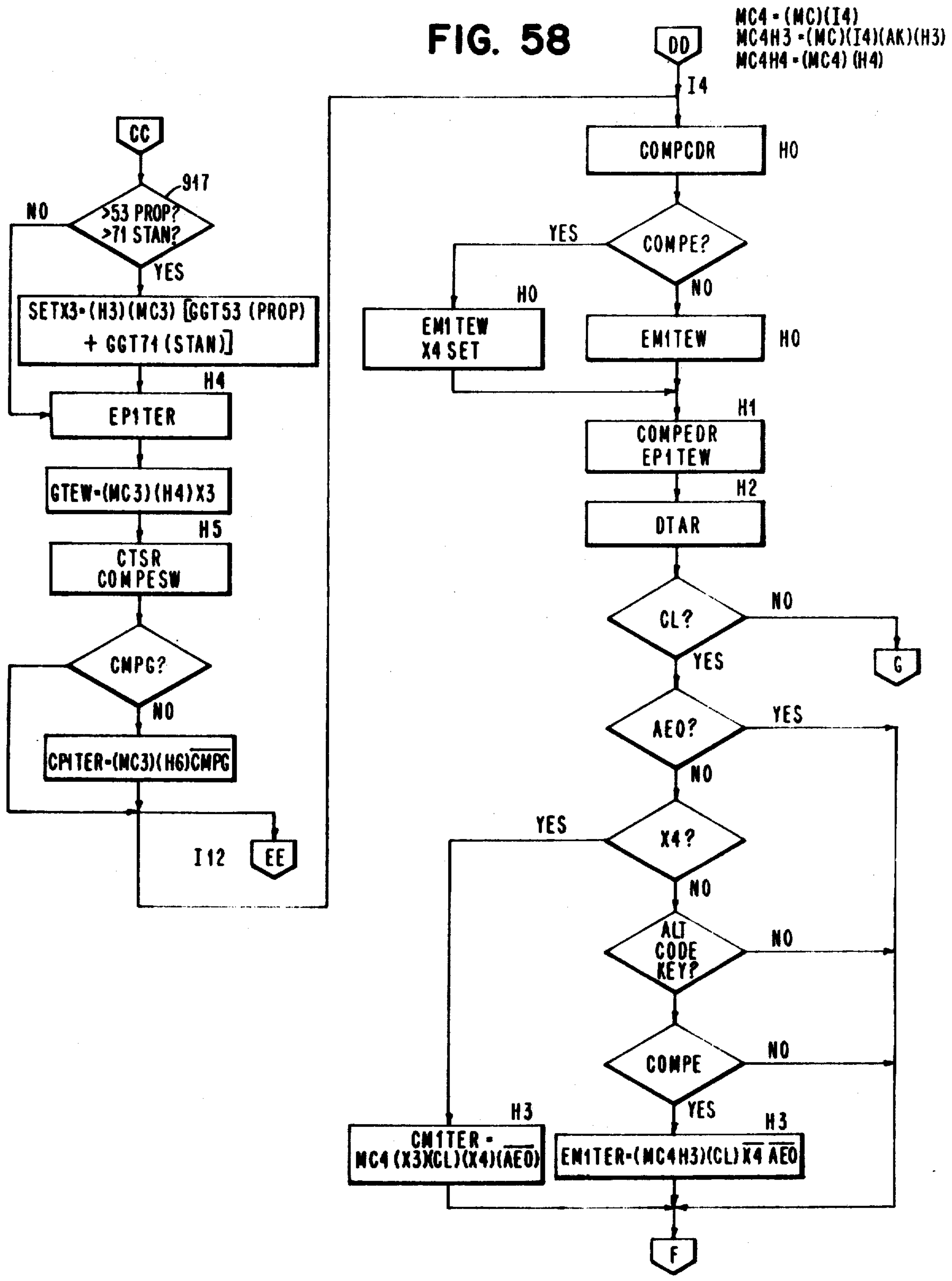

Referring now to FIG. 57 of the drawings, the operation of the processor during I1, I2, and I3 times is depicted. At clock interval I1, the B register contains the left margin stop address. This information in escapement units is stored in the E-register and thereafter, during clock intervals H2 and H3, the line length in escapement units is stored in the A-register. Thereafter, the operation proceeds to its I2 state during which time the left margin information and the line length information is normalized from escapement units to character units. The left margin information is compared to determine whether it is greater than zero and if it is, the operation proceeds to block 903 where one is added to the contents of the C-register. Thereafter, the operation proceeds to block 905 where 12 is subtracted from the contents of the E-register if in proportional spacing and nine is subtracted from the contents of the E-register if in standard spacing. Simultaneously, a compare is made to determine whether the contents of the E-register is greater than zero and the operation continues in a loop until the contents of the E-register is less than or equal to zero. At this time, the number in the C-register will be the number of 12-unit or nine-unit escapement increments which define the left margin location. Thereafter, a test is made of the X1 indicator as noted by block 907 which at this time is off. The operation then proceeds to block 909 where the line length located in the A-register is transferred to the E-register and the X1 indicator is set. Thereafter, the D-register is utilized to count the number of nine or 12-unit escapement increments which define the right margin location. When these escapement units have been exhausted, the contents of the D-counter represent the desired count of the number of nine or 12-unit character positions located between the margins. Since the X1 indicator is set by block 909, the operation would then proceed from block 907 to block 911 wherein the process counter assumes its I3 state. The left margin is then sampled to determine that it is less than 53 in proportional spacing or less than 71 when in standard spacing. These numbers refer to the rightmost stop. If the left boundary is located beyond the rightmost stop, the X2 indicator is set and the left margin is reset to its leftmost position. Otherwise, the operation proceeds to block 913 wherein the contents of the C-register and the D-register are added together and stored in the E-register thus specifying the right margin boundary. Thereafter, the cursor horizontal position is read from its special memory location and, if an advance, reverse or start operation is specified, it will be written back as zero. If such an operation is not specified, the information is rewritten into storage. When a zero is placed in the register, zero is added to the contents of the C-register and therefore, the cursor is placed adjacent to the left margin boundary. During subsequent passes through this operation, the left margin will be added to the cursor horizontal position so that motion away from the left margin is possible. The operation then proceeds to block 915 wherein one is subtracted from the right margin information and a check is made as denoted by block 917 of FIG. 58 to determine whether the right margin location is greater than the rightmost position. If it is, the right margin location is set immediately adjacent to the left margin location. Thereafter, the operation proceeds either to an I4 state or to an I12 state in accordance with whether a cursor motion operation had been specified. If a cursor motion operation has been specified, the operation proceeds to its I4 state. Thereafter, the contents of the C-register containing the left margin information is compared with the contents of the D-register containing the cursor address information to determine whether the cursor is located adjacent to the left margin. If the cursor is adjacent to the left margin, the X4 indicator is set. Thereafter, one is subtracted from the right margin location located in the E-register and compared with the cursor address. The right margin is then restored into its normal value and the cursor location is stored in the A-register. A check is made to determine if a cursor left operation is in progress and if it is, a check is made to determine whether the cursor location is equal to the leftmost stop. If it is not, a check is made to see whether the X4 indicator has been set indicating the cursor is adjacent to the left margin. If the X4 indicator is set, the left margin stop is moved one position to the left. If the cursor is not adjacent to the left margin stop as indicated by the X4 indicator, a check is made to determine whether the code key has been depressed indicating that the right margin may be in motion to the left. A test is thereafter made to determine whether the compare latches indicate that the cursor was adjacent to the right margin. If they do, one is subtracted from the right margin boundary. Thus, if the cursor is located adjacent to the left margin during a cursor left operation, the left margin is moved and if it is located adjacent to the right margin and the code key is depressed during a cursor left operation, the right margin is moved. Thereafter, the operation proceeds through exit block F to entry block F of FIG. 59. There, a check is made to determine whether the cursor is located adjacent to the leftmost position. If it is not so located, one is subtracted from the cursor position and the left margin information is stored in the D-register. Thereafter, the cursor position is rereferenced during clock time H5 with respect to the left margin as indicated by block 919.

Figure 59:
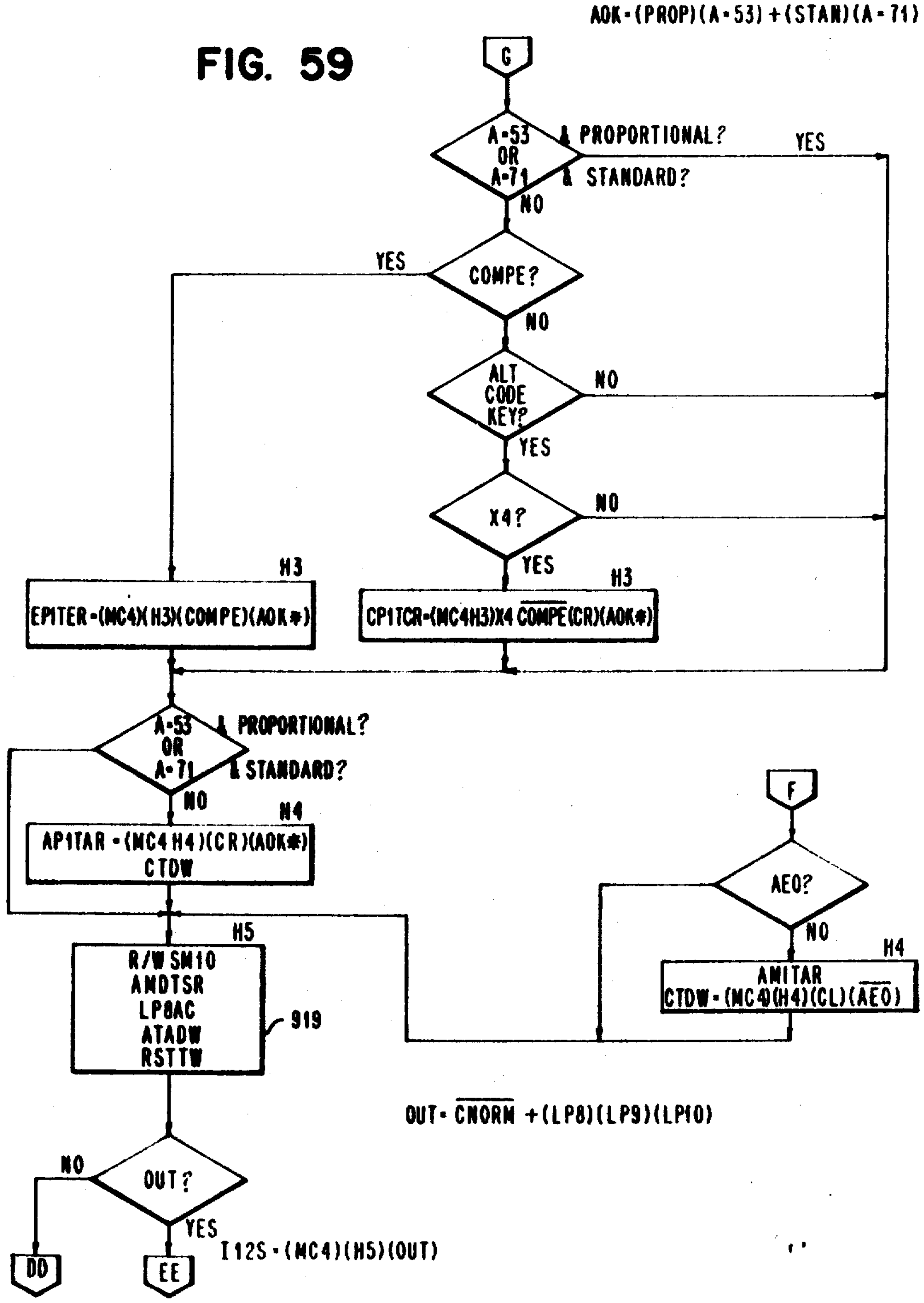

If a cursor right operation had been specified, the operation would proceed to entry block G of FIG. 59 and an analogous operation is effected wherein the right margin boundary is moved to the right if the cursor is located adjacent to it during a cursor right operation, and the left margin boundry is moved to the right if the code key is down and the cursor is adjacent to it. Otherwise, the cursor is moved one position to the right and the cursor is re-referenced to the left margin position. A test is then made to determine whether the rapid motion key is depressed and, if it is, and if eight increments have not yet been counted, the operation proceeds back to the start of its I4 state. Otherwise, the operation proceeds to its I12 state depicted in FIG. 60 of the drawings.

Figure 60:
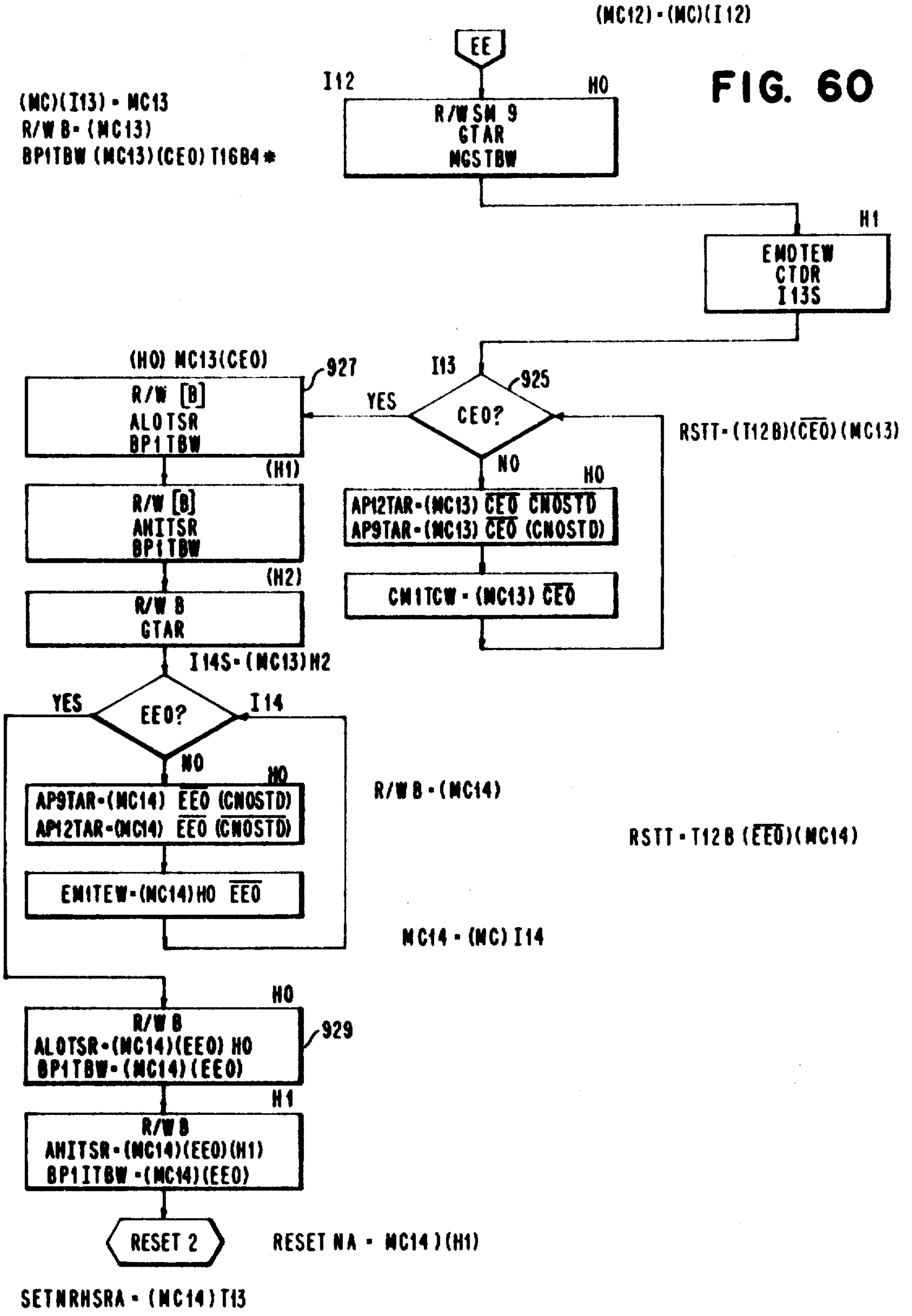

Referring now to FIG. 60 of the drawings, the operations effected during I12 cause the margin group information to be read from its special memory 9 location, the A-register to be cleared, and the B-register to address the left margin and line information in storage prepairtory to storing in the new factors. During clock interval H1, the left margin stop information is transfered to the D-register and the line length in nine- or 12-unit character positions is calculated and placed in the E-register.

During clock time I13, 9 or 12 is added to the contents of the A-register provided the C-register is not equal to zero. Thereafter, one is subtracted from the contents of the C-register and the test is again as indicated by block 925. Once the contents of the C-register equals zero, the left margin in escapement units is located in the A-register and the operation proceeds to block 927 wherein the content of the A-register is stored in the memory location addressed by the B-register, the A-register is restored to zero and the line length is denormalized from character positions to escapement units in a similar manner during clock time I14. Once the escapement units have been specified, they are stored in the memory location addressed by the B-register as indicated by block 929 and the operation is terminated.

Referring once again to FIG. 54 of the drawings, the operation wherein the left margin stop and the right margin stop information is calculated and moved under the control of the cursor motion operation has been described. In the description which follows, the operation of changing from 10 pitch to 12 pitch and from standard pitch to proportional pitch display will be described.

Referring now to FIG. 61 of the drawings, when the operator operates a key which specifies the desired pitch, the operation proceeds to the margin control operation just described. Under the control of the processor, the first set of margin information is accessed in the same manner as though the start key was depressed. Thereafter, each set of margin information is sequentially accessed as though the advance key were repeatly depressed and the information is properly normalized to the new pitch in the same manner as described with respect to the margin control operation. Once the margin control operation is completed, the word optimization operation previously described is entered and each paragraph of text is readjusted to the new margin boundaries. It should be noted that the margin boundaries change only when going from 10 or 12 pitch to proportional pitch or vice versa. The margin boundaries remain the same when going from 10 pitch to 12 pitch or vice versa.

Once the pitch has been specified, the scale which is displayed with the text must correspond to the specified pitch. Referring briefly to FIG. 54 of the drawings, if a change were made from 10 pitch to 12 pitch, the information content of the line of text would not change nor would the location of the displayed boundaries. However, the scaler display would change indicating that the text which previously occupied 7.2 inches when printed out would now occupy 6 inches when printed out. It would be necessary for the operator to move the right margin stop of the 12-pitch line to the right in order to achieve the same length of line printout. Thereafter, the text would be reoptimized to the new boundaries. It is, of course, recognized by those skilled in the art that instead of keeping a constant right margin boundary during this operation, a calculation could be made to effect placement of the right margin boundaries 7.2 inches from the leftmost location and to effect the proper placement of the left margin location. This operation would be similar to that described in the margin control operation. With the thus newly created boundaries, the word optimization process previously described could be automatically entered to optimize the words to the new line.

In the device described, when a change is made from 12 pitch to proportional pitch, the left margin boundary and right margin boundary are shifted as has been described. Thus, it is necessary to enter the word optimization process to assure that the words appearing on each line fit within the newly defined boundaries. As noted in FIG. 54 of the drawings, the distance between the margins which previously occupied 6 inches would now occupy 9 inches when printed out. Thus, it would be necessary to move the right margin stop to the left in order to specify a 6-inch proportionally spaced line. Thereafter, the word optimization operation could be effected by operator control. In a similar manner to that described above, it is possible to compute the conversion value and place the right margin stop and left margin stop 6 inches apart in the proportional display automatically under machine control. Since the division and multiplication process involved maybe readily implemented by those skilled in the art, a detailed description thereof will not be entered.

As has been described heretofore, a change from 10 pitch or 12 pitch to proportional display effects a change in the width of most of the displayed character representations. That is, instead of each character representation corresponding to nine escapement units as in standard display, each character representation is assigned a weighted escapement value. Thus, for standard display, each character code is decoded as nine escapement units while the same character code is decoded as four to nine escapement units in accordance with character size when proportional display is specified.

Thus far, the construction of the displayed scales, the operation of changing margin boundaries and the operation of changing the pitch of the displayed scales and text characters has been described. In the description which immediately follows, the operation of the processor when displaying a display line containing both scalar information and margin information in a selected display pitch will be described.

Referring once again to FIG. 39 of the drawings depression of a format key such as the margin advance key effects the generation of a logic signal (FK) which sets the L1 indicator during clock time H1 or the L4 indicator during clock time H2. The L1 indicator is set when the scales are to be displayed on the first line and the L4 indicator indicates that the scales are to be displayed on the line above the cursor mark. If the L1 or L4 indicators are set, the operation proceeds to block 950 instead of bock 952 whereupon the activated set of margin information as specified by actuation of the start, reverse or advance key (not shown) is accessed. During a character display line, the operation proceeds to block 952 to obtain the margin information for the line displayed as has been described. The left margin boundary information is stored in the J-counter and the line length in escapement units is stored in the E-register in the same manner as the display of margin information on a character representation line.

Referring once again to FIG. 40 of the drawings, the location of the cursor mark displayed adjacent the scale line is obtained as denoted by block 956 at H1 time. This information is stored in the D-register in the same manner as the cursor information for a character display line having a cursor displayed therewith. The margin display is effected in the same manner for a line of scale character representations as for a line of data character representations and is shown in FIGS. 41 and 42 of the drawings.

Referring now to FIG. 44 of the drawings, a scale character signal is generated for each nine units of escapement whenever in standard pitch display and for each 12-units of escapement whenever in proportional pitch display. This, whenever the L1 or L4 indicators are set indicating a scale character line is to be displayed, a signal (SCALE) is generated for each scale character to be displayed. This signal is generated during clock time I4 for each 4½ H-clock times when in standard display and for six H-clock times when in proportional display as denoted by block 958. It will be recalled that the electron beam sweep scans two character vertical segments during each H-clock, a character vertical segment corresponding to a displayed escapement unit.

Referring once again to FIG. 2 of the drawings, the character generator 76 is responsive to the scale character generator 960 during a scale display operation to generate a short vertical line segment for each scale character to be displayed. The scale character generator is responsive to the "-SCALE" signal of the processor control 73 to effect the generation of the scalar display symbol. Additionally, the scale charactor generator 960 contains a counter which is reset upon the count of six, 10, or 12 in accordance with the pitch, proportional, 10 pitch or 12 pitch respectively selected by operator manipulation of switch 959 of FIG. 1. The counter is advanced by one for each SCALE signal generated by the processor and, upon resetting, supplies a measure signal to the character generator which generates a vertical line segment of greater length than the short vertical line segment generated for each scale character.

The scale generator 960 is further responsive to the J-counter 95, and the processor control 73 to effect the generation of margin representations. It will be recalled that during either a data character line display operation or during a scale character line display, the J-counter contains the left margin location and is decremented for each display escapement until it reaches a count of zero. At this time, a signal is gated to the scale character generator which provides a signal to the character generator to display a long vertical line segment representative of the margin boundary. The contents of the E-register 94 containing the line length and hence the location of the right margin boundary is then transferred to the J-counter which decrements with each display escapement until it reaches a count of zero. At this time the character generator generates a further long vertical line segment representative of the right margin boundary.

Referring now once again to FIG. 1 of the drawings, a scale representation is depicted as being displayed as the first line of display. The left margin boundary 36 and right margin boundary 38 appear as long scale segments. The marks 970 of intermediate vertical height represent measure units such as inches while the short scale segments represent fractions of inches.

Referring now to FIG. 62 of the drawings, the operation of the processor doing a partial adjust operation which is effected after the pitch has been changed from standard spacing to proportional or vice versa is depicted. This operation allows columnar text to be aligned on nonfractional character positions. In order to effect this alignment, the cursor is placed adjacent to the character forming the first character in the column and a set of margin information containing a left margin boundary located to the right of the cursor character is displayed on the scale display. Depression of a partial adjust key on the control keyboard effects alignment of the character addressed by the cursor with the displayed left margin stop. Additional space characters are inserted to the left of the cursor character to fill out the line. If a word is placed beyond the defined right margin boundary, it becomes the first word of the next line and is located adjacent to the left margin boundary of that line.

The cursor memory address is first located and the horizontal position of the cursor is subtracted from the address to locate the line beginning. The escapement value of all the characters located to the left of the cursor is then calculated and the J-counter is decremented until it reaches the cursor location. The format group containing the left margin location to which the character defined by the cursor will be adjusted is located as defined by block 731. During the operations defined by block 733, the left margin location to which the text will be adjusted is defined in escapement units and as defined by block 735, the difference in escapement units between the left margin stop and the cursor character is calculated and a compare operation is effected. Providing that the cursor character is to the left of the left margin location, the content of the D-register is complemented and transfered to the E-register which then contains the number of escapement units that must be added to align the character addressed by the cursor with the specified left margin location. That value is then stored in special memory locations 14 and 15 and the operation proceeds to block 737 wherein the escapement deficit is recalled and a calculation is made to determine whether this value is less than four. Assuming that it is not less than four, a check is then made to determine whether standard or proportional spacing is specified and the operation proceeds to block 739 if proportional spacing is specified. There, the escapement value deficit is compared with seven units and if it is greater than seven units, a four-unit space is defined to be inserted to the left of the cursor location and the insert operation is automatically entered for the insertion of this character. Immediately prior to entering the insertion operation through connector block B, the escapement deficit is decremented by four units and this value is stored in special memory 14 and 15. Once the insert operation is completed, the operation again proceeds to Block 737 and continues to stay in this loop until a comparison is made which indicates that the deficit is equal to seven or less than seven. At this time, a calculation is made to determine whether a four-, five-, six-, or seven-unit space should be inserted to properly align column information and the operation proceeds to the insert operation through connector block C. If standard spacing had been specified, the operation proceeds to block 741 wherein a comparison is made to determine whether the escapement units are equal to nine. When they are equal to nine, the standard space code is inserted as defined by block 743. This space code is the same as a four-unit space code when in proportional mode.

Summarizing, the foregoing has related to the operation of a visual editing system incorporating selectable letter spacing display and associated scale display. While the specific embodiment described is the system which is the subject of the aforereferenced concurrently filed applications of Robert G.

Bluethman et al., the scale display feature could readily be incorporated in a system similar to that described in the aforereferenced application of Paul E. Goldsberry et al. and those prior art systems described therein. That is, while the described embodiment provides an option for displaying in standard or proportional pitch, the display of scalar information adjacent text information would be desirious for displays utilizing only a standard display or only a proportional display.

Additionally, in the system described, the scale display was changed while the character representation remained constant when a change was made from 10 pitch to 12 pitch. It is of course recognized that the character display could be reoptimized to the previous scalar length and thus changed to keep uniform line length.

As is further recognized by those skilled in the art, the character input information could have originated on a machine having virtually any selected pitch. Thereafter, a display pitch is selected which specifies how the processor will decode each character code both for word optimization operations and for display operations. The character codes remain the same in storage except for special space codes which are described in the aforereferenced application of Robert G. Bluethman and Jack W. Simpson. The characters are either decoded as nine escapement unit characters when standard pitch display is specified or as four to nine escapement unit characters when proportional pitch display is specified. Once the text is optimized for the pitch and margins selected, it is outputted to a secondary medium such as magnetic cards or tape. Thereafter, a power printer having the same pitch and margin settings as the display pitch specified should be utilized to play out the information so that it would appear within the specified margin boundaries in the identical manner that it appeared on the temporary CRT display. An example of power printers currently available utilizing standard 10- and 12-pitch escapement are the IBM Magnetic Tape "Selectric" Typewriter and the IBM Magnetic Card "Selectric" Typewriter. An example of a printer which could be utilized to print proportionally spaced text in response to character codes recorded on magnetic tape is the IBM Magnetic Tape "Selectric" Composer.

While the invention has been particularly shown and described with reference to a preferred embodiment thereof, it should be understood by those skilled in the art that the foregoing and other changes in form and detail may be made therein without departing from the scope of the invention.

What is claimed is:

1. A visual text display system comprising:
   - a character storage unit for storing a plurality of coded character representations;
   - a character generator responsive to the storage unit for generating a plurality of character representation signals, each signal corresponding to a stored coded character representation;
   - a character display unit responsive to the character representation signals of said character generator for displaying at least one line of character representations, each displayed character representation occupying a space defined by a number of display escapement units;
   - scale-defining means for defining a number of display escapement units which are contained within a measure unit;
   - scale-generating means responsive to the scale-defining means for generating a plurality of scale representation signals, each signal corresponding to a scale representation character;
   - said character display unit being further responsive to said scale-generating means for displaying at least one line of scale character representations adjacent to said at least one line of character representations, each displayed scale character representation being separated from each adjacent displayed scale character representation by a number of escapement units corresponding to the number of escapement units contained within said measure unit.

2. The visual text display device set forth in claim 1 further comprising:
   - pitch selection means for selecting one of a plurality of character display pitches;
   - said scale-defining means being responsive to said pitch selection means for defining a different number of display escapement units which are contained within a measure unit for each display pitch selected.

3. The visual text display device set forth in claim 2 wherein:
   - said character display unit being further responsive to said pitch selection means to define a number of display escapement units for each character representation in accordance with the selected display pitch.

4. The visual text display device set forth in claim 2 further comprising:
   - boundary-defining means for defining at least one set of left and right margin line boundaries, said set of boundaries being separated from each other and from a defined position by defined numbers of escapement units;
   - said character display unit being further responsive to said boundary defining means for displaying a set of boundary representations within said at least one line of scale character representations, said boundary representations being separated from each other and from an edge of said line of scale character representations by numbers of display escapement units corresponding to said defined numbers of escapement units.

5. The visual text display device set forth in claim 4 further comprising:
   - visual addressing means for defining a selected one of a plurality of discrete locations within said line of scale character representations;
   - said character display unit being further responsive to said visual addressing means for displaying a visual address representation adjacent said displayed line of scale character representations at the selected location defined by said visual addressing means;
   - selectively operable boundary varying means for specifying one line boundary of said at least one set of line boundaries at the selected location defined by said visual addressing means;
   - said boundary-defining means being responsive to said boundary-varying means and to said visual addressing means for defining said one line boundary at the selected location defined by said visual addressing means.

6. A visual editing and display system for displaying text character representations in a plurality of character display pitches comprising:
   - an addressable text storage unit for storing a serial stream of data character codes in adjacently addressed storage locations;
   - pitch selection means for defining one of a plurality of character display pitches;
   - escapement decoding means responsive to said pitch selection means for defining an escapement value for each stored data character code in proportion to the width occupied by a corresponding character representation in the display pitch selected;
   - word-defining means for defining grammatical words of data character codes in adjacently addressed storage locations;
   - line-defining means for defining the left and right margin boundaries of each of a plurality of adjacent display lines, each defined left and right margin boundary being separated from one another by a defined number of escapement units;
   - text-scanning means responsive to the escapement decoding means for determining a total escapement value of a plurality of adjacently addressed data character codes in said serial stream of data character codes;
   - text modification means for inserting data character codes into said serial stream of data character codes at any addressable storage location, for deleting data character codes from any addressable storage location, the storage address of existing data character codes shifting to accommodate inserted data character codes and to close over deleted data character codes;

word optimizing means responsive to said text-scanning means, to said word-defining means and to said line-defining means for defining the optimum number of words of adjacently addressed data character codes for each successive display line, the data character codes displayed for each defined line having a total escapement value equal to or less than the defined number of escapement units defined by the line-defining means, said word-optimizing means being responsive to the text modification means to initiate the defining operation;

display means responsive to the text storage unit, the escapement decoding means and the line-defining means for displaying at least one line of data character representations corresponding to adjacently addressed stored data character codes, the width of each displayed character representation being proportional to the escapement value defined by the escapement decoding means, said display means being further responsive to the word optimizing means for defining the data character codes displayed as character representations and responsive to the pitch selection means for defining a display pitch for each character representation in accordance with the pitch selected.

7. The visual editing and display system set forth in claim 6 wherein:

said word-optimizing means being responsive to said pitch selection means for initiating said defining operation whenever a different character display pitch is defined by the pitch selection means.

8. The visual editing and display system set forth in claim 6 further comprising:

scale-defining means responsive to the pitch selection means for defining a number of escapement units which are contained within a measure unit, said number of escapement units varying in accordance with the pitch defined;

said display means being responsive to said scale-defining means for displaying at least one line of scale character representations adjacent said at least one line of data character representations, said scale character representations being spaced apart by a distance proportional to a multiple number of measure units.

* * * * *